US011443516B1

(12) United States Patent
Hallman et al.

(10) Patent No.: US 11,443,516 B1
(45) Date of Patent: Sep. 13, 2022

(54) LOCALLY AND GLOBALLY LOCATING ACTORS BY DIGITAL CAMERAS AND MACHINE LEARNING

(71) Applicant: Amazon Technologies, Inc., Seattle, WA (US)

(72) Inventors: Samuel Nathan Hallman, Seattle, WA (US); Tian Lan, Seattle, WA (US); Hui Liang, Seattle, WA (US); Gerard Guy Medioni, Seattle, WA (US); Kostia Robert, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 224 days.

(21) Appl. No.: 16/841,289

(22) Filed: Apr. 6, 2020

(51) Int. Cl.
  *G06V 20/52* (2022.01)
  *G06N 20/00* (2019.01)
  *G06V 20/10* (2022.01)

(52) U.S. Cl.
  CPC ............ *G06V 20/52* (2022.01); *G06N 20/00* (2019.01); *G06V 20/10* (2022.01)

(58) Field of Classification Search
  CPC ........ G06V 20/52; G06V 20/10; G06N 20/00; G06K 9/00771; G06K 9/00664; H04N 5/232
  See application file for complete search history.

(56) References Cited

U.S. PATENT DOCUMENTS

| 6,154,559 A | 11/2000 | Beardsley |
| 7,050,624 B2 | 5/2006 | Dialameh et al. |
| 7,225,980 B2 | 6/2007 | Ku et al. |
| 7,949,568 B2 | 5/2011 | Fano et al. |

(Continued)

FOREIGN PATENT DOCUMENTS

| CN | 104778690 B | 6/2017 |
| EP | 1574986 B1 | 7/2008 |

(Continued)

OTHER PUBLICATIONS

Lee, K. and Kacorri, H., (May 2019), "Hands Holding Clues for Object Recognition in Teachable Machines", In Proceedings of the 2019 CHI Conference on Human Factors in Computing Systems (pp. 1-12).

(Continued)

*Primary Examiner* — Carol Wang
(74) *Attorney, Agent, or Firm* — Athorus, PLLC

(57) ABSTRACT

Motion of actors within a scene may be detected based on imaging data, using machine learning tools operating on cameras that captured the imaging data. The machine learning tools process images to perform a number of tasks, including detecting heads of actors, and sets of pixels corresponding to the actors, before constructing line segments from the heads of the actors to floor surfaces on which the actors stand or walk. The line segments are aligned along lines extending from locations of heads within an image to a vanishing point of a camera that captured the image. Trajectories of actors and visual data are transferred from the cameras to a central server, which links trajectories captured by multiple cameras and locates detected actors throughout the scene, even when the actors are not detected within a field of view of at least one camera.

20 Claims, 58 Drawing Sheets

(56) References Cited

U.S. PATENT DOCUMENTS

| | | |
|---|---|---|
| 8,009,864 B2 | 8/2011 | Linaker et al. |
| 8,175,925 B1 | 5/2012 | Rouaix |
| 8,189,855 B2 | 5/2012 | Opalach et al. |
| 8,285,060 B2 | 10/2012 | Cobb et al. |
| 8,369,622 B1 | 2/2013 | Hsu et al. |
| 8,423,431 B1 | 4/2013 | Rouaix et al. |
| RE44,225 E | 5/2013 | Aviv |
| 8,577,705 B1 | 11/2013 | Baboo et al. |
| 8,630,924 B2 | 1/2014 | Groenevelt et al. |
| 8,688,598 B1 | 4/2014 | Shakes et al. |
| 8,943,441 B1 | 1/2015 | Patrick et al. |
| 9,158,974 B1 | 10/2015 | Laska et al. |
| 9,160,979 B1 | 10/2015 | Ulmer |
| 9,208,675 B2 | 12/2015 | Xu et al. |
| 9,449,233 B2 | 9/2016 | Taylor |
| 9,473,747 B2 | 10/2016 | Kobres et al. |
| 9,536,177 B2 | 1/2017 | Chalasani et al. |
| 9,582,891 B2 | 2/2017 | Geiger et al. |
| 9,727,838 B2 | 8/2017 | Campbell |
| 9,846,840 B1 | 12/2017 | Lin et al. |
| 9,881,221 B2 | 1/2018 | Bala et al. |
| 9,898,677 B1 | 2/2018 | Andjelković et al. |
| 9,911,290 B1 | 3/2018 | Zalewski et al. |
| 10,055,853 B1 | 8/2018 | Fisher et al. |
| 10,133,933 B1 | 11/2018 | Fisher et al. |
| 10,192,415 B2 | 1/2019 | Heitz et al. |
| 10,635,844 B1 | 4/2020 | Roose et al. |
| 11,030,442 B1 | 6/2021 | Bergamo et al. |
| 2003/0002712 A1 | 1/2003 | Steenburgh et al. |
| 2003/0002717 A1 | 1/2003 | Hamid |
| 2003/0107649 A1 | 6/2003 | Flickner et al. |
| 2003/0128337 A1 | 7/2003 | Jaynes et al. |
| 2004/0181467 A1 | 9/2004 | Raiyani et al. |
| 2005/0251347 A1 | 11/2005 | Perona et al. |
| 2006/0061583 A1 | 3/2006 | Spooner et al. |
| 2006/0222206 A1 | 10/2006 | Garoutte |
| 2007/0092133 A1 | 4/2007 | Luo |
| 2007/0156625 A1 | 7/2007 | Visel |
| 2007/0182818 A1 | 8/2007 | Buehler |
| 2007/0242066 A1 | 10/2007 | Rosenthal |
| 2007/0276776 A1 | 11/2007 | Sagher et al. |
| 2008/0055087 A1 | 3/2008 | Horii et al. |
| 2008/0077511 A1 | 3/2008 | Zimmerman |
| 2008/0109114 A1 | 5/2008 | Orita et al. |
| 2008/0137989 A1 | 6/2008 | Ng et al. |
| 2008/0159634 A1 | 7/2008 | Sharma et al. |
| 2008/0166019 A1 | 7/2008 | Lee |
| 2008/0193010 A1 | 8/2008 | Eaton et al. |
| 2008/0195315 A1 | 8/2008 | Hu et al. |
| 2009/0060352 A1 | 3/2009 | Distante et al. |
| 2009/0083815 A1 | 3/2009 | McMaster et al. |
| 2009/0121017 A1 | 5/2009 | Cato et al. |
| 2009/0132371 A1 | 5/2009 | Strietzel et al. |
| 2009/0210367 A1 | 8/2009 | Armstrong et al. |
| 2009/0245573 A1 | 10/2009 | Saptharishi et al. |
| 2009/0276705 A1 | 11/2009 | Ozdemir et al. |
| 2010/0002082 A1 | 1/2010 | Buehler et al. |
| 2010/0033574 A1 | 2/2010 | Ran et al. |
| 2011/0011936 A1 | 1/2011 | Morandi et al. |
| 2011/0205022 A1 | 8/2011 | Cavallaro et al. |
| 2012/0148103 A1 | 6/2012 | Hampel et al. |
| 2012/0159290 A1 | 6/2012 | Pulsipher et al. |
| 2012/0257789 A1 | 10/2012 | Lee et al. |
| 2012/0284132 A1 | 11/2012 | Kim et al. |
| 2012/0327220 A1 | 12/2012 | Ma |
| 2013/0076898 A1 | 3/2013 | Philippe et al. |
| 2013/0095961 A1* | 4/2013 | Marty .................... A63B 69/38 |
| | | 473/450 |
| 2013/0156260 A1 | 6/2013 | Craig |
| 2013/0253700 A1 | 9/2013 | Carson et al. |
| 2013/0322767 A1 | 12/2013 | Chao et al. |
| 2014/0139633 A1 | 5/2014 | Wang et al. |
| 2014/0139655 A1 | 5/2014 | Mimar |
| 2014/0259056 A1 | 9/2014 | Grusd |
| 2014/0279294 A1 | 9/2014 | Field-Darragh et al. |
| 2014/0282162 A1 | 9/2014 | Fein et al. |
| 2014/0334675 A1* | 11/2014 | Chu ........................ G06T 7/246 |
| | | 382/103 |
| 2014/0362195 A1 | 12/2014 | Ng-Thow-Hing et al. |
| 2014/0362223 A1 | 12/2014 | LaCroix et al. |
| 2014/0379296 A1 | 12/2014 | Nathan et al. |
| 2015/0019391 A1 | 1/2015 | Kumar et al. |
| 2015/0039458 A1 | 2/2015 | Reid |
| 2015/0073907 A1 | 3/2015 | Purves et al. |
| 2015/0131851 A1 | 5/2015 | Bernal et al. |
| 2015/0206188 A1 | 7/2015 | Tanigawa et al. |
| 2015/0262116 A1 | 9/2015 | Katircioglu et al. |
| 2015/0269143 A1 | 9/2015 | Park et al. |
| 2015/0294483 A1 | 10/2015 | Wells et al. |
| 2016/0003636 A1 | 1/2016 | Ng-Thow-Hing et al. |
| 2016/0125245 A1 | 5/2016 | Saitwal et al. |
| 2016/0127641 A1 | 5/2016 | Gove |
| 2016/0292881 A1 | 10/2016 | Bose et al. |
| 2016/0307335 A1 | 10/2016 | Perry et al. |
| 2017/0116473 A1 | 4/2017 | Sashida et al. |
| 2017/0206669 A1 | 7/2017 | Saleemi et al. |
| 2017/0262994 A1 | 9/2017 | Kudriashov et al. |
| 2017/0278255 A1 | 9/2017 | Shingu et al. |
| 2017/0309136 A1 | 10/2017 | Schoner |
| 2017/0323376 A1 | 11/2017 | Glaser et al. |
| 2017/0345165 A1 | 11/2017 | Stanhill et al. |
| 2017/0353661 A1* | 12/2017 | Kawamura ............ G06V 20/10 |
| 2018/0025175 A1 | 1/2018 | Kato |
| 2018/0070056 A1 | 3/2018 | DeAngelis et al. |
| 2018/0084242 A1 | 3/2018 | Rublee et al. |
| 2018/0164103 A1 | 6/2018 | Hill |
| 2018/0165728 A1 | 6/2018 | McDonald et al. |
| 2018/0218515 A1 | 8/2018 | Terekhov et al. |
| 2018/0315329 A1 | 11/2018 | D'Amato et al. |
| 2018/0343442 A1 | 11/2018 | Yoshikawa et al. |
| 2019/0102044 A1 | 4/2019 | Wang et al. |
| 2019/0156277 A1 | 5/2019 | Fisher et al. |
| 2019/0158801 A1* | 5/2019 | Matsubayashi ...... H04N 13/111 |
| 2019/0315329 A1 | 10/2019 | Adamski et al. |
| 2020/0005490 A1 | 1/2020 | Paik et al. |
| 2020/0043086 A1 | 2/2020 | Sorensen |
| 2020/0090484 A1 | 3/2020 | Chen et al. |
| 2020/0381111 A1 | 12/2020 | Huang et al. |
| 2021/0019914 A1 | 1/2021 | Lipchin et al. |

FOREIGN PATENT DOCUMENTS

| | | | | |
|---|---|---|---|---|
| JP | 2013196199 A | | 9/2013 | |
| JP | 201489626 A | | 5/2014 | |
| JP | 2018207336 A | * | 12/2018 | ........... H04N 13/117 |
| JP | 2019018743 A | * | 2/2019 | |
| JP | 2019096996 A | * | 6/2019 | ............... G06T 1/00 |
| KR | 20170006097 A | * | 1/2017 | |
| WO | 0021021 A1 | | 4/2000 | |
| WO | 02059836 A2 | | 8/2002 | |
| WO | 2017151241 A2 | | 9/2017 | |

OTHER PUBLICATIONS

Grinciunaite, A., et al., "Human Pose Estimation in Space and Time Using 3D CNN," ECCV Workshop on Brave New Ideas for Motion Representations in Videos, Oct. 19, 2016, URL: https://arxiv.org/pdf/1609.00036.pdf, 7 pages.

He, K., et al., "Identity Mappings in Deep Residual Networks," ECCV 2016 Camera-Ready, URL: https://arxiv.org/pdf/1603.05027.pdf, Jul. 25, 2016, 15 pages.

Redmon, J., et al., "You Only Look Once: Unified, Real-Time Object Detection," University of Washington, Allen Institute for AI, Facebook AI Research, URL: https://arxiv.org/pdf/1506.02640.pdf, May 9, 2016, 10 pages.

Redmon, Joseph and Ali Farhadi, "YOL09000: Better, Faster, Stronger," URL: https://arxiv.org/pdf/1612.08242.pdf, Dec. 25, 2016, 9 pages.

Toshev, Alexander and Christian Szegedy, "DeepPose: Human Pose Estimation via Deep Neural Networks," IEEE Conference on Computer Vision and Pattern Recognition, Aug. 20, 2014, URL: https://arxiv.org/pdf/1312.4659.pdf, 9 pages.

(56) References Cited

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

Ciplak G, Telceken S., "Moving Object Tracking Within Surveillance Video Sequences Based on EDContours," 2015 9th International Conference on Electrical and Electronics Engineering (ELECO), Nov. 26, 2015 (pp. 720-723). IEEE.

Cristian Pop, "Introduction to the BodyCom Technology", Microchip AN1391, May 2, 2011, pp. 1-24, vol. AN1391, No. DS01391A, Publisher: 2011 Microchip Technology Inc.

Fuentes et al., "People tracking in surveillance applications," Proceedings 2nd IEEE Int. Workshop on PETS, Kauai, Hawaii, USA, Dec. 9, 2001, 6 pages.

Manocha et al., "Object Tracking Techniques for Video Tracking: A Survey," The International Journal of Engineering and Science (IJES), vol. 3, Issue 6, pp. 25-29, 2014.

Phalke K, Hegadi R., "Pixel Based Object Tracking," 2015 2nd International Conference on Signal Processing and Integrated Networks (SPIN), Feb. 19, 2015 (pp. 575-578). IEEE.

Sikdar A, Zheng YF, Xuan D., "Robust Object Tracking in the X-Z Domain," 2016 IEEE International Conference on Multisensor Fusion and Integration for Intelligent Systems (MFI), Sep. 19, 2016 (pp. 499-504). IEEE.

Black, J. et al., "Multi View Image Surveillance and Tracking," IEEE Proceedings of the Workshop on Motion and Video Computing, 2002, https://www.researchgate.net/publication/4004539_Multi_view_image_surveillance_and_tracking/link/0c96051ac521f09b5b000000/download, pp. 1-6.

Harville, M.,"Stereo Person Tracking with Adaptive Plan-View Templates of Height and Occupancy Statistics," Image and Vision Computing, vol. 22, Issue 2, Feb. 1, 2004, https://www.researchgate.net/publication/223214495_Stereo_person_tracking_with_adaptive_plan-view_templates_of_height_and_occupancy_statistics/link/5e294888a6fdcc70a1437262/download, pp. 127-142.

Huang, K. S. et al. "Driver's View and Vehicle Surround Estimation Using Omnidirectional Video Stream," IEEE IV2003 Intelligent Vehicles Symposium. Proceedings (Cal. No. 03TH8683), Jun. 9-11, 2003, http://cvrr.ucsd.edu/VOW2/papers/IV03DrView_Final_Header.pdf, pp. 444-449.

Longuet-Higgins, H.C., "A Computer Algorithm for Reconstructing a Scene from Two Projections," Nature 293, Sep. 10, 1981, https://cseweb.ucsd.edu/classes/fa01/cse291/hclh/SceneReconstruction.pdf, pp. 133-135.

Rossi, M. and Bozzoli, E. A., "Tracking and Counting Moving People," IEEE Int'l Conf. on Image Processing, ICIP-94, Nov. 13-16, 1994, http://citeseerx.ist.psu.edu/viewdoc/download;jsessionid=463D09F419FA5595DBF9DEF30D7EC663?doi=10.1.1.331.6672&rep=rep1&type=pdf, 5 pages.

Vincze, M., "Robust Tracking of Ellipses at Frame Rate," Pattern Recognition, vol. 34, Issue 2, Feb. 2001, pp. 487-498.

Zhang, Z., "A Flexible New Technique for Camera Calibration," IEEE Transactions on Pattern Analysis and Machine Intelligence, vol. 22, No. 11, Nov. 2000, 5 pages.

Zhang, Z., "A Flexible New Technique for Camera Calibration," Technical Report MSR-TR-98-71, Microsoft Research, Microsoft Corporation, microsoft.com/en-us/research/wp-content/uploads/2016/02/tr98-71.pdf, 22 pages.

Liu, C., et al. "Accelerating Vanishing Point-Based Line Sampling Scheme for Real-Time People Localization", IEEE Transactions on Circuits and Systems for Video Technology. vol 27. No. Mar. 3, 2017 (Year: 2017).

\* cited by examiner

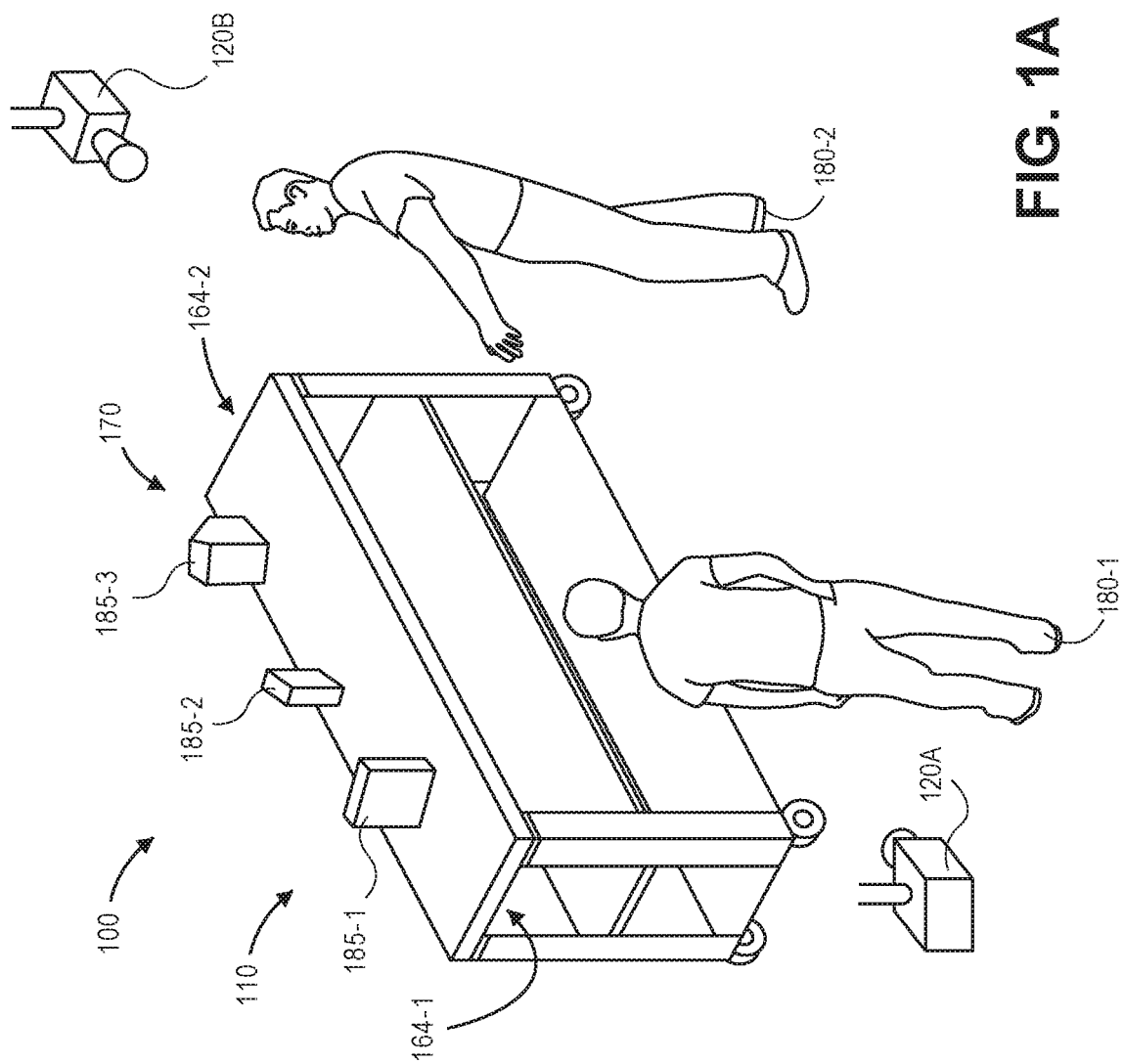

IMAGE CAPTURED BY CAMERA 1 AT TIME $t_1$ PROCESSED TO DETECT AND LOCATE POSITIONS OF ACTORS ON GROUND PLANE

IMAGE CAPTURED BY CAMERA 2 AT TIME $t_1$ PROCESSED TO DETECT AND LOCATE POSITIONS OF ACTORS ON GROUND PLANE

TRAJECTORIES OF ACTORS
GENERATED BY CAMERA 2

MULTI-CAMERA TRACKER GENERATES TRAJECTORIES OF ACTORS PROJECTED ON GROUND PLANE BASED ON TRAJECTORIES AND VISUAL DESCRIPTORS RECEIVED FROM CAMERAS

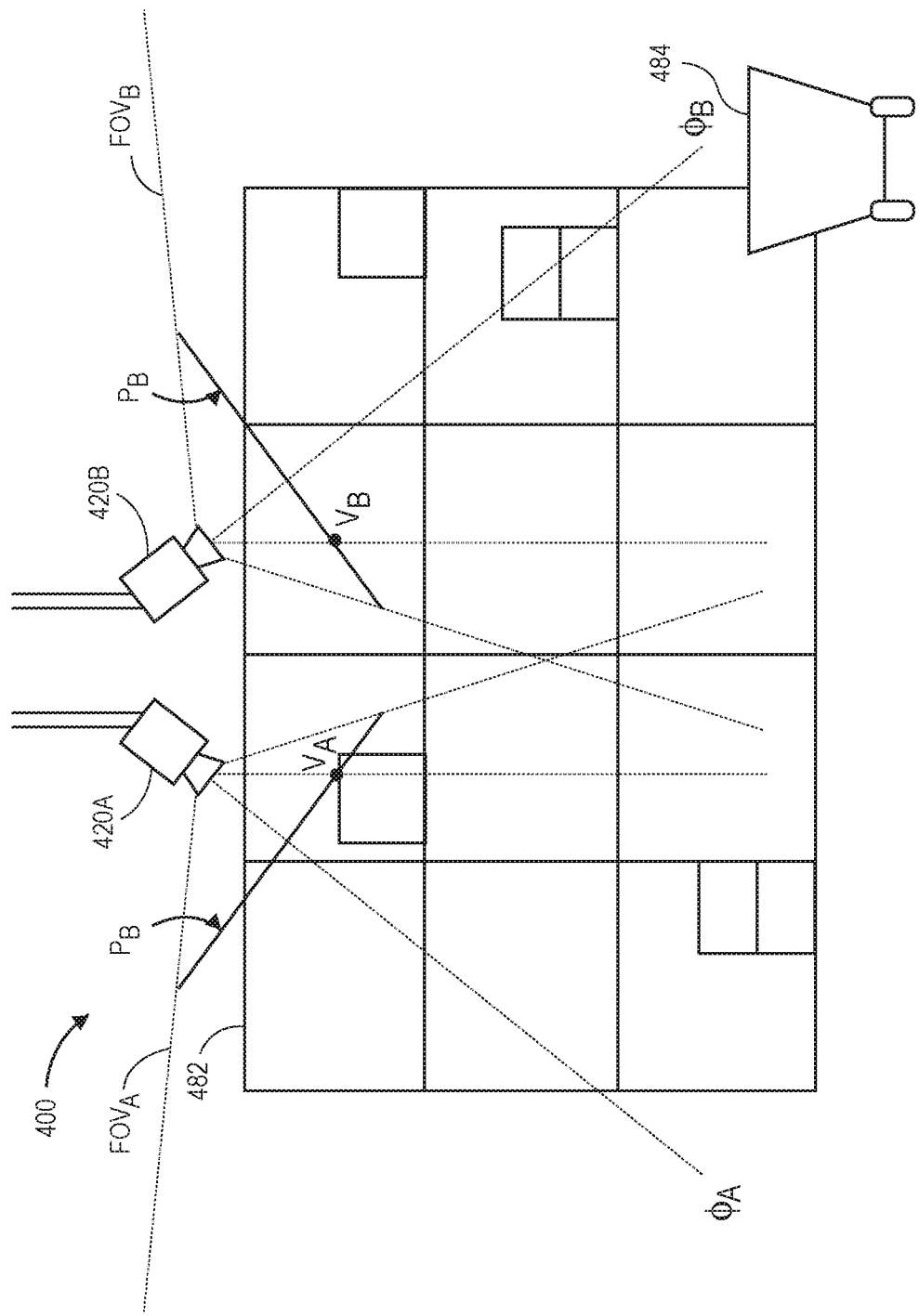

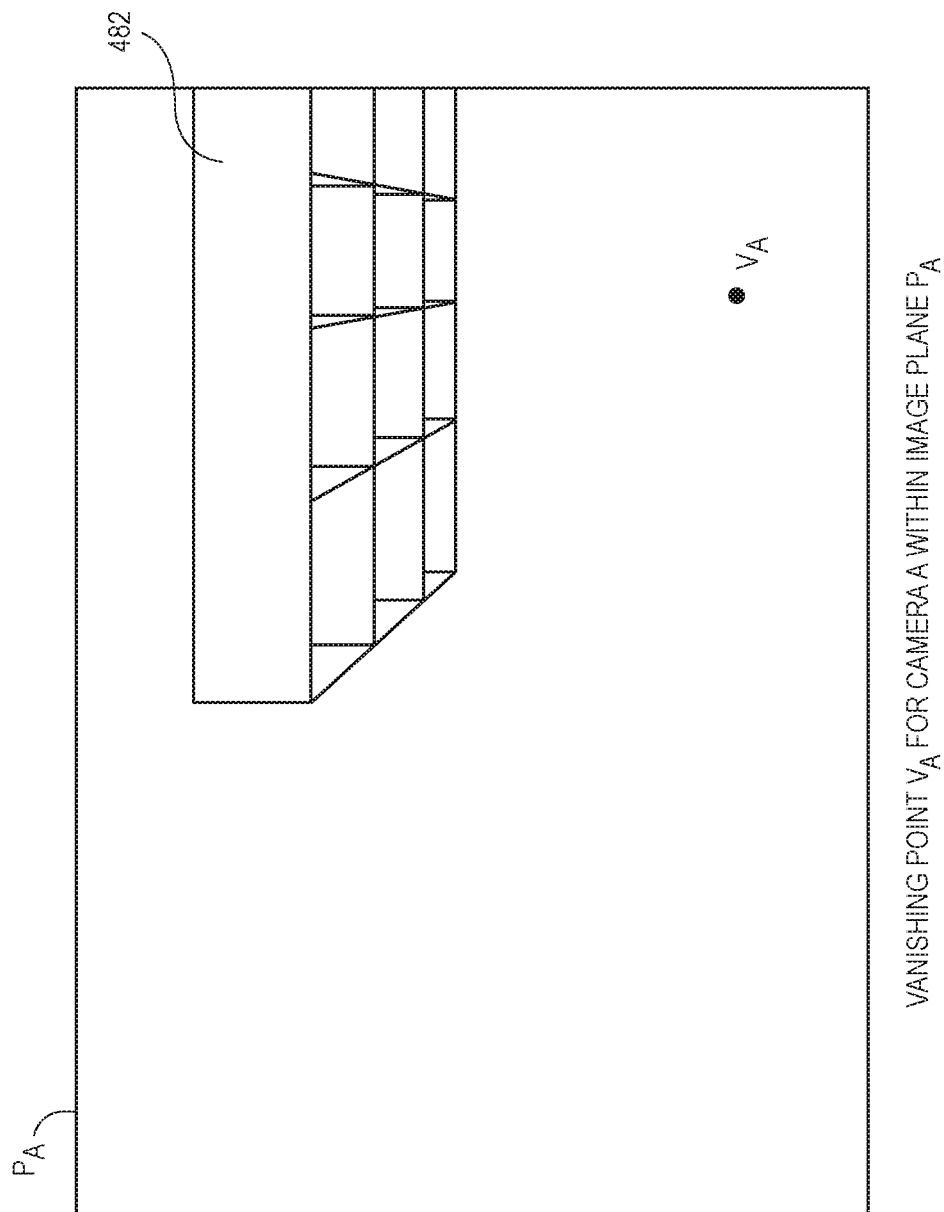

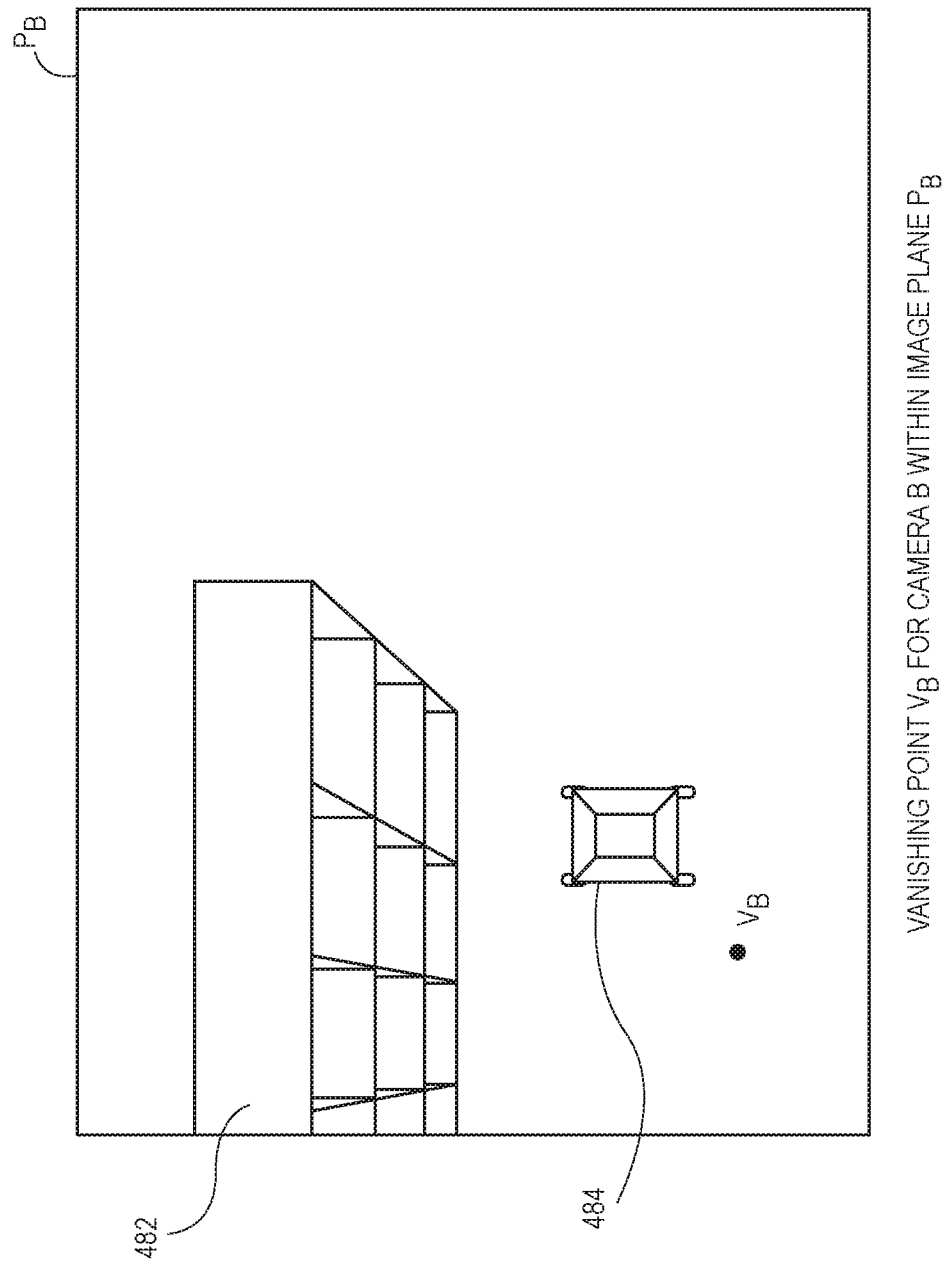

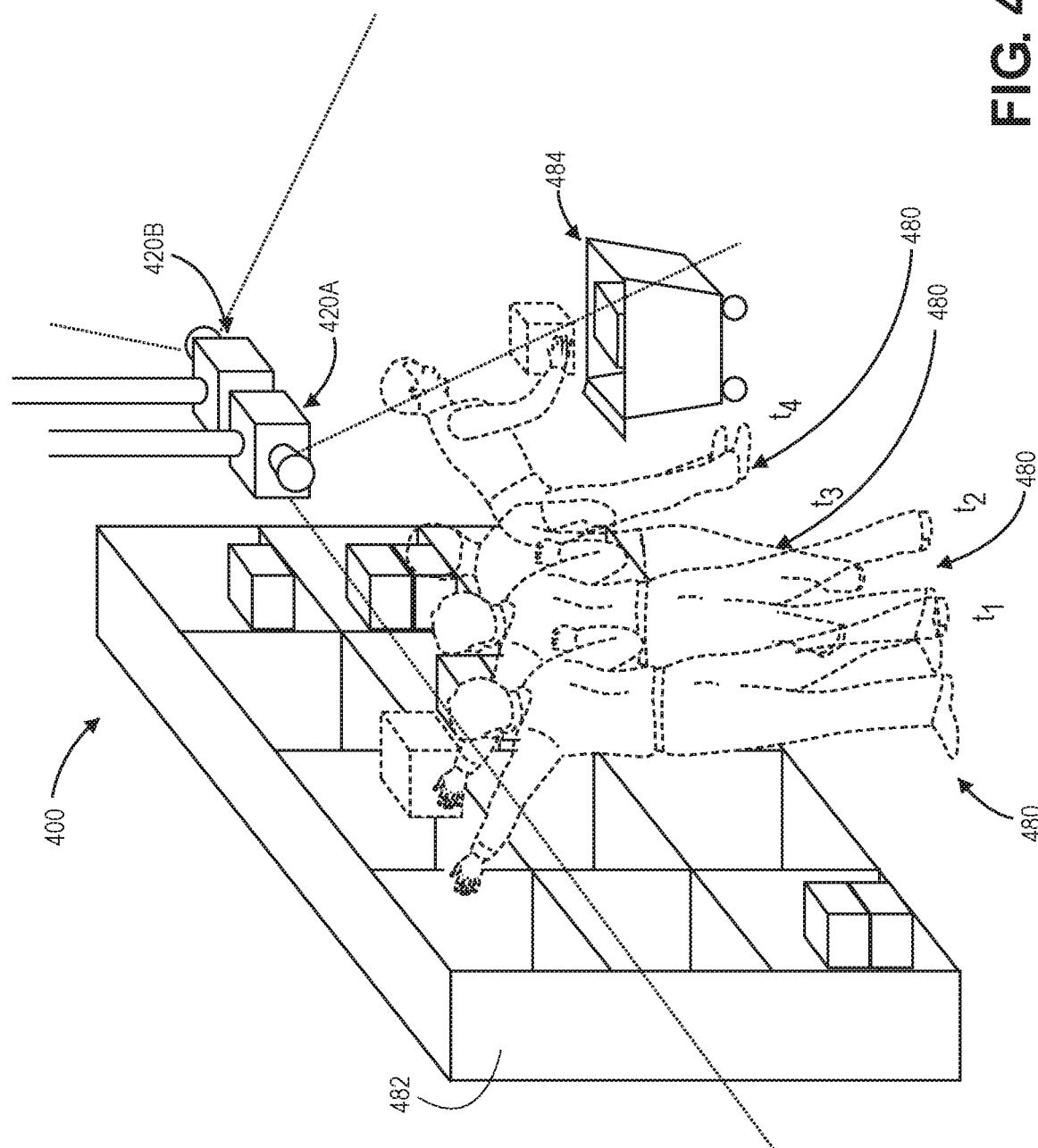

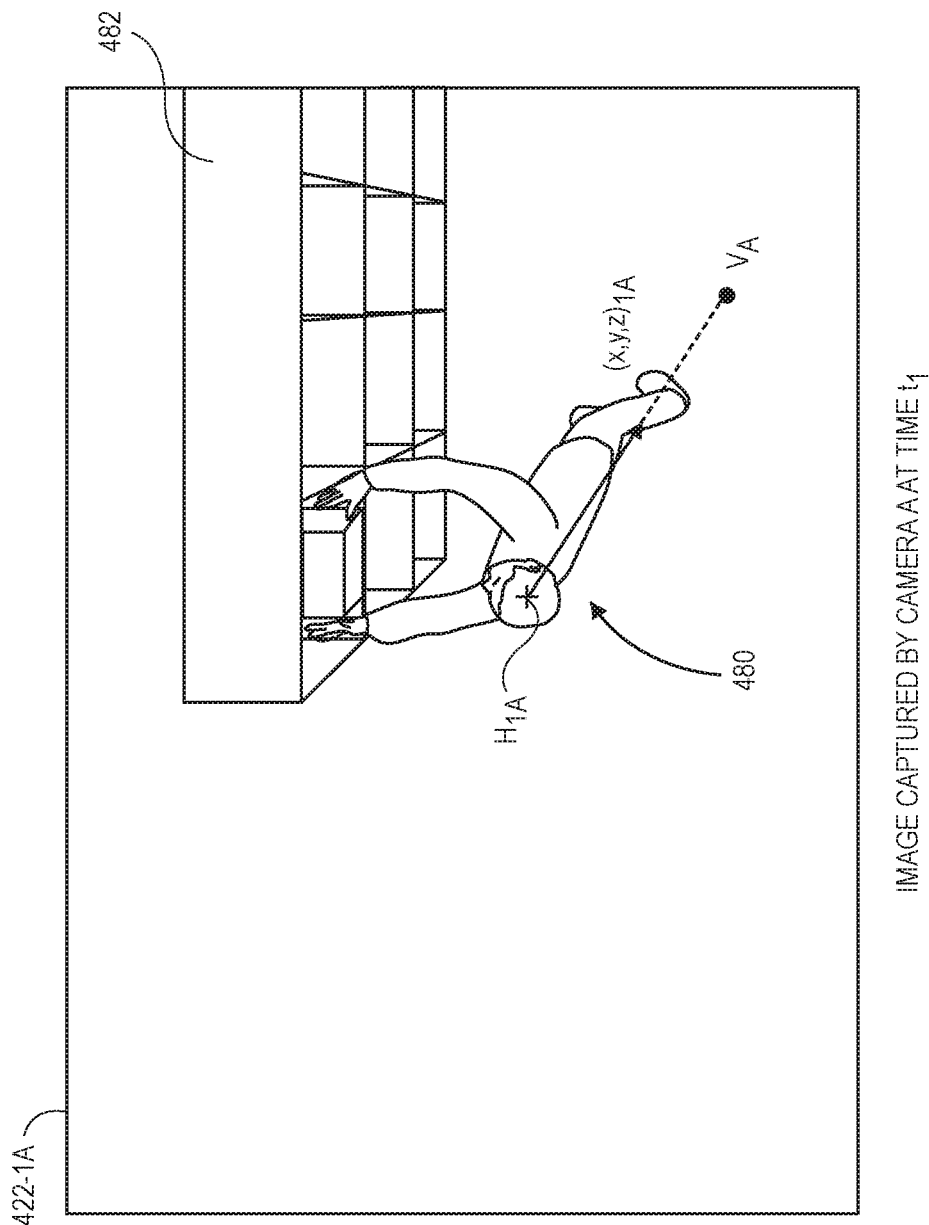

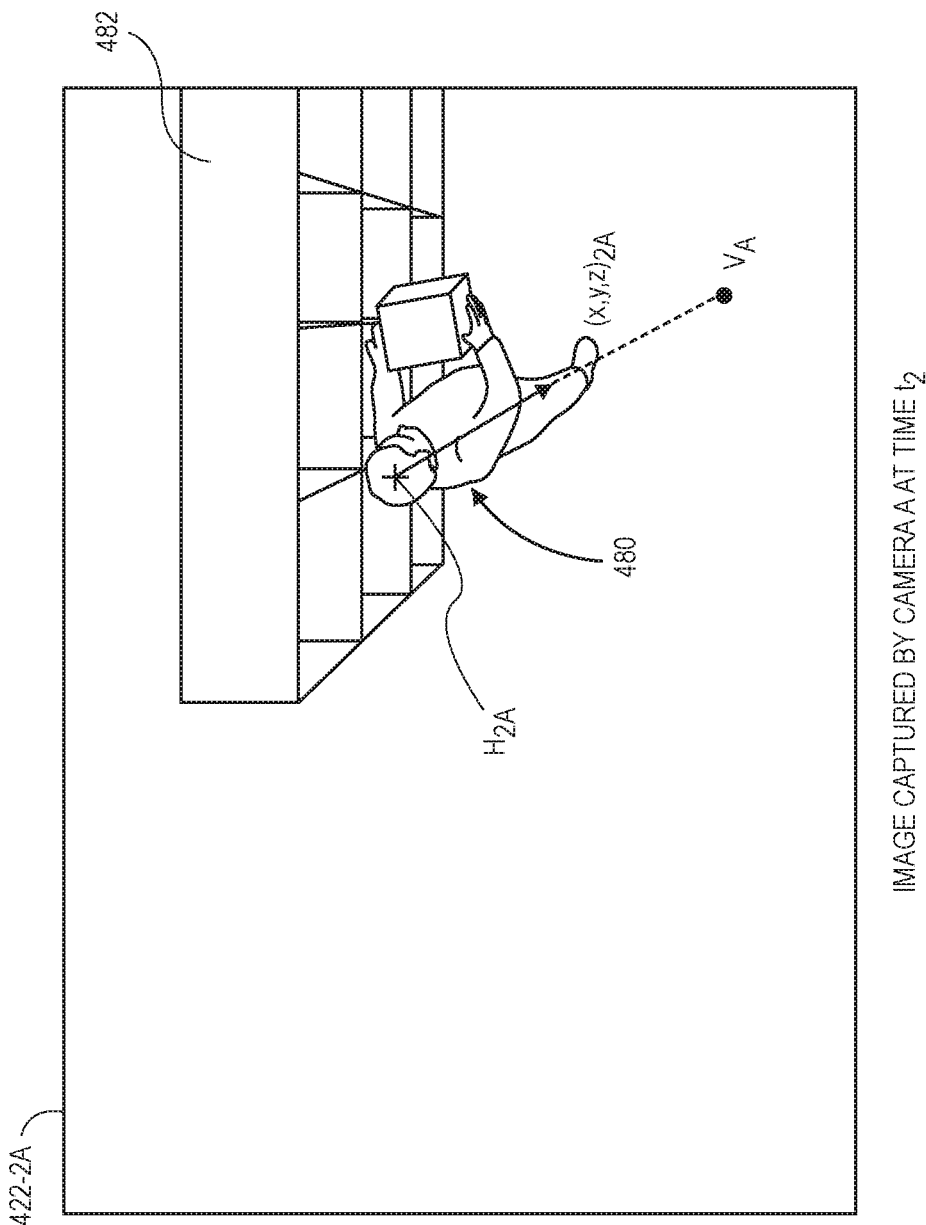

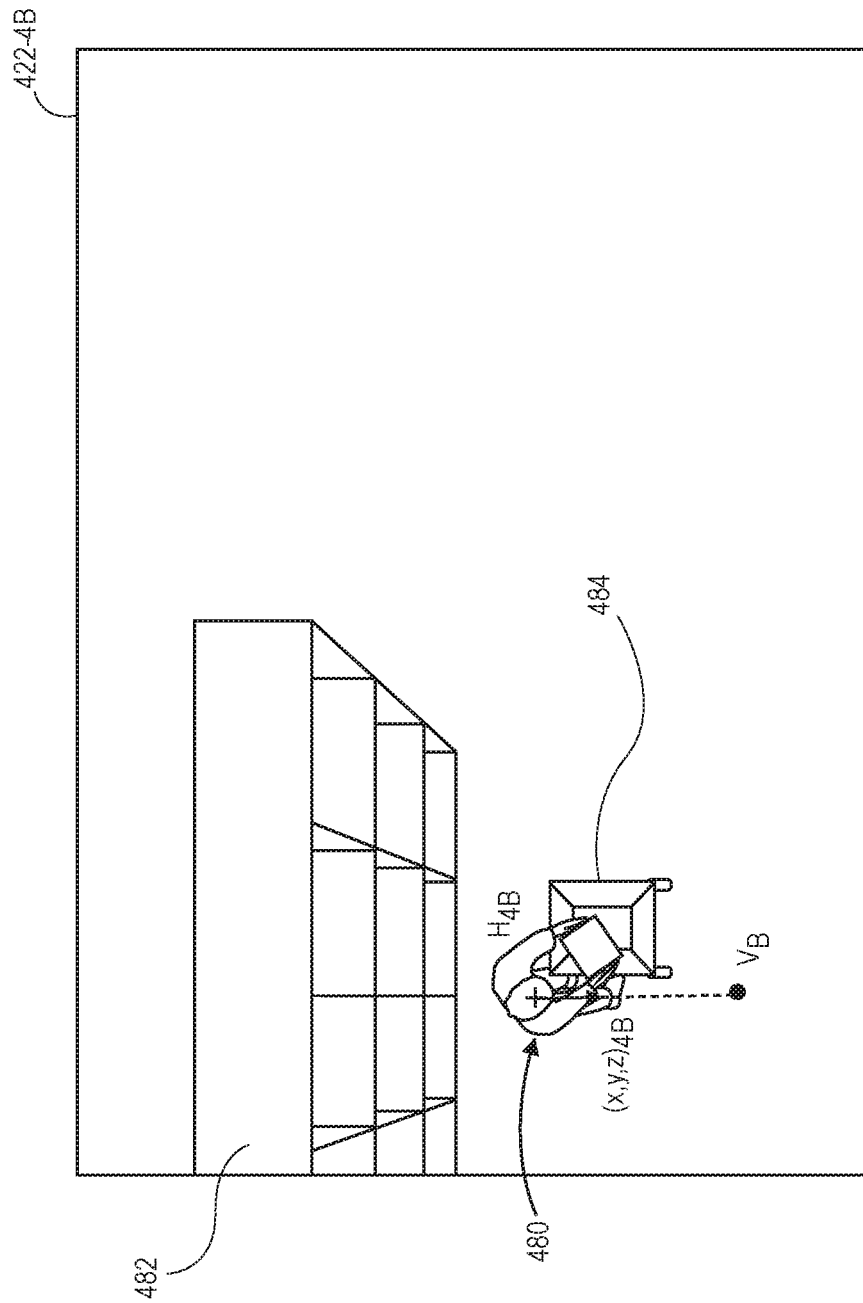

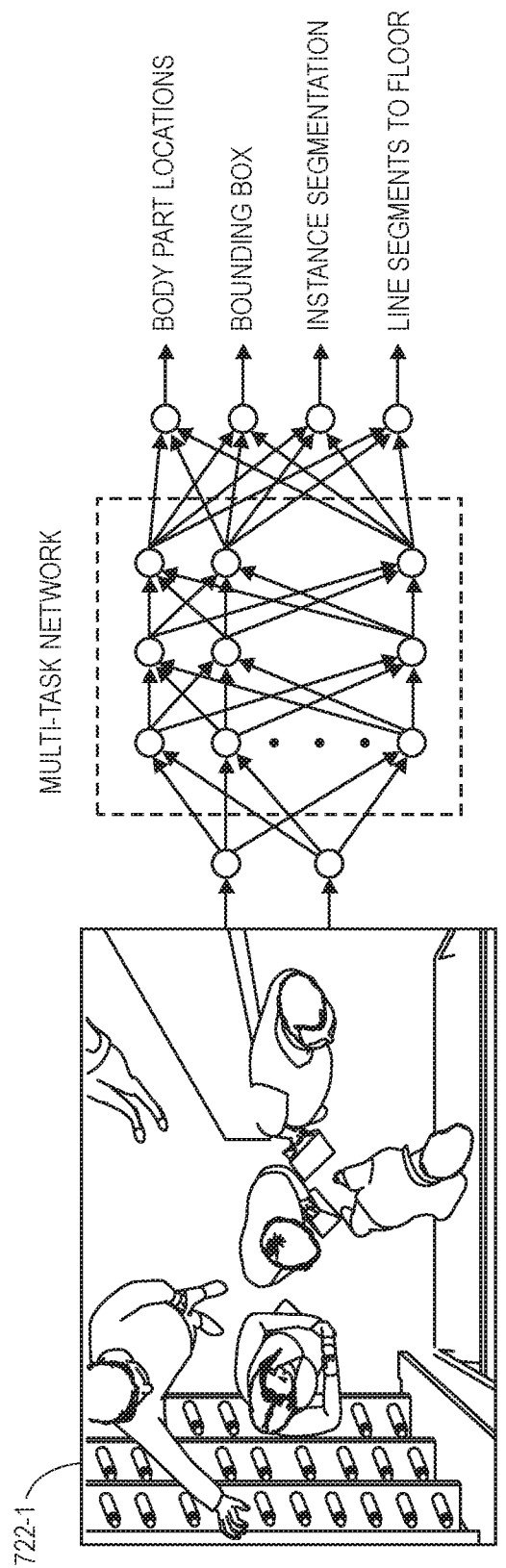

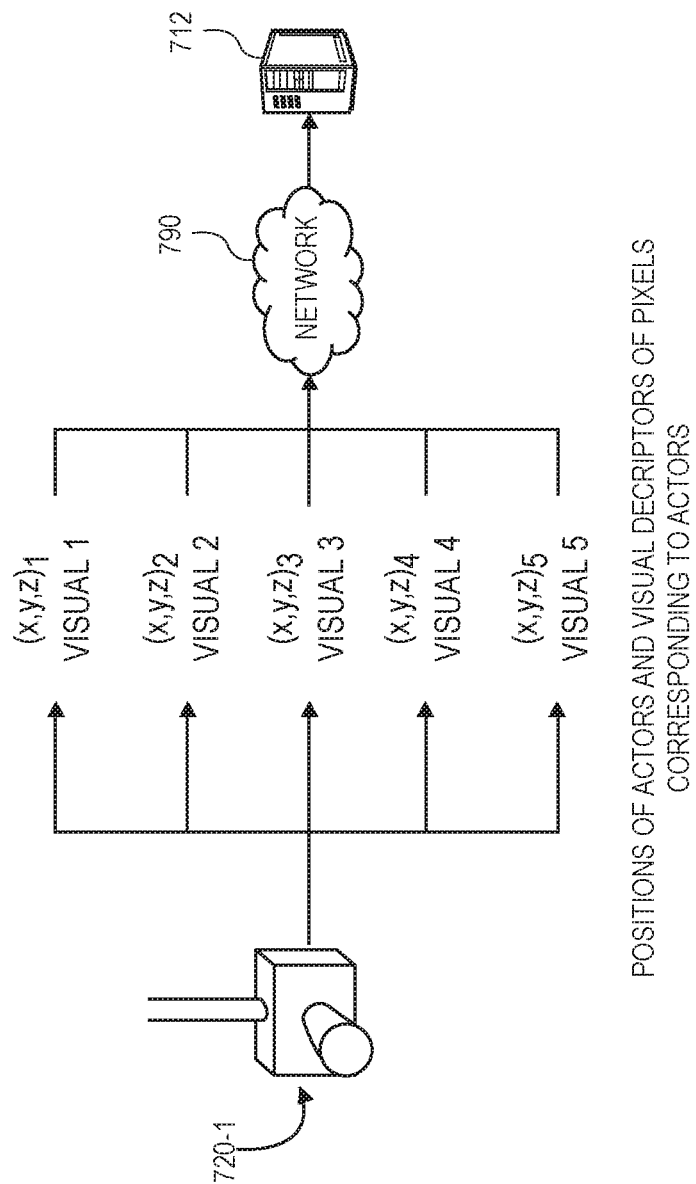

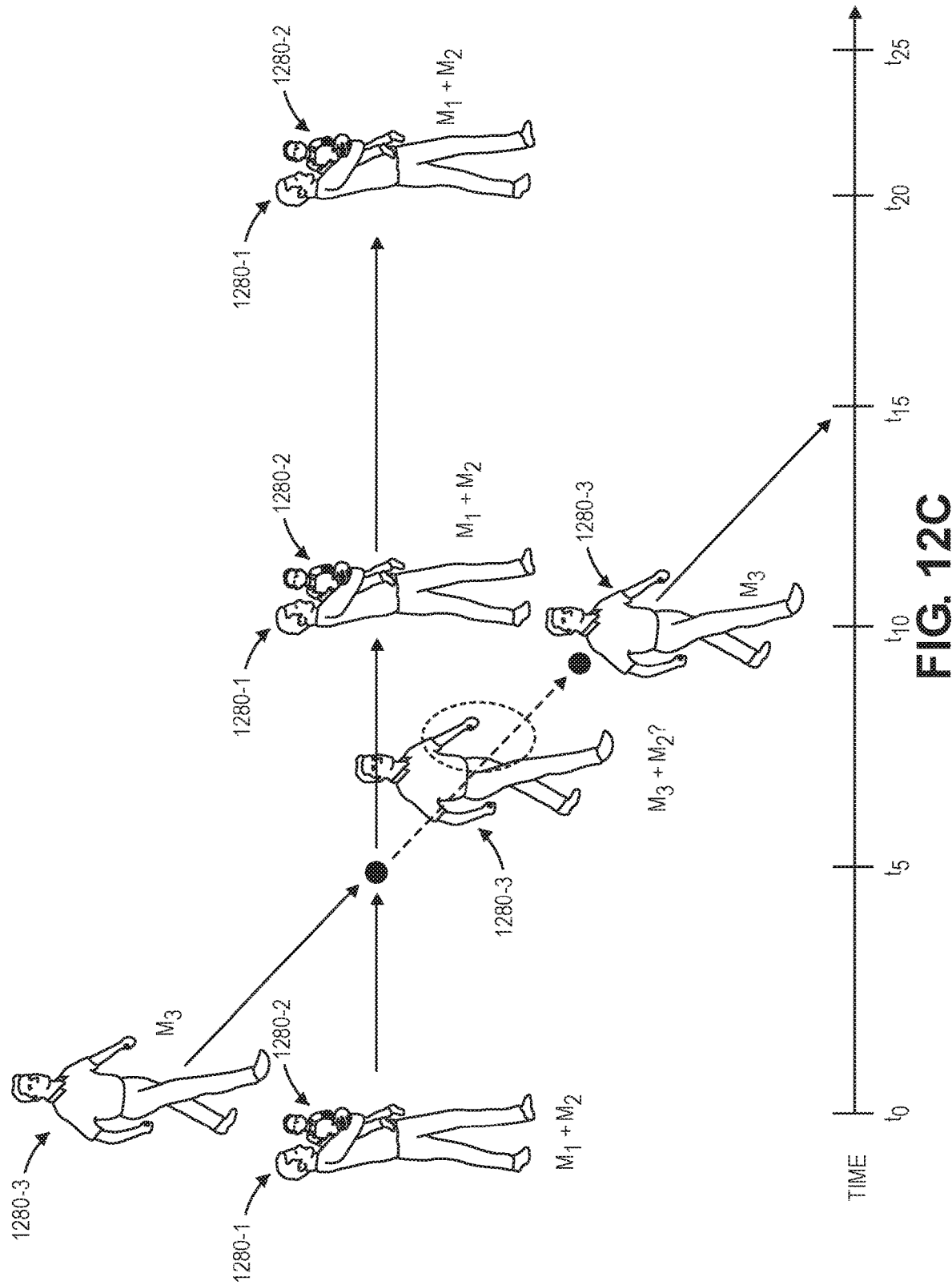

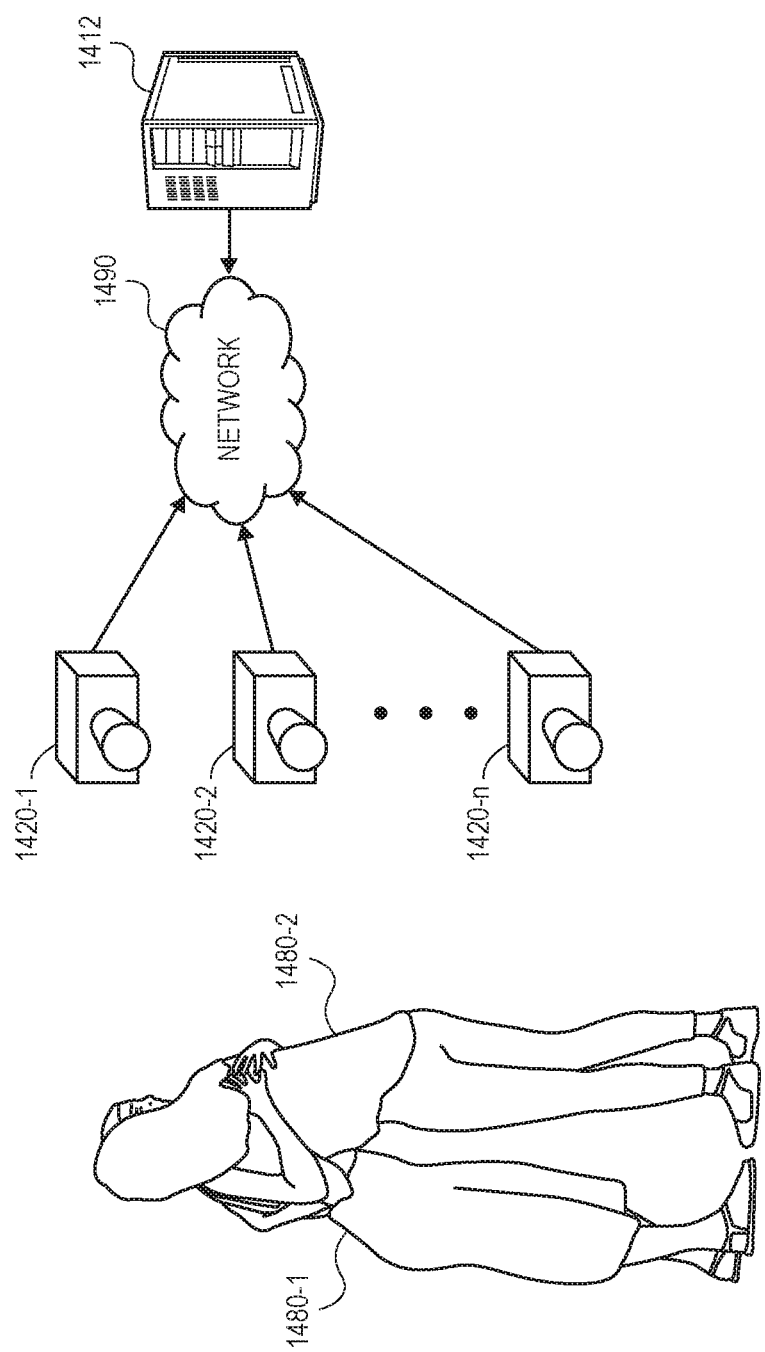

SYSTEM TRAJECTORIES PROXIMATE TO ONE ANOTHER ADOPT
IDENTIFIERS FROM CONFUSION SETS OF NEIGHBORING TRAJECTORIES

IDENTIFIER IN CONFUSION SET RECEIVED FROM CAMERA RESOLVED TO CORRESPOND TO OTHER SYSTEM TRAJECTORY

LOCALLY AND GLOBALLY LOCATING ACTORS BY DIGITAL CAMERAS AND MACHINE LEARNING

BACKGROUND

Today, imaging devices are used for detecting and locating objects, such as actors, in any number of applications. For example, digital cameras are often used to monitor the arrivals or departures of goods or performances of services in materials handling facilities such as warehouses, fulfillment centers, retail establishments or other like facilities. Digital cameras are also used to monitor the travels of persons or objects in locations such as airports, stadiums or other dense environments, or on one or more sidewalks, roadways or highways. Digital cameras are also frequently installed and used in financial settings such as banks or casinos, where money changes hands in large amounts, at high rates of speed, or between large numbers of people.

In dynamic environments such as materials handling facilities, transportation centers, financial institutions or like structures, it is frequently difficult to detect and locate large numbers of objects or actors using digital cameras. Many systems for detecting and locating objects or actors in three-dimensional (or "3D") space rely on large numbers of individual digital cameras to capture imaging data (e.g., visual images of an object, or depth images or other samples of depths or ranges to the object), and to provide such data to servers or other centralized systems. Such servers or other systems may generate models of objects from the visual imaging data and the depth imaging data, such as textured polygonal meshes.

Generating 3D models of objects, such as actors, based on imaging data captured from large numbers of digital cameras may be a computationally expensive process that tends to consume or occupy substantial amounts of available data storage, processing and transmission capacities, and may require comparatively lengthy processing times. Therefore, in environments where objects that are to be located are large in number or small in size, located in tight or crowded quarters or moving at high speeds, generating 3D models of such objects and locating such objects within 3D space based on imaging data received from multiple digital cameras is currently a complex and challenging task.

BRIEF DESCRIPTION OF THE DRAWINGS

FIGS. 1A through 1K are views of aspects of one system for locating actors in accordance with implementations of the present disclosure.

FIGS. 4A through 4M are views of aspects of one system for locating actors in accordance with implementations of the present disclosure.

FIGS. 7A through 7D are views of aspects of one system for locating actors in accordance with implementations of the present disclosure.

FIGS. 12A through 12F are views of aspects of one system for locating actors in accordance with implementations of the present disclosure.

FIGS. 14A through 14E are views of aspects of one system for locating actors in accordance with implementations of the present disclosure.

DETAILED DESCRIPTION

Figure 1B:
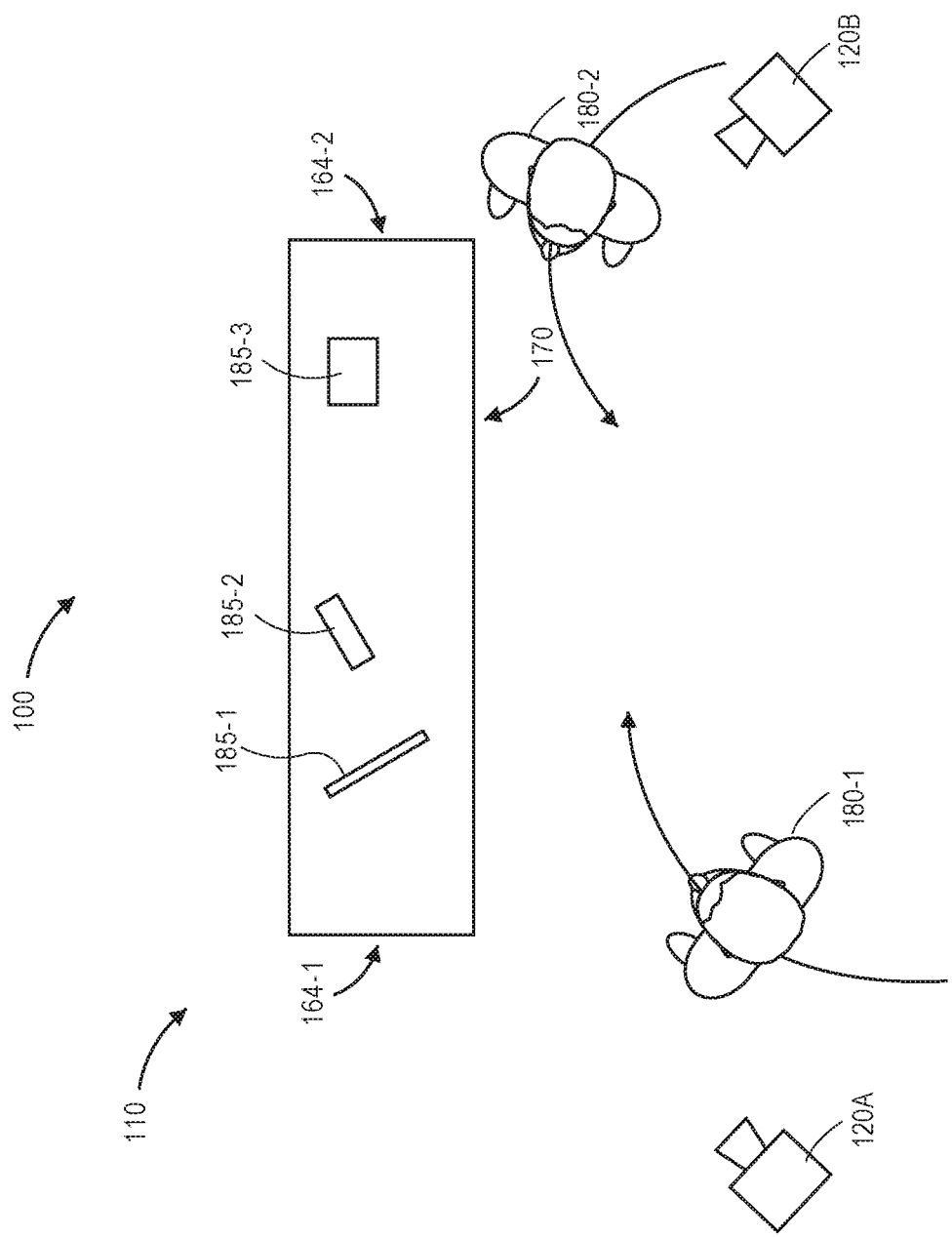

As is set forth in greater detail below, the present disclosure is directed to systems and methods for locally and globally locating actors using imaging devices and machine learning. More specifically, one or more implementations of the present disclosure are directed to distributed systems having cameras or other imaging devices that are programmed or configured to detect and locate objects, such as human actors, that are depicted within imaging data (e.g., visual imaging data) captured by the cameras. Each of the cameras may operate one or more machine learning tools to execute tasks on the imaging data, including but not limited to detecting body parts (e.g., heads) of actors within images, identifying portions of the images (e.g., sets of pixels) corresponding to the actors, or predicting positions of the actors in 3D space based on locations of the detected body parts with respect to vertical vanishing points associated with such images. For example, where a head of an actor is detected within an image, a position of the actor on a floor surface (or other ground surface) may be predicted based on a line segment aligned along a line between a location of the head and a location of a vertical vanishing point associated with the image, e.g., within a field of view or beyond the field of view of a camera, with a proximal end of the line segment corresponding to the head within the image, and a distal end of the line segment corresponding to the position of the actor on the floor surface.

Each of the cameras in a network may utilize sets of pixels corresponding to actors, as determined from body part detections, bounding boxes, or instance segmentations, as well as predicted positions of actors depicted within the images, and to identify sets of visual descriptors of the pixels depicting the actors, including but not limited to descriptors of the appearances (such as colors, textures, or other visual attributes) of such pixels, or descriptors of the motion (such as positions, velocities or accelerations) of the actors. A camera trajectory may be generated immediately (e.g., in real time or in near-real time) upon detecting an actor in a single image, or after the actor has been detected in any number of images to a sufficiently high degree of confidence.

Based on the positions of the actors, and the visual descriptors of pixels corresponding to the actors, the cameras may determine whether or which of the detections of actors depicted within pairs of images captured thereby at different times may be correlated with one another on a temporal basis. For example, where visual descriptors of pixels corresponding to an actor are identified in one image, a camera may generate or update a trajectory upon determining that the visual descriptors of the pixels corresponding to the actor are present in another image. Additionally, the cameras may assign unique identifiers (e.g., camera identifiers, object identifiers, or scene identifiers), to each of the detections or trajectories generated thereby, and also calculate scores or factors indicative of levels of confidence in the respective detections or trajectories.

The cameras may then provide their respectively determined trajectories of actors, and visual descriptors of pixels corresponding to such actors, to a server or another system that is programmed or configured to determine which of the trajectories received from the cameras may be correlated with one another, based on their respective positions, appearances or motion, or the levels of confidence in the detections or trajectories. For example, where a camera detects an actor depicted within an image, and determines a position in 3D space of the actor, e.g., based on a line segment extending from a head or other body part of the actor to a floor surface, a camera trajectory for the actor may be correlated with a camera trajectory similarly generated by another camera, where the positions in 3D space of the actor are sufficiently proximate to one another, or where visual descriptors of sets of pixels corresponding to the actor are sufficiently similar to one another.

The server or other system may generate a trajectory (e.g., a system trajectory) from one or more trajectories received from the cameras that are correlated, and assign a unique identifier (e.g., a system identifier, or a global identifier) to that system trajectory. Once the server or other system generates a system trajectory, based on trajectories and visual descriptors received from one or more cameras, the server or other system may associate the trajectory with an actor who is known to be located on the scene.

Cameras may generate trajectories of actors and determine visual descriptors of pixels corresponding to the actors that are detected within imaging data, e.g., based on each of the images captured thereby, and provide such trajectories and visual descriptors to a server or other system in real time or in near-real time. Where a level of confidence in a detection or a trajectory of an actor generated by a camera remains above a predetermined threshold or limit, a server or other system may utilize the trajectory to locate the actor on the scene, e.g., at a time that an image was captured, or in subsequently captured images, and may update a position of the actor accordingly based on the trajectory. Where a level of confidence in a detection or a trajectory of a given actor generated by a camera falls below the predetermined threshold or limit, however, an identifier of the actor or the trajectory (e.g., a camera identifier, an object identifier, or a scene identifier) may be assigned to a set of data, a record or a file associated with one or more neighboring actors or trajectories. This set of data may be called a "confusion set."

Where a given actor is no longer detected, or is detected at a low level of confidence, and an identifier of the actor or a trajectory generated for the actor is assigned to another actor or trajectory, e.g., by adding the identifier of the actor or the trajectory to a set of data, a record or a file associated with one or more neighboring actors or trajectories, e.g., a "confusion set," the actors or the trajectories may be determined to be in a "tangled state." An identifier of an actor or a trajectory that has been lost or is detected with a low confidence may be propagated along with actors or trajectories that have not been lost, or have been or continue to be detected with sufficiently high confidence. For example, identifiers of actors or trajectories that have been lost or are detected with low confidence may be associated with actors or trajectories that were proximate the actor or the trajectory at a time that the actor or the trajectory was lost or detected with low confidence, or actors or trajectories that approach or pass within a close range of actors or trajectories holding that actor or trajectory in their respective confusion sets. Information or data regarding an actor or a trajectory that is transferred to a server or another system may include identifiers of actors or trajectories in a confusion set of the actor, as well as visual descriptors of pixels corresponding to such actors or trajectories.

Thereafter, where the camera detects an actor within images captured by the camera, visual descriptors of the actor may be compared to visual descriptors of actors or trajectories having identifiers within a confusion set of one or more actors, in order to determine whether the newly detected actor is a previously detected actor that was lost, or was previously detected with a low level of confidence.

For example, where two or more actors embrace (e.g., an adult and a child) or otherwise continue to travel throughout a scene together, their respective trajectories may be effectively merged into one, when at least one of the trajectories is subsequently detected at a low confidence. An identifier of one of the actors or their respective trajectory may be assigned to a trajectory of the other of the actors, or to any other trajectories of nearby actors. Subsequently, if the camera detects an actor, and visual descriptors of pixels corresponding to that actor may be correlated with visual descriptors of pixels corresponding to an actor within one or more "confusion sets" of other actors or trajectories at a sufficiently high level of confidence, the actor may be removed from the "confusion sets" of the other actors, or "untangled" from such actors, and the trajectory and visual descriptors of portions of images (e.g., sets of pixels) corresponding to the actor may be updated with sufficiently high confidence. Cameras may report not only the trajectories and the visual descriptors to a server or other central system, but also whether any of such trajectories includes one or more identifiers of actors in a "confusion set," or whether any of such trajectories is tangled with any other trajectories.

Similarly, a server or other system may attempt to resolve any confusion reported by one or more cameras or to untangle trajectories, where a trajectory or visual descriptors of pixels corresponding to an actor within a confusion set of another actor reported by one of the cameras may be readily correlated with another trajectory or visual descriptors received from another camera. Where an actor or trajectory provided by a camera to a server or other system includes one or more identifiers of actors or trajectories in a confusion set, positions in 3D space or visual descriptors of other actors or trajectories provided by other cameras to the server or other system may be compared to the positions or visual descriptors of the actors or trajectories having identifiers reported within confusion sets of other actors or trajectories. The server or other system may assign the identifiers of the actors or trajectories in the confusion set of an actor or trajectory received from one camera to actor or trajectories received from any number of other cameras, e.g., where the actor or trajectory is proximate to such actors or trajectories, as may be determined from the positions in 3D space of each of such actors and trajectories as reported by the respective cameras. Once an actor or trajectory having an identifier in one or more confusion sets of other actors or trajectories is identified as being associated with a position in 3D space or visual descriptors of sets of pixels corresponding to an actor detected by any of the cameras, the server or other system may remove the identifier of that actor or trajectory from all of the confusion sets in which the identifier resides, thereby resolving any confusion as to a location of that actor or trajectory at the level of the server or the other system.

Thus, the systems and methods of the present disclosure may be utilized to detect and locate actors on a scene, such as a materials handling facility, in 3D space based on trajectories generated by machine learning tools operating on cameras, and visual descriptors of pixels corresponding to actors detected by such cameras, even where an actor is temporarily not detected or located within images captured by one or more cameras. Trajectories may be associated with identifiers of actors who are known to be located on a scene, and events occurring on the scene may be associated with one of the actors based on proximity of a trajectory to a location of an event, or on any other basis.

Referring to FIGS. 1A through 1K, views of aspects of one system 100 for locating actors in accordance with implementations of the present disclosure are shown. As is shown in FIGS. 1A and 1B, the system 100 includes a scene 110 such as a materials handling facility, a fulfillment center, a warehouse, or any other like facility. The scene 110 includes a pair of imaging devices 120A, 120B (e.g., digital cameras) and a storage unit 170 (e.g., a set of inventory shelves) having a plurality of load sensors (or weight sensors) 164-1, 164-2 and a plurality of items 185-1, 185-2, 185-3 on the storage unit 170.

The scene 110 may be any open or enclosed environment or space in which any number of actors (e.g., humans, other animals or machines), e.g., actors 180-1, 180-2, may execute one or more poses, gestures or other actions within the fields of view of the imaging devices 120A, 120B. For example, as is shown in FIG. 1B, the actors 180-1, 180-2 are in motion within a vicinity of the shelving unit 170, and each of the actors 180-1, 180-2 is partially or entirely within the fields of view of the imaging devices 120A, 120B.

In some implementations, the imaging devices 120A, 120B may be calibrated, such that mappings between coordinates of imaging data captured by the imaging devices 120A, 120B and directions relative to their respective image sensors are known. Additionally, the imaging devices 120A, 120B may be installed or otherwise operated independently or as components of an imaging device network (or camera network). For example, the imaging devices 120A, 120B may be in communication with one or more computer devices or systems (not shown in FIGS. 1A and 1B), e.g., over one or more computer networks. As is also shown in FIGS. 1A and 1B, the load sensors 164-1, 164-2 may be disposed beneath or otherwise in association with one or more of the shelves of the shelving unit 170, or one or more supports of such shelves, and may also be in communication with one or more computer devices or systems (not shown), which may further include one or more databases or other data stores having information regarding attributes that are, have been or might be stored on one or more of the shelves of the shelving unit 170, e.g., the items 185-1, 185-2, 185-3. In some implementations, the attributes may include, but are not limited to, dimensions and/or masses of items, locations on the shelving unit 170 where items are typically placed, or colors or textures of surface elements (e.g., packaging, wrapping, coverings or the like) of items, or any other attributes.

The load sensors 164-1, 164-2 may be load cells or other systems that are configured to generate load signals consistent with levels of loading on one or more of the shelves of the storage unit 170, and such signals may be processed to determine weights of items placed thereon, or changes in such weights. Any number of load sensors may be provided in association with the storage unit 170, in various layouts, configurations or positions. For example, in some implementations, load sensors may be provided symmetrically or asymmetrically, with one or more of such sensors provided at front or rear sides of the storage unit 170, or one or more of such sensors provided on left or right sides of the storage unit 170. Additionally, in some implementations, the storage unit 170 may be outfitted generally with one or more sets of such load sensors that may be configured to generate load signals consistent with levels of loading on the storage unit 170 as a whole. Alternatively, in some other implementations, one or more of the shelves of the shelving unit 170 may be respectively outfitted with load sensors that may be configured to generate load signals consistent with levels of loading on each of the respective shelves of the shelving unit.

In some implementations, the system 100 may operate without the use of the load sensors 164-1, 164-2, or any other sensors, and may rely instead on imaging data or other data captured by the imaging devices 120A, 120B, or any other imaging devices or other sensors (not shown), to determine whether one or more items have been placed on or removed from the shelving unit 170, or to identify one or more of such items.

Figure 1C:
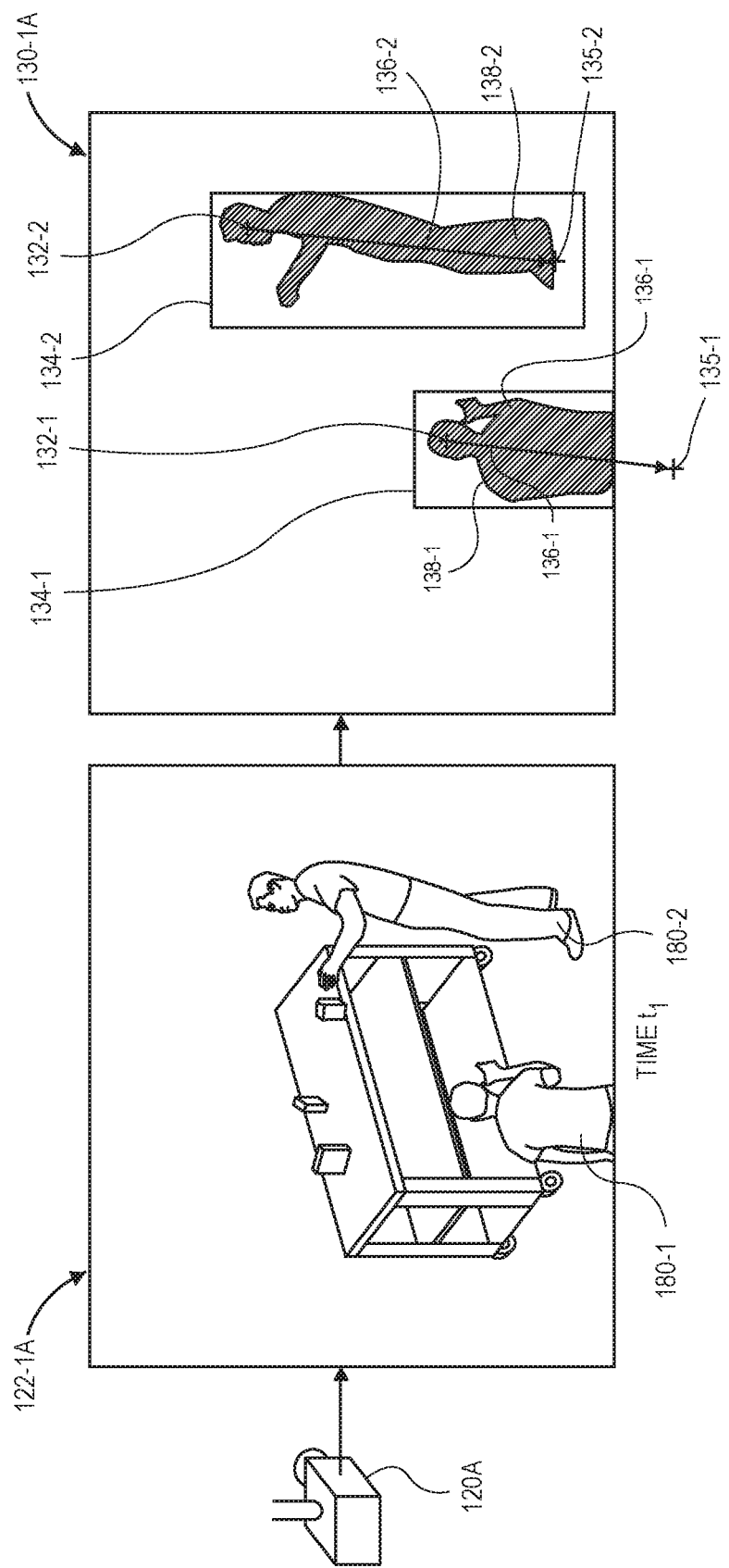

In accordance with implementations of the present disclosure, a camera may capture one or more images, and process such images, e.g., by machine learning, to detect heads or other body parts of actors, to identify sets of pixels corresponding to such actors, such as by generating bounding boxes around portions of the images corresponding to the actors, or performing instance segmentations on the images, or to predict positions of the actors based on locations of the heads or other body parts with respect to vertical vanishing points associated with such images, which may be within or beyond fields of view of the camera that captured the images. As is shown in FIG. 1C, the camera 120A captures an image 122-1A at a time $t_1$ and processes the image 122-1A, e.g., by machine learning or in any other manner, to generate a set of data 130-1A regarding contents of the image 122-1A. For example, as is shown in FIG. 1C, the set of data 130-1A may include a location of a body part 132-1 of the actor 180-1 and a body part 132-2 of the actor 180-2. The set of data 130-1A may further include identifiers of pixels corresponding to the respective actors 180-1, 180-2, e.g., a bounding box 134-1 around pixels of the image 122-1A depicting the actor 180-1, and a bounding box 134-2 around pixels of the image 122-1A depicting the actor 180-2, as well as instance segmentations, or identifiers of sets of pixels 138-1, 138-2 corresponding to the actors 180-1, 180-2, respectively. The camera 120A also processes the image 122-1A to generate line segments 136-1, 136-2 extending from the detections of the body parts 132-1, 132-2 along lines toward a vertical vanishing point associated with the image 122-1A, to positions 135-1, 135-2 of the respective actors 180-1, 180-2 in 3D space on a floor surface (or other ground surface) of the scene 110.

Figure 1D:
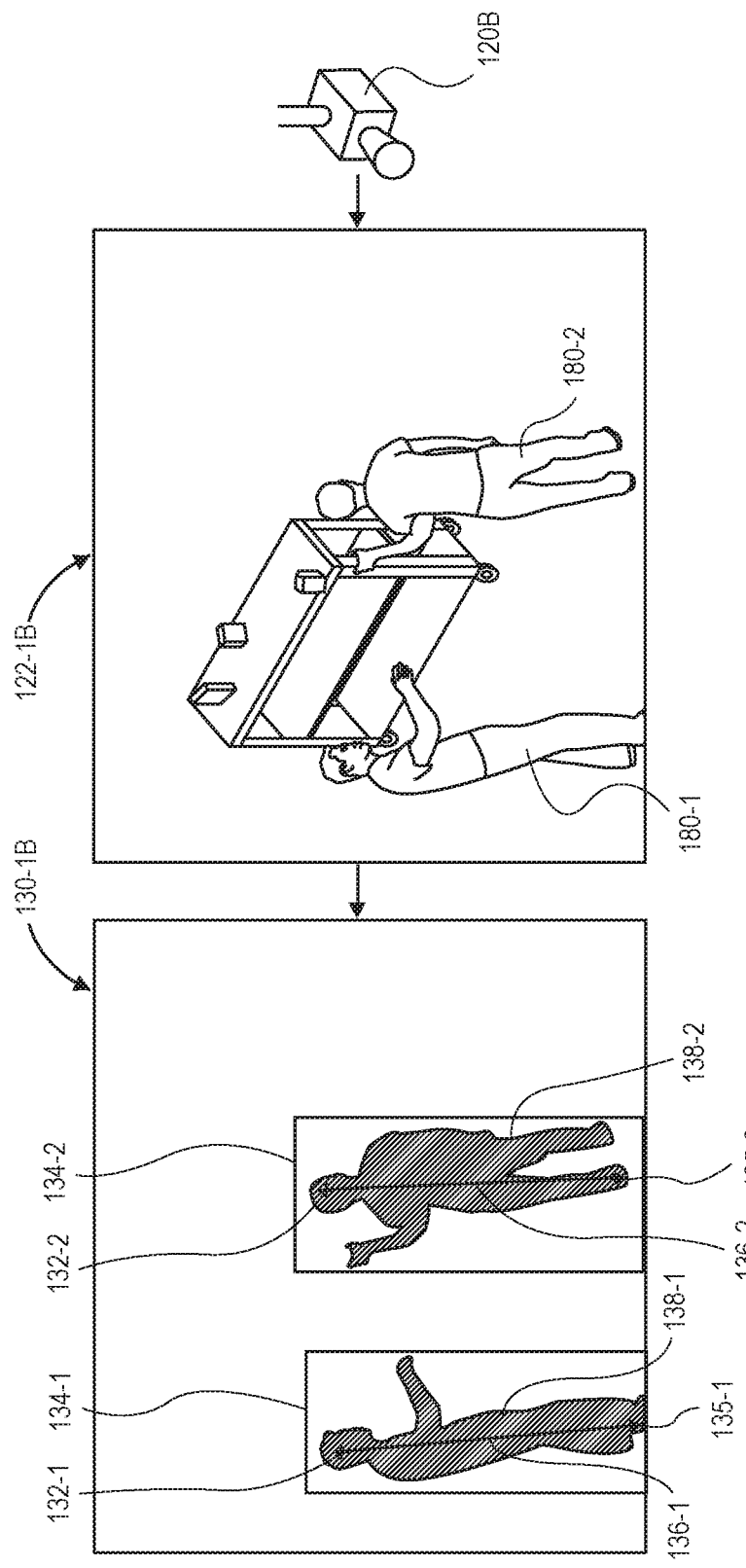

Similarly, as is shown in FIG. 1D, the camera 120B captures an image 122-1B at the time $t_1$, and processes the image 122-1B to generate a set of data 130-1B regarding contents of the image 122-1B. As is shown in FIG. 1D, the set of data 130-1B may include detected locations of the body part 132-1 of the actor 180-1 and the body part 132-2 of the actor 180-2. The set of data 130-1B may further include identifiers of pixels corresponding to the respective actors 180-1, 180-2, including a bounding box 134-1 around a portion of the image 122-1B depicting the actor 180-1 and a bounding box 134-2 around a portion of the image 122-1B depicting the actor 180-2, as well as identifiers of sets of pixels 138-1, 138-2 corresponding to the actors 180-1, 180-2, respectively, which may be determined by instance segmentations of the image 122-1B. The set of data 130-1B further includes line segments 136-1, 136-2 extending from the detections of the body parts 132-1, 132-2 along lines toward a vertical vanishing point associated with the image 122-1B, to positions 135-1, 135-2 of the respective actors 180-1, 180-2 in 3D space on a floor surface (or other ground surface) of the scene 110.

In some implementations, one or more processors or processor units provided on the cameras 120A, 120B may execute artificial neural networks (e.g., a fully convolutional neural network) that are trained to receive images captured by the cameras 120A, 120B as inputs and to generate one or more outputs associated with tasks relating to the images. Such tasks may include the detection of body parts (e.g., heads) within images, the identification of portions of images depicting actors, such as by the generation of bounding boxes, the performance of instance segmentations or otherwise, or the generation of line segments along lines extending from locations of the detected body parts to locations of vanishing points associated with images, e.g., within or beyond the images, or within or beyond fields of view of cameras that captured the images, and ending at positions of the respective actors in 3D space on floor surfaces or ground surfaces of a scene. The artificial neural networks may have any number of layers associated with the performance of such tasks, or others.

Figure 1E:
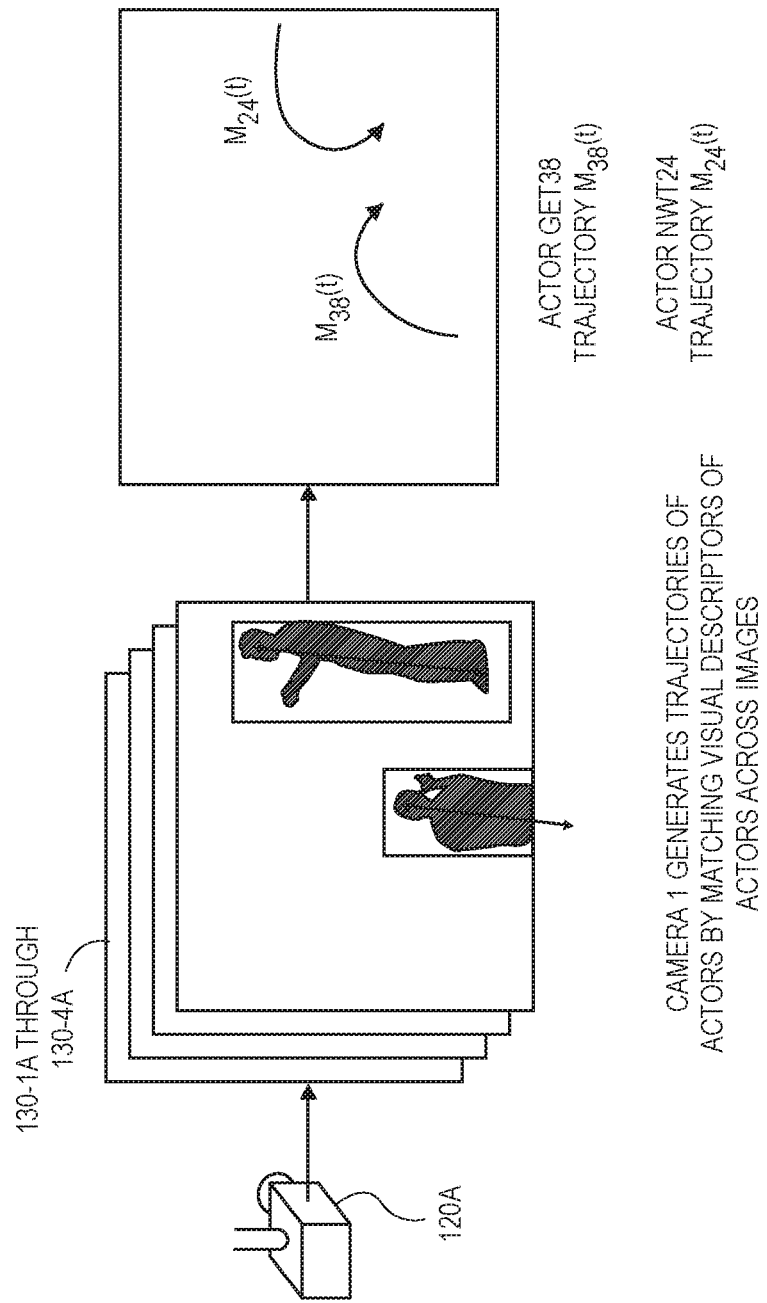
Figure 1F:
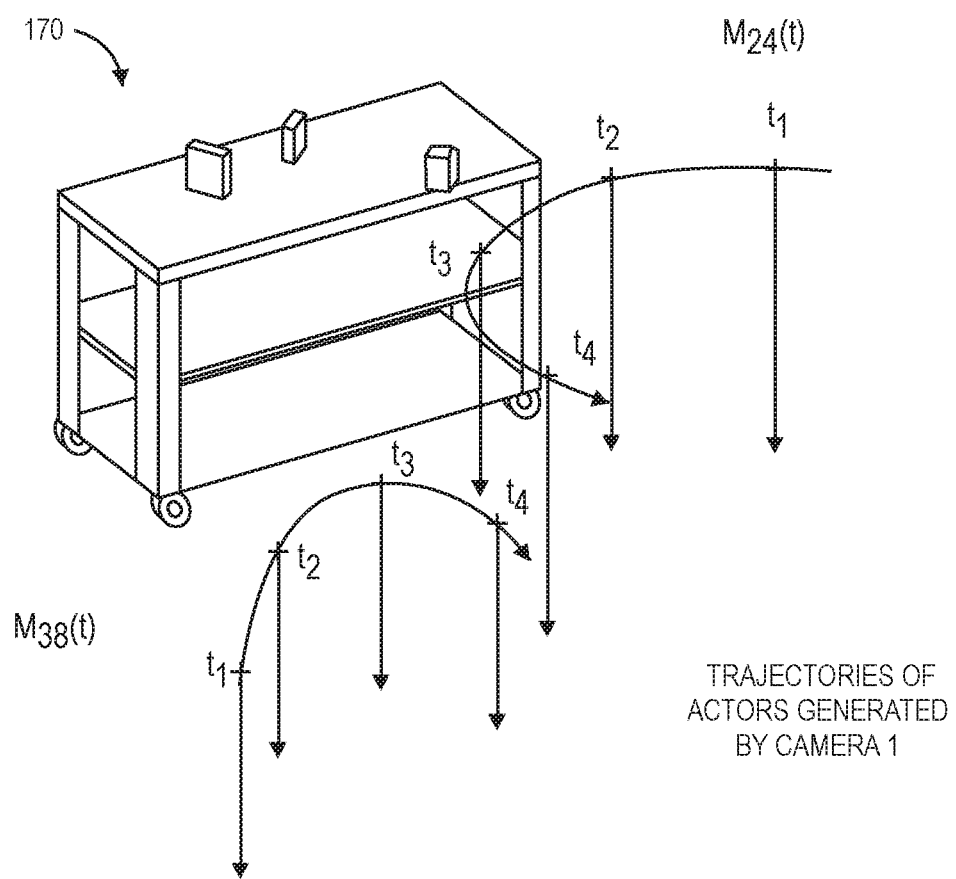

The cameras 120A, 120B further process images captured thereby to generate trajectories (e.g., camera trajectories) of the detected actors 180-1, 180-2 over time from such images. For example, as is shown in FIGS. 1E and 1F, based on sets of data 130-1A through 130-4A including detections of body parts, bounding boxes, sets of pixels and line segments determined from images 122-1A through 122-4A, the camera 120A identifies positions of sets of pixels corresponding to the actor 180-1 within the images 122-1A through 122-4A, generates a trajectory $M_{38}(t)$ of the actor 180-1 (e.g., of the body part 132-1), and assigns a unique identifier, viz., GET38, to the trajectory $M_{38}(t)$. The camera 120A also identifies positions of sets of pixels corresponding to the actor 180-2 within the images 122-1A through 122-4A, generates a trajectory $M_{24}(t)$ of the actor 180-2 (e.g., of the body part 132-2), and assigns a unique identifier, viz., NWT24, to the trajectory $M_{24}(t)$. In some implementations, the trajectories $M_{38}(t)$, $M_{24}(t)$ may be records of positions of the actors 180-1, 180-2 (e.g., of the body parts 132-1, 132-2) at various times beginning at an initial detection by the camera 120A within one image and including positions that are subsequently determined by the camera 120A within subsequently detected images. For example, in some implementations, where a first position of an actor in 3D space is determined along with visual descriptors of pixels corresponding to the actor from a first image, a trajectory of the actor may be generated based on the first position and a second position of the actor in 3D space, which may be determined by matching the visual descriptors of pixels detected from the first image to visual descriptors of pixels corresponding to the actor depicted in a second image. As is shown in FIG. 1F, based on the line segments 136-1, 136-2, the trajectories $M_{38}(t)$, $M_{24}(t)$ may be determined to correspond to portions of the floor surfaces in or around the storage unit 170. The unique identifiers GET38, NWT24 may be randomly selected or assigned by the camera 120A to the trajectories $M_{38}(t)$, $M_{24}(t)$ or the actors 180-1, 180-2 on any basis, and may but need not bear any relation to any attributes of the actors 180-1, 180-2.

Additionally, the camera 120A may further determine visual descriptors of portions of the images 122-1A through 122-4A corresponding to the respective actors 180-1, 180-2, including but not limited to colors, textures, shading, shapes or other visual attributes of pixels corresponding to the actors 180-1, 180-2 depicted within the images 122-1A, through 122-4A. As the actors 180-1, 180-2 continue to appear within imaging data captured by the camera 120A, the camera 120A may continue to update the trajectories $M_{38}(t)$, $M_{24}(t)$ over time. Alternatively, where one or both of the actors 180-1, 180-2 is not detected within images captured by the camera 120A, the camera 120A may continue to propagate positions of the actors 180-1, 180-2 in 3D space based on the trajectories $M_{38}(t)$, $M_{24}(t)$.

Figure 1G:
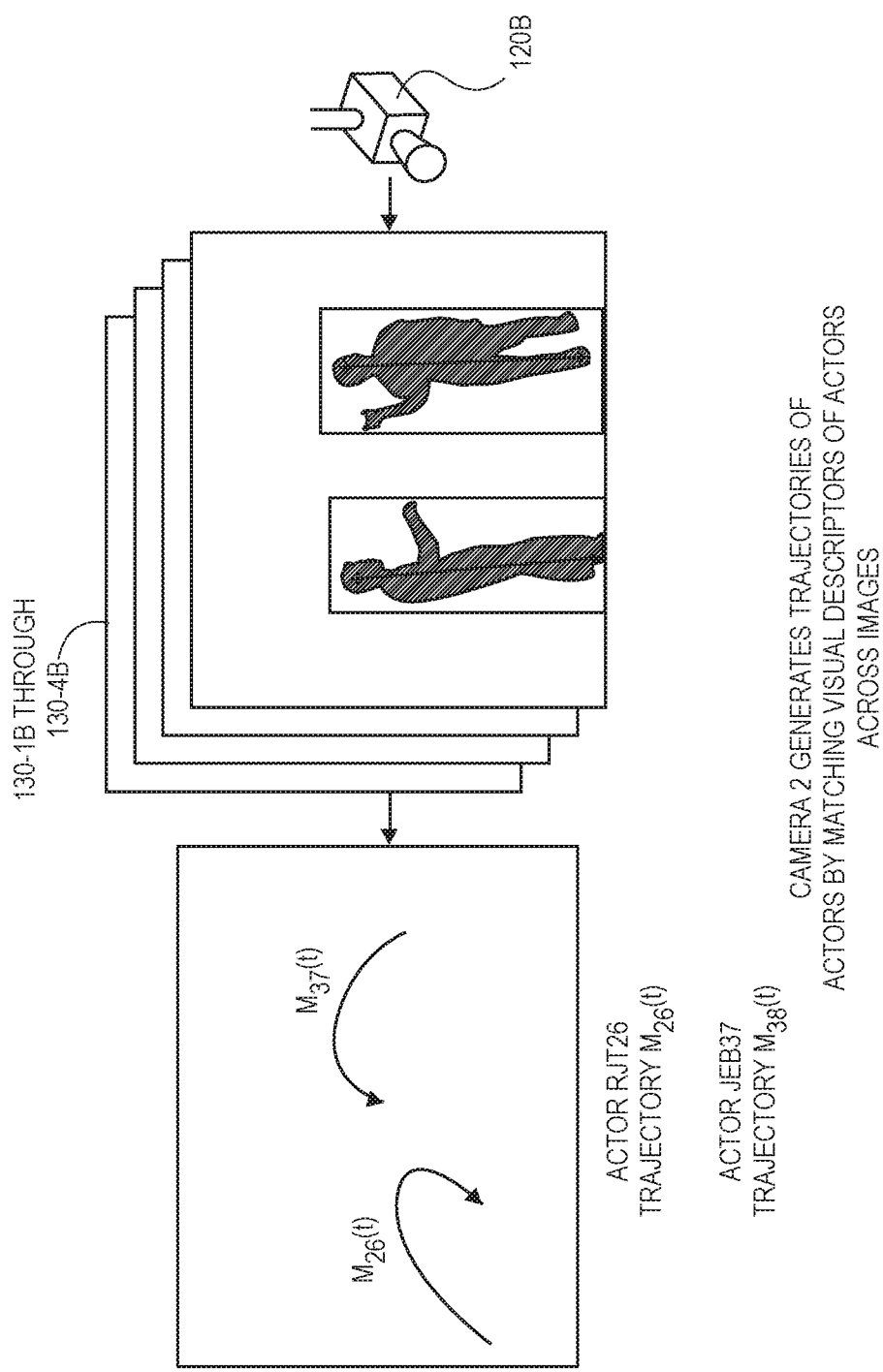
Figure 1H:
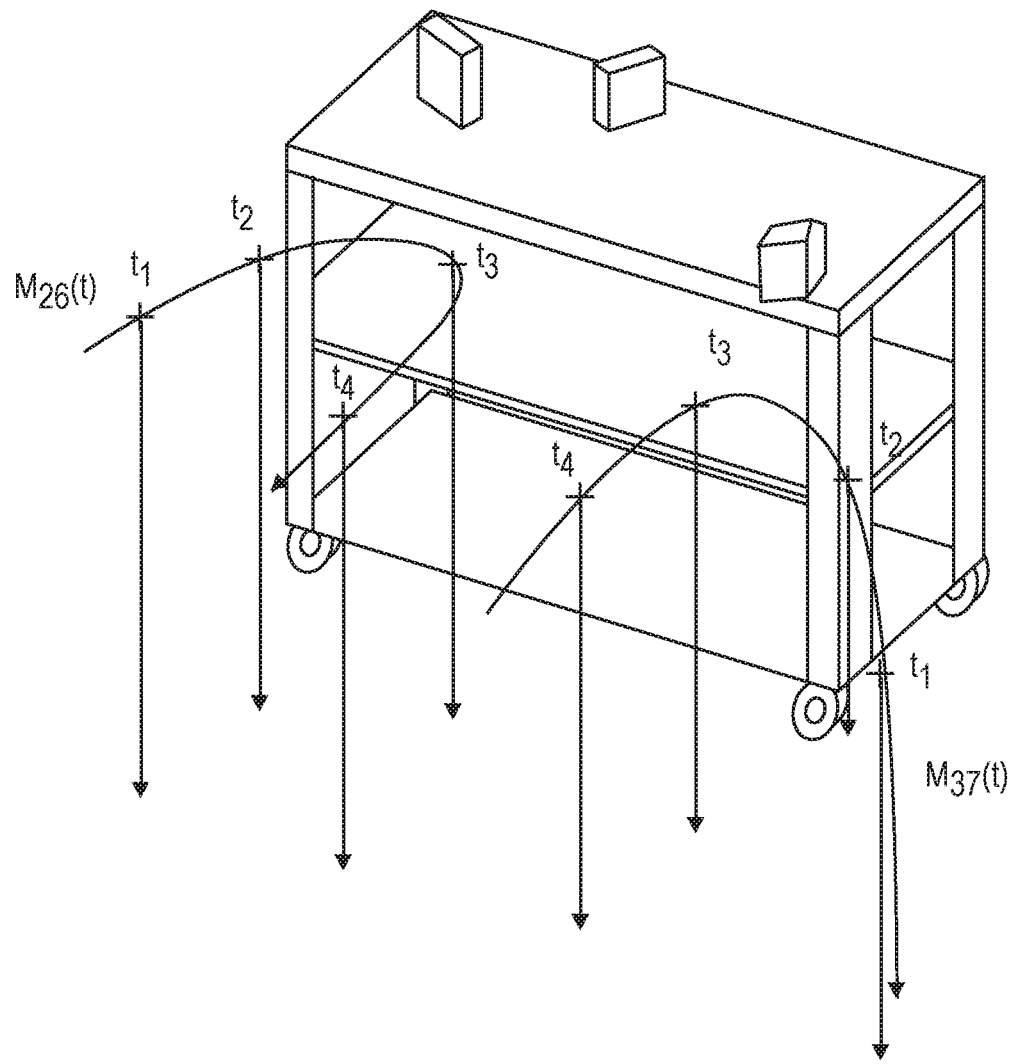

Similarly, as is shown in FIGS. 1G and 1H, based on sets of data 130-1B through 130-4B including detections of body parts, bounding boxes, sets of pixels and line segments determined from images 122-1B through 122-4B, the camera 120B generates a trajectory $M_{26}(t)$ of the actor 180-1 (e.g., of the body part 132-1), and assigns a unique identifier, viz., RJT26, to the trajectory $M_{26}(t)$. The camera 120B also generates a trajectory $M_{37}(t)$ of the actor 180-2 (e.g., of the body part 132-2), and assigns a unique identifier, viz., JEB37, to the trajectory $M_{37}(t)$. In some implementations, the trajectories $M_{26}(t)$, $M_{37}(t)$ may be records of positions of the actors 180-1, 180-2 (e.g., of the body parts 132-1, 132-2) at various times beginning at an initial detection by the camera 120B and including positions that are subsequently determined by the camera 120B. As is discussed above, in some implementations, a trajectory may be generated by a camera where a position of the actor in 3D space and visual descriptors of pixels corresponding to the actor are determined from a first image, and matching the visual descriptors of pixels detected from the first image to visual descriptors of pixels corresponding to the actor depicted in a second image.

As is shown in FIG. 1H, based on the line segments 136-1, 136-2, the trajectories $M_{26}(t)$, $M_{37}(t)$ may be determined to correspond to portions of the floor surfaces in or around the storage unit 170. Additionally, the camera 120B may further determine visual descriptors of portions of the images 122-1B through 122-4B corresponding to the respective actors 180-1, 180-2, including but not limited to colors, textures, shading, shapes or other visual attributes of pixels corresponding to the actors 180-1, 180-2 depicted within the images 122-1B through 122-4B. As the actors 180-1, 180-2 continue to appear within imaging data captured by the camera 120B, the camera 120B may continue to update the trajectories $M_{26}(t)$, $M_{37}(t)$ over time. Alternatively, where one or both of the actors 180-1, 180-2 is not detected within images captured by the camera 120B, the camera 120B may continue to propagate positions of the actors 180-1, 180-2 in 3D space based on the trajectories $M_{26}(t)$, $M_{37}(t)$.

Figure 1I:
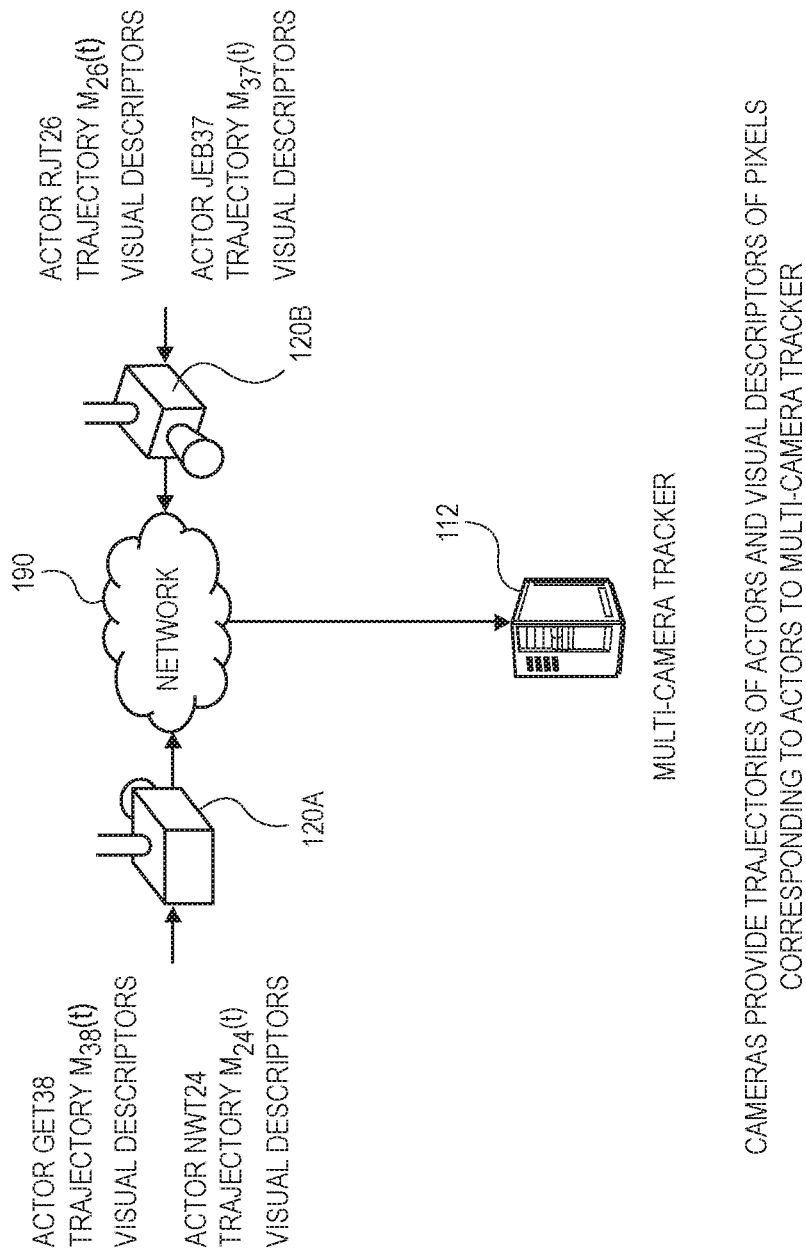
Figure 1J:
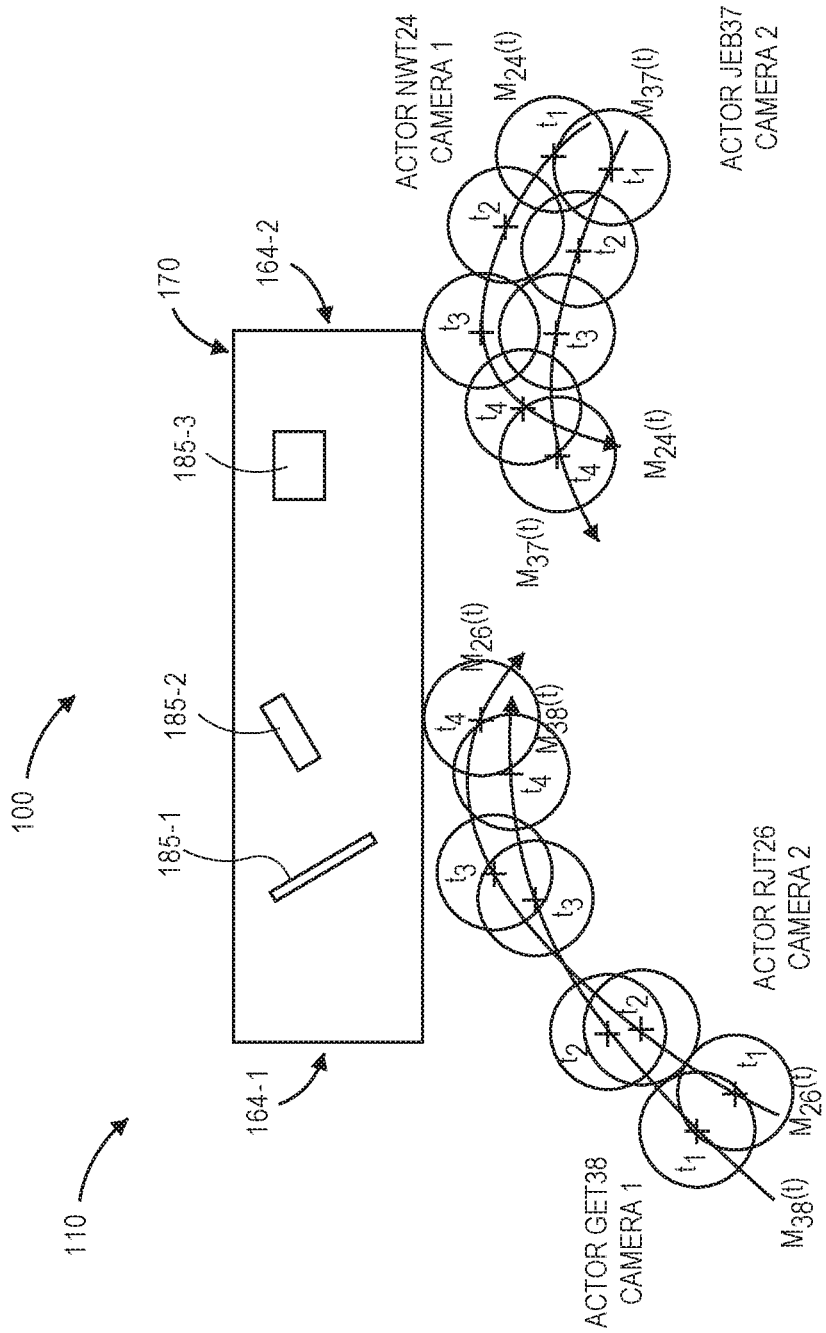

As is discussed above, servers or other computer systems that receive trajectories and visual descriptors of portions of images from cameras may merge the trajectories and visual descriptors to generate trajectories (e.g., system trajectories) therefrom. As is shown in FIG. 1I, the camera 120A provides the trajectories $M_{38}(t)$, $M_{24}(t)$ and the visual descriptors to a server 112 associated with the materials handling facility 110 over a network 190, while the camera 120B provides the trajectories $M_{26}(t)$, $M_{37}(t)$ and the visual descriptors generated by the camera 120B to the server 112 over the network 190. As is shown in FIG. 1J, the server 112 compares the positions associated with the trajectories $M_{24}(t)$, $M_{38}(t)$, $M_{26}(t)$, $M_{37}(t)$ received from the cameras 120A, 120B at common times $t_1$, $t_2$, $t_3$, $t_4$, along with any visual descriptors of sets of pixels received from the cameras 120A, 120B, in order to determine whether any of the trajectories $M_{24}(t)$, $M_{38}(t)$, $M_{26}(t)$, $M_{37}(t)$ or visual descriptor may be correlated with one another.

Figure 1K:
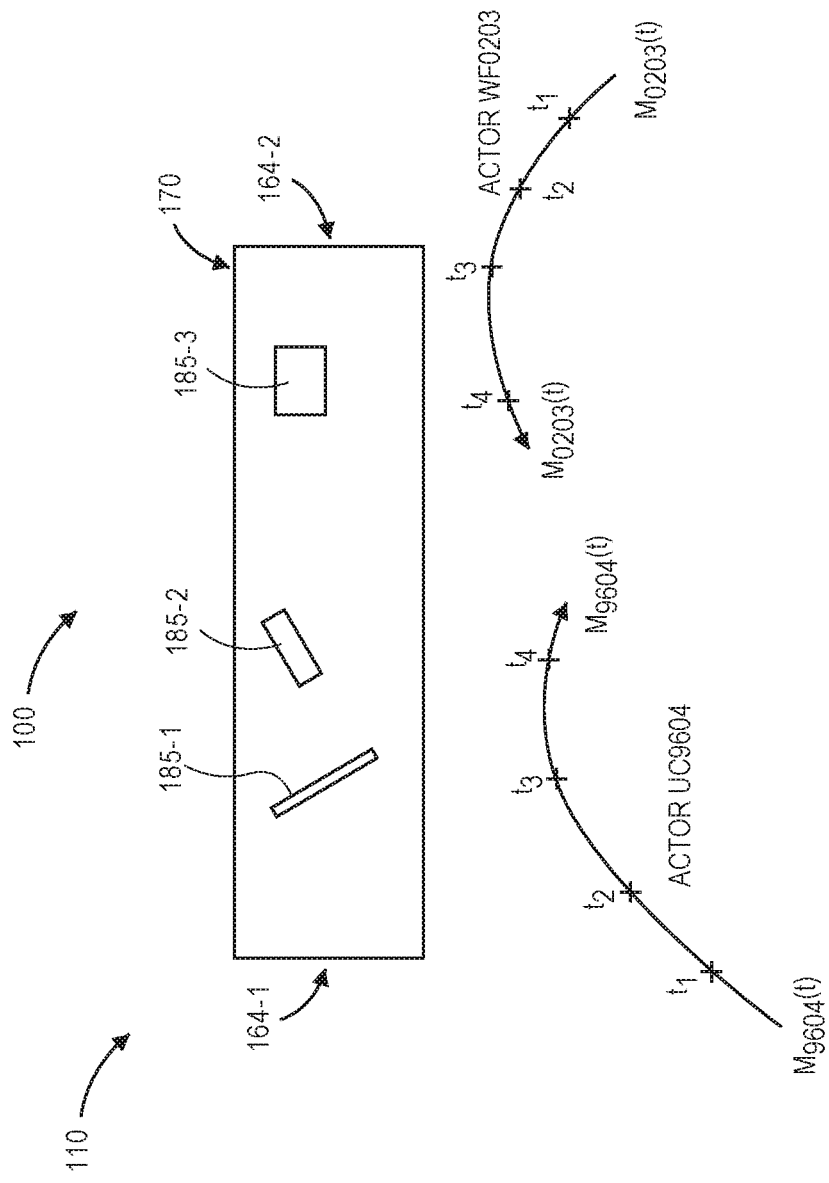

As is shown in FIG. 1K, upon correlating the trajectory $M_{38}(t)$ received from the camera 120A with the 2D trajectory $M_{26}(t)$ received from the camera 120B, e.g., based on positions associated with such trajectories and the visual descriptors at the times $t_1$, $t_2$, $t_3$, $t_4$, the server 112 generates a trajectory $M_{9604}(t)$ and assigns a unique identifier UC9604 (e.g., a global identifier) to the trajectory $M_{9604}(t)$. The trajectory $M_{9604}(t)$ may be a record of positions of the actor 180-1 in 3D space beginning with detections of the actor 180-1 by either or both of the cameras 120A, 120B, or correlations between any of such detections. Likewise, upon correlating the trajectory $M_{37}(t)$ received from the camera 120B, and the trajectory $M_{24}(t)$ received from the camera 120A, e.g., based on positions associated with such trajectories and the visual descriptors at the times $t_1$, $t_2$, $t_3$, $t_4$, the server 112 generates a trajectory $M_{0203}(t)$ and assigns a unique identifier WF0203 to the trajectory $M_{0203}(t)$. The trajectory $M_{0203}(t)$ may be a record of positions of the actor 180-2 in 3D space beginning with detections of the actor 180-2 by either or both of the cameras 120A, 120B, or correlations between any of such detections. The unique identifiers UC9604, WF0203 may be randomly selected or assigned to the trajectories $M_{9604}(t)$, $M_{0203}(t)$ or the actors 180-1, 180-2 on any basis, and may but need not bear any relation to any attributes of the actors 180-1, 180-2.

Accordingly, the systems and methods of the present disclosure are directed to cameras or other imaging devices that detect and locate target objects, e.g., actors, on a scene based on imaging data captured by such cameras. Images may be processed to detect body parts (e.g., heads) of actors on a scene, to identify sets of pixels corresponding to the actors depicted within the images (e.g., by bounding boxes, or instance segmentations), or to determine positions of the actors (or heights of actors) based on line segments extending from such body parts to floor surfaces of the scene, such as by providing the images to a multi-task artificial neural network or other machine learning model. The cameras may generate trajectories (e.g., camera trajectories) of actors detected within images captured thereby, and determine visual descriptors of pixels depicting such actors within the images, before providing the trajectories and visual descriptors to a server or another central system, which may determine whether any of the trajectories and visual descriptors received from two or more cameras may be correlated with one another. The server may generate trajectories (e.g., system trajectories) of the actors based on one or more of the trajectories received from the cameras, and locate the actors within the scene based on trajectories subsequently received from the cameras.

Moreover, the cameras may continue to propagate trajectories of actors even as detections of actors are temporarily lost, or where the actors are detected with low or insufficient levels of confidence, thereby enabling the cameras to reidentify an actor based on subsequent detections, e.g., when the actors are regained. Additionally, in some implementations, camera trajectories, or single-view trajectories, may be merged into system trajectories, or multi-view trajectories, as necessary, such as where two actors enter or depart from a "tangled state," e.g., when two actors travel in unison on a scene, such as a parent and a small child, or two actors that are arm-in-arm or otherwise operating in a synchronized manner.

In accordance with implementations of the present disclosure, actors may be located based on visual imaging data, such as RGB images, that are captured by a plurality of cameras, and machine learning tools (e.g., machine learning systems, algorithms or techniques) executed by the cameras that captured the visual imaging data. For example, in some implementations of the present disclosure, a plurality of cameras may capture visual images and process the visual images to generate trajectories or "tracklets" (e.g., camera trajectories, or single-view trajectories) representing records of positions of actors or other target objects on a scene. The cameras may further generate or identify visually descriptors (e.g., appearance features, motion features or geometry features) of pixels depicting the actors within each of the visual images captured thereby, and provide such trajectories and visual descriptors to a central system (e.g., a server in communication with the cameras) that merges or fuses the trajectories and visual descriptors to produce trajectories or tracklets (e.g., system trajectories) of the actors. Additionally, the central server may determine whether trajectories or visual descriptors that are subsequently received from cameras are consistent with a trajectory or visual descriptors that are then being located by the central system, or was previously located by the central system.

In some implementations, the systems and methods of the present disclosure need not rely on depth images in order to locate actors on a scene. Rather, some of the implementations of the present disclosure may rely on one or more machine learning tools operating on cameras that are trained to perform any number of tasks, such as the detection of persons or body parts thereof (e.g., heads) within a visual image, the identification of pixels corresponding to such persons or body parts (such as by generating bounding boxes or performing instance segmentations) of such persons within a visual image, or determining positions of such persons within 3D space based on a visual image.

Additionally, in some implementations, where a system trajectory (or multi-view trajectory) is generated based on a first camera trajectory (or single-view trajectory) of an actor and first visual descriptors of pixels corresponding to the actor (e.g., appearance features, motion features or geometry features) received from a first camera, a server or other system may determine that a second camera trajectory of the actor and second visual descriptors of pixels corresponding to the actor received from a second camera are associated with the system trajectory, even if fields of view of the first camera and the second camera do not overlap. Rather, the server may continue to propagate the system trajectory even after the actor has departed from the field of view of the first camera, and associate the second camera trajectory and the second visual descriptors with the system trajectory to the extent that positions of the actor according to the system trajectory and visual descriptors associated with the system trajectory are consistent with the second camera trajectory and the second visual descriptors, e.g., according to a reidentification process.

In some implementations, a position of an actor or a body part thereof in 3D space may be predicted based on a representation of the actor or the body part within an image based on the intrinsic or extrinsic parameters of a camera that captured the 2D image on a scene. Where a camera is mounted in a fixed position and orientation, a vertical vanishing point, or a point at which receding vertical parallel lines depicted within the image appear to converge, may be identified within a field of view of the camera, or beyond the field of view of the camera, e.g., based on the intrinsic and extrinsic parameters of the camera. For example, where a location of an optical center of the camera in 3D space is known, a height of the optical center may be set to zero, and a point corresponding to the optical center with a zero height may be projected into an image plane of the camera.

When a body part (e.g., a head) of an actor is detected within an image captured by the camera, a position of the actor in 3D space may be predicted based on a line segment extending between a location of the body part depicted within the image and a location on a floor surface depicted within the image, with the line segment being aligned along a line extending between the location of the body part depicted within the image and a vertical vanishing point, which may be within the image or beyond a perimeter of the image. The position of the actor in 3D space may be determined by predicting a length of a corresponding line segment from a location of a detected body part (e.g., a head) of an actor to a location on a floor surface associated with the actor, e.g., based on an output received from a machine learning tool, or in any other manner.

In some implementations, cameras or other imaging devices disclosed herein may be configured to operate a machine learning tool that is trained to perform multiple tasks based on a single input. For example, in some implementations, a camera may execute an artificial neural network (e.g., a deep network) that performs body part detection, bounding box detection, instance segmentation and position prediction based on each RGB image captured thereby. The artificial neural network may be constructed with a common, shared backbone and with one or more separate decoding layers. In some implementations, the artificial neural network may be a fully convolutional neural network having one or more layers dedicated to the performance of each of a plurality of tasks, e.g., in a common architecture.

In some implementations, cameras or other imaging devices disclosed herein may locate actors in an initial image captured by the cameras, and in images subsequently captured by the cameras, and may track such actors based on their subsequent detections. For example, each of the cameras of the present disclosure may be configured to execute algorithms (e.g., linking algorithms) that determine optimal assignments or associations between trajectories of actors and visual descriptors of pixels corresponding to the actors detected in consecutive or subsequent images, e.g., according to an edge cost matrix or in any other manner. Subsequently, a classifier (e.g., a confidence classifier) may be applied to a given assignment or association, in order to determine whether an assignment or association is of high confidence, or whether the assignment or association is of low confidence. Alternatively, where a trajectory generated based on an image or visual descriptors of pixels of the image may not be matched with any detection of a body part (e.g., a head) within a subsequently captured image to a sufficiently high level of confidence, the camera may execute an optical flow algorithm between the images in order to advance the trajectory in a manner consistent with the subsequently captured image. Furthermore, where a camera is configured to not only detect body parts (e.g., heads) of actors within images but also to determine visual descriptors of pixels depicting the actors, the camera may transition from locating the actor based on body parts to locating the actor based on such pixels, which may continue as long as at least a substantial portion of the actor (e.g., half of the actor) remains within a field of view of the camera.

In some implementations, a camera may determine that one or more trajectories are in a "tangled state," or are otherwise located or traveling together on a scene, based in images captured using the camera. For example, where a camera detects an actor within an image and determines visual descriptors of pixels corresponding to the actor from the image with sufficiently high levels of confidence, the camera may generate a trajectory (e.g., a camera trajectory, or a single-view trajectory) of the actor. Subsequently, where the actor is not detected within the camera with a sufficiently high level of confidence, the camera may assign an identifier of the actor or the trajectory to a "confusion set" (or a "low confidence set") or subset of actors or trajectories associated with any number of neighboring actors or trajectories. The camera may continue to locate the actor based on the trajectory and the visual descriptors over time at the lower level of confidence. The camera may further attempt to correlate the previously generated trajectory or determined visual descriptors with any other trajectories or visual descriptors subsequently generated or determined thereby. If the trajectory or the visual descriptors are associated with a subsequent detection of an actor, e.g., reidentified based on a position or similarity in trajectories or visual descriptors, the actor or the trajectory may be untangled from other actors or trajectories, and removed from their respective confusion sets accordingly. The locating of the newly reidentified actors may then resume with sufficiently high confidence.

Similarly, where a server or other system receives a trajectory and visual descriptors of pixels corresponding to actors from a camera, and generates a trajectory (e.g., a system trajectory, or a multi-view trajectory) for an actor based on that trajectory and visual descriptors, the server may continue to locate the actor based on trajectories and visual descriptors subsequently received from other cameras, where such trajectories and visual descriptors may be associated with the system trajectory with sufficiently high confidence. Where the system trajectory may not be updated with trajectories or visual descriptors received from cameras with sufficiently high confidence, however, the server may also assign the actor or the system trajectory to a "confusion set" or subset of actors or trajectories, and continue to attempt to correlate the system trajectory with any other trajectories or visual descriptors of pixels corresponding to actors that are subsequently received from cameras.

For example, where a camera detects two or more actors and generates trajectories based on images, but is otherwise unable to discern between two or more of the actors, such as where one of the actors is occluded, or where the two or more actors are in close proximity to one another, the camera may be configured to pass one or more of the actors to a "confusion set" or subset of one or more neighboring actors. The camera may propagate actors of the subset according to their last known trajectories. To the extent that a camera generates a trajectory and visual descriptors of pixels depicting an actor that was previously detected and is assigned to the "confusion set" or subset of other actors, the actor may be effectively reidentified by the camera, and removed from the "confusion sets" or subsets of the other actors. The trajectory and the visual descriptors of the pixels corresponding to that actor may be updated and located accordingly.

In some implementations, where a plurality of cameras provide their respectively determined trajectories and visual descriptors to a server or another central system, the server may consider trajectories and visual descriptors generated by cameras from image captured during finite sets of time, e.g., temporal windows having finite durations, such as two seconds. The server may map all such trajectories and received from the cameras to locations in 3D space, e.g., based on determined line segments between locations of body parts within images and locations on floor surfaces, and also determine appearance features (e.g., colors, textures, shapes or other visual attributes), motion features (e.g., velocities or orientations), or geometry features (e.g., construction of a scene) of actors based on visual descriptors of pixels corresponding to actors within images captured by the cameras. The cameras may also execute one or more correlation functions, e.g., a clustering correlation, to correlate the trajectories received from cameras into trajectories in 3D space, and to assign identifiers to the trajectories accordingly. For example, in some implementations, trajectories or visual descriptors received from cameras may be arranged in graphs having edges associated with similarities, and nodes partitioned into identifiers. Such processes may be repeated on an iterative basis, e.g., after every temporal window, as necessary.

Additionally, in some implementations, the correlation of trajectories or visual descriptors received from cameras may be subjected to one or more constraints in space (e.g., minimum or maximum distances between the trajectories), time (e.g., times between detections) and appearance, such that only trajectories of actors having similar appearance features are correlated with one another.

In some implementations, when a server or another central system generates a system trajectory for an actor from one or more trajectories of the actor and/or visual descriptors of pixels corresponding to the actor that are received from cameras, e.g., over successive temporal windows, the system trajectory may be associated with an identifier of an actor who is known to have entered the scene (e.g., an entry identifier), or known to be located on a scene (e.g., a scene identifier). Moreover, where one or more system trajectories are associated with identifiers of actors, and an event is detected, an event may be associated with a specific one of the actors, or two or more of the actors, based at least in part on the system trajectories.

Those of ordinary skill in the pertinent arts will recognize that imaging data, e.g., visual imaging data, depth imaging data, infrared imaging data, or imaging data of any other type or form, may be captured using one or more imaging devices such as digital cameras, depth sensors, range cameras, infrared cameras or radiographic cameras. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBD or RGBz imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures, outlines or other aspects of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine-learning classifiers, algorithms or techniques, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

The systems and methods of the present disclosure may be utilized in any number of applications in which locating actors or other target objects is desired, including but not limited to locating humans and/or machines within a materials handling facility, or locating any other objects within a materials handling facility. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to locate body parts of human operators (e.g., customers, workers or other personnel) and/or component parts of machines (e.g., autonomous mobile robots) and to recognize interactions involving such humans or machines within a materials handling facility, including but not limited to interactions with one or more items (e.g., consumer goods) or other inanimate objects within the materials handling facility. Such systems and methods may also be utilized to locate objects within transportation centers, financial institutions or like structures in which diverse collections of people, objects or machines enter and exit from such environments at regular or irregular times or on predictable or unpredictable schedules. By relying on multiple imaging devices, motion of an object may be located even when the object is occluded in one or more of the fields of view of the imaging devices.

Figure 2A:
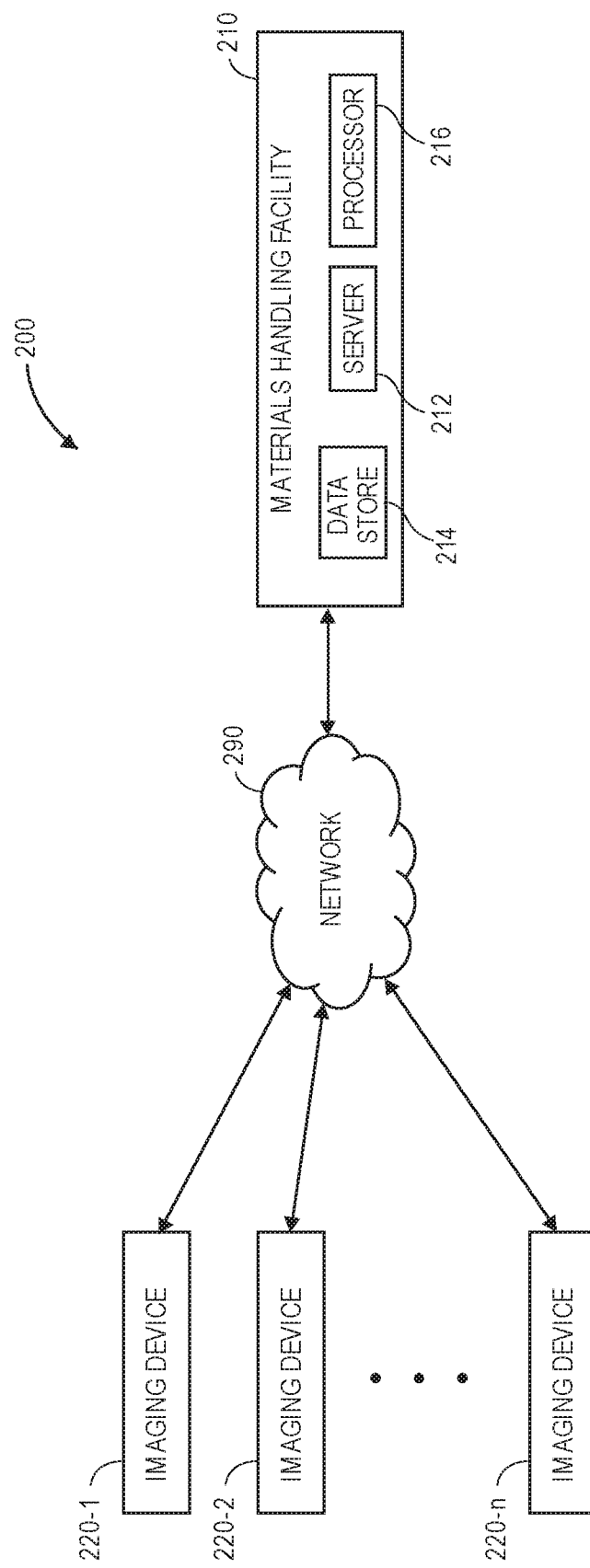
FIGS. 2A and 2B are block diagrams of components of one system for locating actors in accordance with implementations of the present disclosure.
Figure 2B:
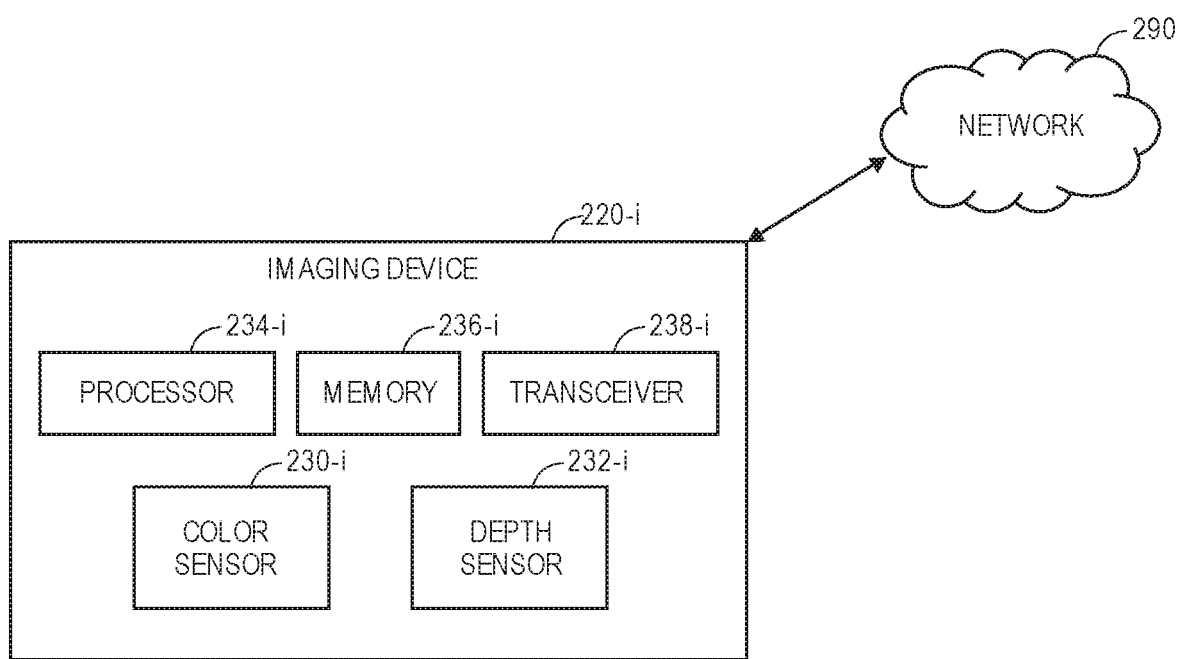

Referring to FIGS. 2A and 2B, a block diagram of components of one system 200 for locating actors in accordance with implementations of the present disclosure is shown. The system 200 includes a materials handling facility 210 and a plurality of imaging devices 220-1, 220-2 . . . 220-$n$ that are connected to one another across a network 290, which may include the Internet in whole or in part. Except where otherwise noted, reference numerals preceded by the number "2" shown in FIG. 2A or 2B indicate components or features that are similar to components or features having reference numerals preceded by the number "1" shown in FIGS. 1A through 1K.

The materials handling facility 210 may be any facility that is adapted to receive, store, process and/or distribute items from a variety of sources to a variety of destinations, e.g., on behalf of or for an electronic marketplace, or on behalf of or for any other entity. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Inventory items may be stored within an inventory area on an inventory shelf, a storage unit or another like system, such as in bins, on shelves or via other suitable storage mechanisms. The inventory shelves, storage units or like units may be flat or angled, stationary or mobile, and of any shape or size. In some implementations, all inventory items of a given type or kind may be stored in a common location within an inventory area. In other implementations, like inventory items may be stored in different locations. For example, to optimize the retrieval of inventory items having high turnover rates or velocities within a large materials handling facility, such inventory items may be stored in several different locations to reduce congestion that might be encountered if the items are stored at a single location.

When a request or an order specifying one or more of the inventory items is received, or as a user progresses through the materials handling facility 210, inventory items that are listed in the request or order, or are desired by the user, may be selected or "picked" from an inventory area at the materials handling facility 210. For example, in one implementation, a customer or other user may travel through the materials handling facility 210 with a list (e.g., a paper list, or a handheld mobile device displaying or including such a list) and may pick one or more of the inventory items from an inventory area at the materials handling facility 210. In other implementations, an employee of the materials handling facility 210 or another user may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first location (e.g., a first inventory shelf or other storage unit) in an inventory area, moved a distance, and placed at a second location (e.g., a second inventory shelf or other storage unit) in the inventory area.

As is shown in FIG. 2A, the materials handling facility 210 includes a networked computer infrastructure for performing various computer-related functions associated with the receipt, storage, processing and distribution of such items, including one or more physical computer servers 212, data stores (e.g., databases) 214 and/or processors 216, that may be provided in the same physical location as the materials handling facility 210, or in one or more alternate or virtual locations, e.g., in a "cloud"-based environment. In some implementations, the servers 212, the data stores 214 and/or the processors 216 or any number of other computing devices or resources may further execute any type of computer-based function or compute any type or form of calculation, including but not limited to any formulas, equations, algorithms or techniques for determining one or more probabilities or performing any number of statistical tests.

In some implementations, the servers 212, the data stores 214 and/or the processors 216 may be configured to execute one or more machine learning systems or techniques. For example, in some implementations, the servers 212 may be configured to execute an artificial neural network, such a convolutional neural network, to process imaging data received from one or more of the imaging devices 220-1, 220-2 . . . 220-n over the network 290.

Such computer devices or resources may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The materials handling facility 210 may include one or more inventory areas having predefined two-dimensional or three-dimensional storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 210 may further include one or more receiving stations featuring any apparatuses that may be required in order to receive shipments of items at the materials handling facility 210 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 210 may further include one or more distribution stations where items that have been retrieved from a designated inventory area may be evaluated, prepared and packed for delivery from the materials handling facility 210 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 210 may be transferred directly to a distribution station for further processing, or "cross-docked," without first being placed into storage in an intermediate inventory area. The materials handling facility 210 may also include one or more additional stations for receiving and distributing items to customers, as well as one or more conveying systems, autonomous mobile robots, or other manual or automated vehicles for transporting items between such stations or areas (not shown in FIG. 2A or FIG. 2B). The materials handling facility 210 may operate one or more order processing and/or communication systems using computer devices or resources in communication with one or more of the servers 212, the data stores 214 and/or the processors 216, or through one or more other computing devices or resources that may be connected to the network 290, in order to transmit or receive information in the form of digital or analog data, or for any other purpose.

The materials handling facility 210 may be associated with a plurality of imaging devices 220-1, 220-2 . . . 220-n (or other sensors), which may be any form of optical recording device that may be used to photograph or otherwise record imaging data of structures, facilities or items within the materials handling facility 210, or for any other purpose. The imaging devices 220-1, 220-2 . . . 220-*n* have diverse fields of view of the materials handling facility 210, or other scenes, that are configured to capture imaging data that may be processed to recognize and locate motion, locations and/or orientations of various actors within the materials handling facility 210. The imaging devices 220-1, 220-2 . . . 220-*n* may be mounted in any specific location or orientation within the materials handling facility 210, e.g., above, below or alongside one or more inventory areas or stations for receiving or distributing items. Alternatively, the imaging devices 220-1, 220-2 . . . 220-*n* may be provided in any open or enclosed environment or space in which any number of actors (e.g., humans, other animals or machines) may execute one or more poses, gestures or other actions within one or more of their fields of view.

Each of the imaging devices 220-1, 220-2 . . . 220-*n* shown in FIG. 2A may include one or more sensors, memory or storage components and processors, and such sensors, memory components or processors may further include one or more photosensitive surfaces, filters, chips, electrodes, clocks, boards, timers or any other relevant features (not shown). As is shown in FIG. 2B, a representative one of the imaging devices 220-1, 220-2 . . . 220-*n*, viz., an imaging device 220-*i*, includes one or more optical sensors, including color sensors (or grayscale sensors or black-and-white sensors) 230-*i* and/or depth sensors 232-*i* configured to capture visual imaging data (e.g., textures) or depth imaging data (e.g., ranges) to objects within one or more fields of view of the imaging device 220-*i*. The imaging device 220-*i* further includes one or more processors 234-*i*, one or more memory components 236-*i* and one or more transceivers 238-*i*, and any other components (not shown) that may be required in order to capture, analyze and/or store imaging data from within the materials handling facility 210 environment in which the imaging device 220-*i* is provided. For example, the imaging device 220-*i* may capture one or more still or moving images (e.g., streams of visual and/or depth images or image frames), along with any relevant audio signals or other information (e.g., position data), and may also connect to or otherwise communicate with the servers 212, or any other computer devices within the materials handling facility 210 (not shown), or with one or more external computer devices over the network 290, through the sending and receiving of digital data. In some implementations, the transceiver 238-*i* may be configured to enable the imaging device 220-*i* to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 212 or over the network 290 directly.

The processors 234-*i* may be configured to execute an artificial neural network, such a convolutional neural network, to process imaging data captured by one or more of the color sensors 230-*i* or the depth sensors 232-*i*. For example, the artificial neural networks executed by the processors 234-*i* may perform tasks in one or more core areas, including but not limited to person detection, feature extraction, person linking and unlinking. In some implementations, one such neural network may be a neural network backbone (e.g., a residual neural network backbone) that is configured to perform one or more tasks for locating actors based on images captured by the imaging device 220-*i*, including but not limited to one or more of person detection (e.g., head detection), person bounding box generation, instance segmentation, and person locating in 3D space based on visual images (e.g., RGB images). The processors 234-*i* may be configured to execute multi-task networks having shared backbones and one or more decoding layers.

For example, in some implementations, the processors 234-*i* may operate an artificial neural network or other classifier that receives an image (e.g., a visual image, or an RGB image) as an input, and processes the image for one or more person detection (e.g., head detection, bounding box generation, instance segmentation, and line segment estimation) for any number of actors depicted within the image. Based on such detections, visual descriptors of pixels depicting the actors, including but not limited to appearance features of such actors, e.g., sets of information or data identifying colors, textures, shapes or other aspects of features of such actors, may be determined. The processors 234-*i* may also define a trajectory or "tracklet," e.g., a record of the positions of an actor at various times beginning at an initial detection and following with subsequent detections. Trajectories or tracklets and visual descriptors generated by the processors 234-*i* may be used to link detections of actors in consecutively captured frames to one another, or to reidentify a previously detected actor if the actor is not detected for a brief period of time.

In some implementations, the processors 234-*i* may predict a 3D location of an actor by detecting a head within an image and determining or estimating a height of the actor, or a line segment extending between the detected head of the actor and a corresponding location of a floor or other ground surface, within the image (e.g., a 2D line segment), which is aligned along a line extending from the detected head of the actor to a vertical vanishing point to which all vertical lines shown within the image converge. A line segment determined for an actor may be used to determine a 3D position of the actor based on intrinsic properties of the camera and a pose of the actor. The length of the line segment may be predicted upon a detection of a head within the image. In some implementations, the processors 234-*i* may predict a length of the line segment corresponding to an actor based on an output received from an artificial neural network that also detected a head of the actor, and utilize the line segment to determine a 3D location of the actor.

In some implementations, the processors 234-*i* may execute one or more tracking or matching algorithms, e.g., a tracking-by-detection algorithm, or a bipartite matching algorithm, that generates a tracklet-to-detection assignment or a visual descriptors-to-detection assignment over consecutive frames given an edge cost matrix. If a trajectory or tracklet, or visual descriptors of a set of pixels, are not matched to a head detection, the processors 234-*i* may execute one or more optical flow algorithms on successive frames to extend a trajectory or tracklet location into a successively captured frame. Additionally, a confidence classifier may generate a confidence score in a given assignment. Moreover, the processors 234-*i* may change a manner or technique by which a given actor is located from frame to frame. For example, processors 234-*i* may locate actors based on body part detections (e.g., head detections) when such body parts are visible within an image frame, or may alternatively switch to locating via a set of visual descriptors of pixels corresponding to an actor (e.g., a bounding box or instance segmentation), to the extent that the visual descriptors of pixels are consistent from image frame to image frame.

In some implementations, nodes corresponding to body parts detected by the imaging devices 220-1, 220-2 . . . 220-*n* may be represented in space by a set of Cartesian coordinates, or coordinates according to any other system, and an articulated model in the form of a record or vector may include one or more of such sets of coordinates. In some implementations, edges extending between a pair of nodes may be established by reference to each of the nodes of the pair, as well as a linear formula, a linear equation or other representation of points extending between the respective nodes of the pair, and an articulated model in the form of a record or a vector may identify edges by reference to their respective nodes, or include one or more of such formulas, equations or other representations for such edges. For example, detections of body parts may be matched across multiple views in two-dimensional images and converted to three-dimensional rays that begin at optical elements of the respective imaging devices and terminate at surfaces of objects at a given pixel, based on the intrinsic properties of such imaging devices and extrinsic properties of a scene, and merged into one, e.g., by triangulating the rays corresponding to such detections, thereby enabling a body part to be detected and re-detected in the multiple views even if the body part is temporarily occluded in one of the views. The trajectories may be models of smoothed three-dimensional tracks that best fit a plurality of two-dimensional observations of a body part within multiple images. In some implementations, trajectories may be defined by minimizing differences between ray projections extending from optical elements of imaging devices to pixels depicting specific body parts detected within images captured by such imaging devices and splines or other curves defined from such frames, e.g., according to a least squares problem. Any method or technique for defining a three-dimensional track or trajectory of a body part or an actor from two-dimensional observations of the body part or the actor in images may be utilized in accordance with the present disclosure.

Moreover, in some implementations, the processors 234-$i$ may combine trajectories or tracklets when corresponding positions are sufficiently proximate to one another and one of the trajectories or tracklets has a sufficiently low level of confidence, or on any other basis.

The imaging devices 220-1, 220-2 . . . 220-$n$ may be homogenous or heterogeneous in nature, in accordance with the present disclosure. For example, one or more of the imaging devices 220-1, 220-2 . . . 220-$n$ may have both the color sensor 230-$i$ and the depth sensor 232-$i$. Alternatively, one or more of the imaging devices 220-1, 220-2 . . . 220-$n$ may have just a color sensor 230-$i$ (or grayscale sensor or black-and-white sensor) or just a depth sensor 232-$i$. For example, in some implementations, one or more of the imaging devices 220-1, 220-2 . . . 220-$n$ may be configured to capture depth imaging data, e.g., distances or ranges to objects within their respective fields of view. In some implementations, one or more of the imaging devices 220-1, 220-2 . . . 220-$n$ may be configured to capture visual imaging data, e.g., visual images or images in color, grayscale or black-and-white.

For example, one or more of the imaging devices 220-1, 220-2 . . . 220-$n$ may be an RGB color camera, a still camera, a motion capture/video camera or any other type or form of camera. In other implementations, one or more of the imaging devices 220-1, 220-2 . . . 220-$n$ may be depth-sensing cameras, such as an RGBz or RGBD camera. In still other implementations, one or more of the imaging devices 220-1, 220-2 . . . 220-$n$ may be a thermographic or infrared (IR) camera. Additionally, in some implementations, the imaging devices 220-1, 220-2 . . . 220-$n$ may simply be camera modules that include a lens and an image sensor configured to convert an optical image obtained using the lens of the camera into a digital signal or digital representation of the image (generally referred to herein as imaging data). In one implementation, the image sensor may be an RGB sensor capable of supporting an image resolution of at least 860×480 at six frames per second that may likewise be configured to provide image data to other components (e.g., a graphics processing unit) for processing. In some implementations, the imaging devices 220-1, 220-2 . . . 220-$n$ may be paired to provide stereo imagery and depth information, and may include a pair of camera modules. Additionally, imaging data may be stored in any variety of formats, including but not limited to YUYV, RGB, RAW, .bmp, .jpeg, .gif, or the like.

The imaging devices 220-1, 220-2 . . . 220-$n$ may also include manual or automatic features for modifying their respective fields of view or orientations. For example, one or more of the imaging devices 220-1, 220-2 . . . 220-$n$ may be configured in a fixed position, or with a fixed focal length (e.g., fixed-focus lenses) or angular orientation. Alternatively, one or more of the imaging devices 220-1, 220-2 . . . 220-$n$ may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 220-1, 220-2 . . . 220-$n$, or changes in one or more of the angles defining the angular orientation.

For example, one or more of the imaging devices 220-1, 220-2 . . . 220-$n$ may be hard-mounted to a support or mounting that maintains the device in a fixed configuration or angle with respect to one, two or three axes. Alternatively, however, one or more of the imaging devices 220-1, 220-2 . . . 220-$n$ may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device. In some implementations, two or more of the imaging devices 220-1, 220-2 . . . 220-$n$ may be provided within a common housing, e.g., a dual camera module housing.

Some of the imaging devices 220-1, 220-2 . . . 220-$n$ may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of the imaging devices 220-1, 220-2 . . . 220-n, e.g., digital cameras, may be affected based on the lighting conditions and characteristics of the scenes in which the imaging devices 220-1, 220-2 . . . 220-n are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the system 200 of FIG. 2A includes boxes corresponding to three imaging devices 220-1, 220-2 . . . 220-n, those of ordinary skill in the pertinent arts will recognize that any number or type of imaging devices may be provided within the materials handling facility 210 in accordance with the present disclosure, including but not limited to digital cameras, depth sensors or range cameras, infrared cameras, radiographic cameras or other devices having one or more optical sensors. In some implementations, the system 200 (e.g., the materials handling facility 210) may include dozens or even hundreds of imaging devices of any type or form. Moreover, the system 200 (e.g., the materials handling facility 210) may also include any other type of sensing systems for detecting actors and recognizing their motion, locations and/or orientations within the materials handling facility 210. Such sensors may include, but are not limited to, one or more load or weight sensors provided on walking or traveling surfaces within the materials handling facility 210, one or more RFID components (e.g., antennas or tags) for transmitting and/or receiving RFID signals associated with actors, one or more LIDAR sensors or receivers for detecting actors, or any other systems or components by which information regarding actors and their motion, locations and/or orientations may be gathered. The type or form of sensors that may gather information or data regarding actors and their motion, locations and/or orientations at the materials handling facility 210 are not limited.

The materials handling facility 210 may also include any number of other sensors, components or other features for controlling or aiding in the operation of the materials handling facility 210, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The materials handling facility 210 may also include one or more human operators (not shown), such as one or more workers, who may be any designated personnel tasked with performing one or more tasks within the materials handling facility 210 in general, or within one or more inventory areas, receiving stations, distribution stations or other locations of the materials handling facility 210 in particular. Such workers may handle or transport items (e.g., any type or form of good, product, media or other tangible consumer article) within the materials handling facility 210, or operate one or more pieces of equipment therein (not shown). Such workers may also operate one or more specific computing devices or resources for registering the receipt, retrieval, transportation or storage of items within the materials handling facility 210, e.g., a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, such devices may include one or more wireless modules to facilitate communications with the servers 212, with one or more of the imaging devices 220-1, 220-2 . . . 220-n, or with one or more computer devices or resources, such as the servers 212, over the network 290, as well as a display (e.g., a touchscreen display) to facilitate the visible presentation to and interaction with a human operator.

The servers 212 or any other computer devices associated with the materials handling facility 210 or connected to the network 290 may execute one or more multi-camera tracking algorithms or techniques. For example, in some implementations, the imaging devices 220-1, 220-2 . . . 220-n may provide their respectively determined trajectories or tracklets of actors and visual descriptors of pixels of images (e.g., appearance features, motion properties and geometry) depicting the actors to the server 212. Additionally, the server 212 may map single-camera trajectories or tracklets to positions in 3D space based on their respective predicted 3D line segments and their corresponding appearance features, motion properties and geometry in 3D space for the respective trajectories or tracklets. The server 212 may then correlate or merge trajectories or tracklets received from multiple ones of the imaging devices 220-1, 220-2 . . . 220-n into multi-camera trajectories or tracklets, and assign identifiers to the respectively correlated or merged trajectories or tracklets.

The servers 212 may further associate any multi-camera trajectories or tracklets with identifiers of actors within the materials handling facility 210 in any manner. For example, a unique identifier may be assigned to each multi-camera trajectory or tracklet, e.g., and such multi-camera trajectories or tracklets may be tracked based on single-camera trajectories or tracklets, and visual descriptors, received from the respective imaging devices 220-1, 220-2 . . . 220-n.

In some implementations, the system 200 may further include one or more event generator systems comprising sensors that are provided in one or more select locations within the materials handling facility 210. Each of such sensors may be configured to detect information or data from which a location at which an event has occurred, or a time (or duration) of the event, e.g., an interval of time that includes the time of the event. In some implementations, an item associated with an event may be identified based on the location and/or the time (or duration) of the event based on planogram data, which may indicate the placement of one or more items in inventory areas or storage units within the materials handling facility 210.

For example, one or more of such sensors may be an imaging device configured to capture imaging data regarding an inventory area and/or storage unit, e.g., one or more of the imaging devices 220-1, 220-2 . . . 220-n, and whether an event has occurred, and a time of such an event, may be determined based on such imaging data. One or more of such sensors may include load or weight sensors provided in association with an inventory area or storage unit, and whether an event has occurred, and a time of such an event, may be determined based on load signals received from such load or weight sensors or, alternatively, changes in load signals indicating increases or decreases in loading applied to the inventory area or storage unit. An item associated with such an event may be determined based on one or more magnitudes of such changes. For example, when an actor is determined to have accessed an inventory area or shelving unit to retrieve an item therefrom at a specific location, and a number of items are located within a vicinity of the specific location, a change in the mass of all of the items present on the shelf may be determined, and one of the items within the vicinity of the specific location having a mass consistent with the determined change in the mass of all of the items present on the shelf may be presumed to have been retrieved by the actor.

Alternatively, one or more of such sensors may include RFID components (e.g., antennas or tags) for transmitting and/or receiving RFID signals associated with items or inventory areas and/or storage units, and whether an event has occurred, and a time of such an event, may be determined based on the receipt of such signals, or the loss of such signals. An item associated with such an event may be determined based on the respective RFID signals that are transmitted or received, or are no longer received. As another alternative, one or more of such sensors may include one or more LIDAR components for transmitting and/or receiving one or more light signals in association with inventory areas and/or storage units, and whether an event has occurred, and a time of such an event, may be determined based on the light signals that are transmitted or received.

The type or form of such sensors provided in association with an event generator system are not limited. Moreover, one of the sensors may be in communication with a central processor or server of an event generator system that may receive information or data from such sensors, and provide such information or data (e.g., digital and/or analog data) to one or more other computing devices or resources that may be connected to the network 290, or for any other purpose. Alternatively, one or more of such sensors may be outfitted with processors and/or transceivers for independently transmitting or receiving information or data (e.g., digital and/or analog data) to or from one or more other computing devices or resources that may be connected to the network 290, or for any other purpose.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

Those of ordinary skill in the pertinent arts will understand that process steps described herein as being performed by a "materials handling facility," an "event generator system," an "actor" (or "customer," or "user," or "worker," or "human operator") or like terms, may be automated steps performed by their respective computer devices or resources, or implemented within software modules (or computer programs) executed by one or more general purpose computers. Those of ordinary skill in the pertinent arts would also recognize that process steps described as being performed by a "materials handling facility," an "event generator system" or an "actor" (or "customer," or "user," or "worker," or "human operator") may be typically performed by a human, but could, alternatively, be performed by an automated agent.

The materials handling facility 210 (or any actors associated therewith) and/or the imaging devices 220-1, 220-2 . . . 220-n may use any web-enabled or Internet applications or features, any other client-server applications or features, or other messaging techniques, to connect to the network 290 or to communicate with one another. For example, the servers 212 may be adapted to transmit or receive information or data in the form of synchronous or asynchronous messages to or from the imaging devices 220-1, 220-2 . . . 220-n, or any other computer device (e.g., any device having any number of other servers, data stores, processors or the like) in real time or in near-real time, or in one or more offline processes, via the network 290. Those of ordinary skill in the pertinent art would recognize that the materials handling facility 210 (or any actors associated therewith) or the imaging devices 220-1, 220-2 . . . 220-n may operate any of a number of computing devices or resources that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a transitory and/or non-transitory computer-readable medium that is within or accessible by computers or computer components such as the servers 212, the data stores 214, the processor 216, the imaging devices 220-1, 220-2 . . . 220-n, the processor 234-i, or any other computers or control systems having sequences of instructions which, when executed by a processor (e.g., a central processing unit, or "CPU," or a graphics processing unit, or "GPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an imaging device, or two or more imaging devices, which may control one or more aspects of the capture, processing and/or storage of imaging data. In some other implementations, each of such functions or tasks may be executed by processors that are external to an imaging device, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more imaging devices, while other functions or tasks may be executed by processors located in one or more other physical, alternate or virtual locations.

Figure 3:
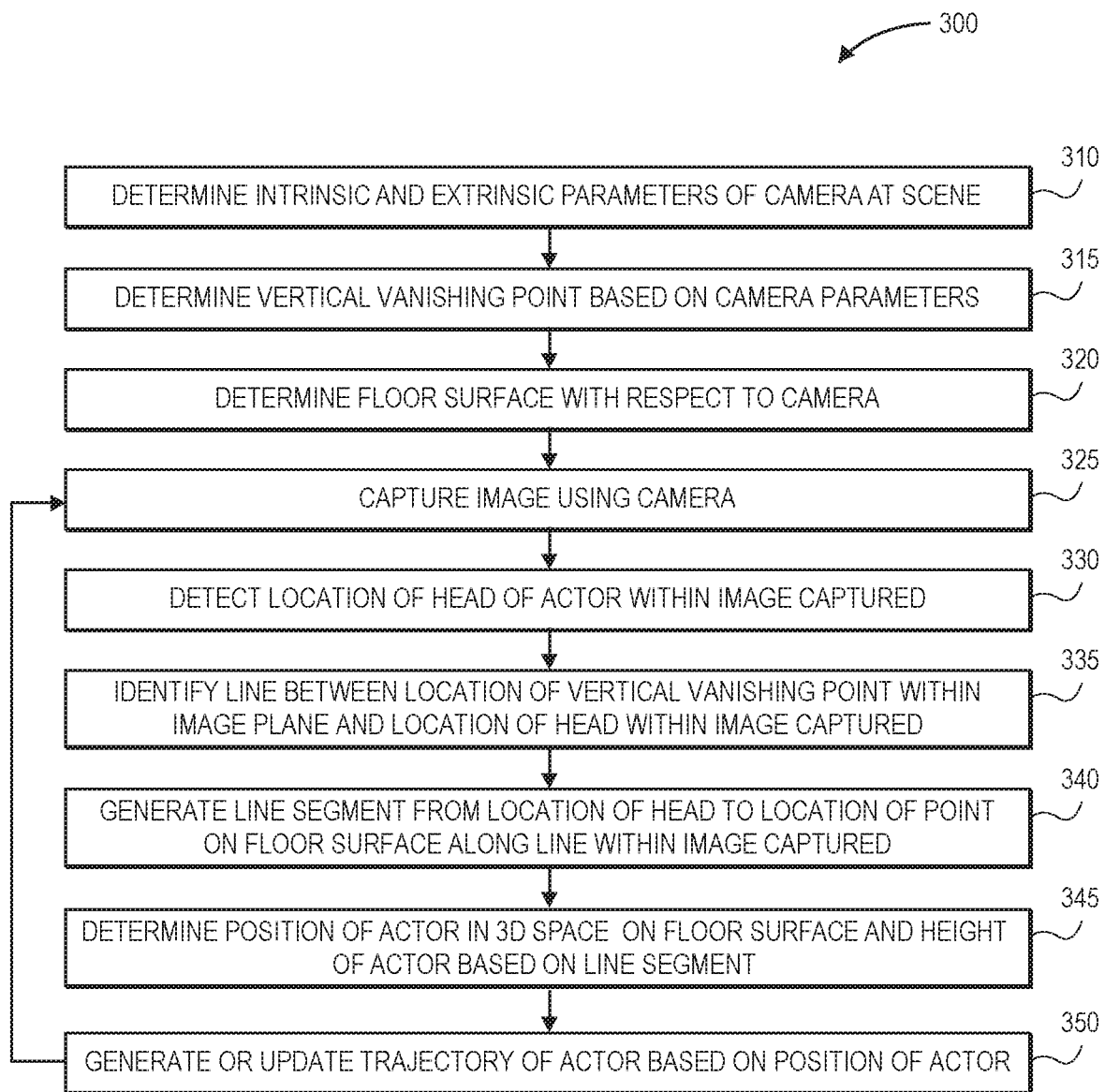
FIG. 3 is a flow chart of one process for locating actors in accordance with implementations of the present disclosure.

Referring to FIG. 3, a flow chart 300 of one process for locating actors in accordance with implementations of the present disclosure is shown. At box 310, intrinsic and extrinsic parameters of a camera mounted at a scene are determined. For example, the camera may be mounted above storage units, floor surfaces and/or any other features of the scene with an axis of orientation that is aligned substantially vertically downward, or at any angle with respect to normal. Additionally, in some implementations, the camera may be mounted in a housing along with one or more other cameras, e.g., within a dual camera module housing. The scene may include one or more portions of a materials handling facility, a financial institution, a transportation center, or any other indoor or outdoor space.

At box 315, a vertical vanishing point is determined based on the intrinsic and extrinsic parameters of the camera. The vertical vanishing point is a location within or in association with an image plane, or a position in 3D space corresponding to such a location, at which parallel lines (e.g., lines corresponding to vertical surfaces or edges of objects) on the scene appear to converge from the perspective of the camera. The vertical vanishing point may be determined based on the position of an optical sensor of the camera, and any intrinsic and extrinsic attributes of the camera. In some implementations, the vertical vanishing point may be within a field of view of the camera, and lines corresponding to vertical surfaces or edges of objects depicted within an image may appear to converge at a location of the image corresponding to the vertical vanishing point within the perimeter of the image. In some implementations, however, the vertical vanishing point may reside outside of a field of view of the camera, and lines corresponding to vertical surfaces or edges of objects depicted within an image may appear to converge at a location beyond a perimeter of the image that corresponds to the vertical vanishing point.

At box 320, the floor surface is determined with respect to the camera. For example, where the camera is mounted in a fixed orientation above the floor surface, the floor surface may be determined as a plane that intersects a field of view of the camera. Alternatively, or additionally, the floor surface may be determined to include any set of points in 3D space onto which one or more actors may travel within the materials handling facility, and may be in any location with respect to the field of view of the camera.

At box 325, an image is captured using the camera. For example, the image may be a visual image (e.g., a color image, a grayscale image or a black-and-white image) that is captured as a single image, or as one of a plurality of images at a frame rate, e.g., fifteen, thirty or forty-five frames per second, and may be captured by a camera that is configured to capture visual images only, or both visual images and depth images.

At box 330, a location of a head (or another body part) of an actor is detected within the image captured at box 325 by one or more processor units operating on the camera. The location of the head may be detected in any manner, such as by providing the image as an input to an artificial neural network (e.g., a convolutional neural network, such as a fully convolutional neural network) or other classifier configured to detect heads or any other body parts of actors, either as a single task for which the artificial neural network is trained, or as one of a plurality of tasks, e.g., where the artificial neural network is a multi-task network. The location of the head may be detected based on an output received from the artificial neural network, or in any other manner. Any number of heads or other body parts may be detected within an image, e.g., based on outputs received from an artificial neural network, or in any other manner, in accordance with implementations of the present disclosure.

At box 335, a line extending between a location of the vertical vanishing point within the image plane of the camera, or in association with the image plane of the camera, and the location of the head detected within the image at box 330 is identified by the one or more processor units operating on the camera. Where a plurality of heads are detected at locations within the image, a corresponding number of lines may be identified between locations of such heads and the location of the vertical vanishing point.

At box 340, a line segment is generated from a location of the head of the actor to a location of a point on the floor surface, along the line identified at box 335, by the one or more processor units operating on the camera. The line segment thus projects the position of the head detected at box 330 onto the floor surface determined at box 320. For example, where the actor is presumed to be standing upright, a line segment extending between the location of the head of the actor to the floor surface corresponds to a height of the actor, e.g., in a given posture or pose. In some implementations, the line segment may be generated based on an output received from the same artificial neural network that detected the location of the head within the image at box 330, e.g., a multi-task network, or in any other manner. In some implementations, where the position and orientation of the camera are known with respect to the floor surface, an artificial neural network may be trained to predict a length of a line segment extending from a location of a detected head to the floor surface, along a line extending to the vertical vanishing point. Additionally, as is noted above, where a plurality of heads are detected at locations within the image, a corresponding number of line segments may be generated from the locations of such heads and locations of one or more points on the floor surface, along lines between the locations of such heads and the location of the vertical vanishing point.

At box 345, a position of the actor in 3D space on a ground plane of the scene and a height of the actor are determined based on the line segment by the one or more processor units operating on the camera. For example, a position of a distal end of the line segment generated at box 340, which is predicted to contact or correspond to the floor surface, may be associated with the actor having the head detected at box 330 at a time that the image was captured, e.g., at a proximal end of the line segment. A height of the actor may be predicted based on a length of the line segment. Additionally, the position of the actor may be identified or represented according to any coordinate system, e.g., a rectangular (or Cartesian) coordinate system, with x, y and z coordinates with respect to an origin, or any other type or form of coordinate system. Positions of any number of actors in 3D space having heads (or other body parts) detected within the image may be determined in a similar manner.

At box 350, a trajectory of the actor is generated or updated based on the position of the actor determined at box 345. In some implementations, a trajectory, or a tracklet, including a set of one or more positions of the actor may be established based on an initial position of the actor, as determined based on a line segment extending from a head of the actor toward the floor surface, or updated based on positions of the actor that are subsequently determined based on line segments generated in a similar manner. Additionally, the camera may assign a unique identifier to the trajectory.

Where a position of an actor is determined, e.g., based on line segments generated at box 340, the position of the actor may be determined to correlate to positions of trajectories that were previously generated or updated, in order to determine whether the actor is a new and previously undetected actor, or whether the actor corresponds to one of the previously generated trajectories. In some implementations, such as where visual descriptors (e.g., appearance features such as colors, textures, shading, shapes or other visual attributes) associated with a previously generated or updated trajectory is known, visual descriptors of pixels corresponding to the actor for which the position was determined at box 345 may be compared to the visual descriptors of pixels associated with the trajectory to determine whether the actor may be linked to the trajectory. The visual descriptors of pixels corresponding to the actor may be determined in any manner, such as based on one or more outputs of an artificial neural network or other classifier that detected the location of the head at box 330, or one or more outputs of an artificial neural network that generated the line segment at box 340, or in any other manner. Additionally, in some implementations, the generated or updated trajectory may be transmitted to a server or other computer system in communication with the camera that captured the image at box 325, or one or more other cameras.

Subsequently, after generating or updating the trajectory of the actor, the process returns to box 325, where another image is captured using the camera. The process steps shown in boxes 325 through 350 may be repeated as many times as is necessary, or halted when one or more stopping conditions, or events that indicate that determining locations of the actor (or other actors) is no longer desired, e.g., when an object is no longer visible in an image, when a maximum tracking time has elapsed, when a predetermined stopping time has been reached, are determined.

As is discussed above, positions of heads or other body parts of actors in 3D space may be determined by identifying a vertical vanishing point within an image plane of a camera, or in association with the image plane of the camera, and detecting the heads within an image captured by the camera. A line extending between a location of a detected head and a location of the vertical vanishing point may be determined, and a position of the actor on a floor surface of the scene may be determined from a line segment aligned along the line between the location of the detected head and a location on the floor surface. Referring to FIGS. 4A through 4M, views of aspects of one system for locating actors in accordance with implementations of the present disclosure are shown. Except where otherwise noted, reference numerals preceded by the number "4" shown in FIGS. 4A through 4M indicate components or features that are similar to components or features having reference numerals preceded by the number "2" shown in FIG. 2A or 2B, or by the number "1" shown in FIGS. 1A through 1K.

Figure 4A:
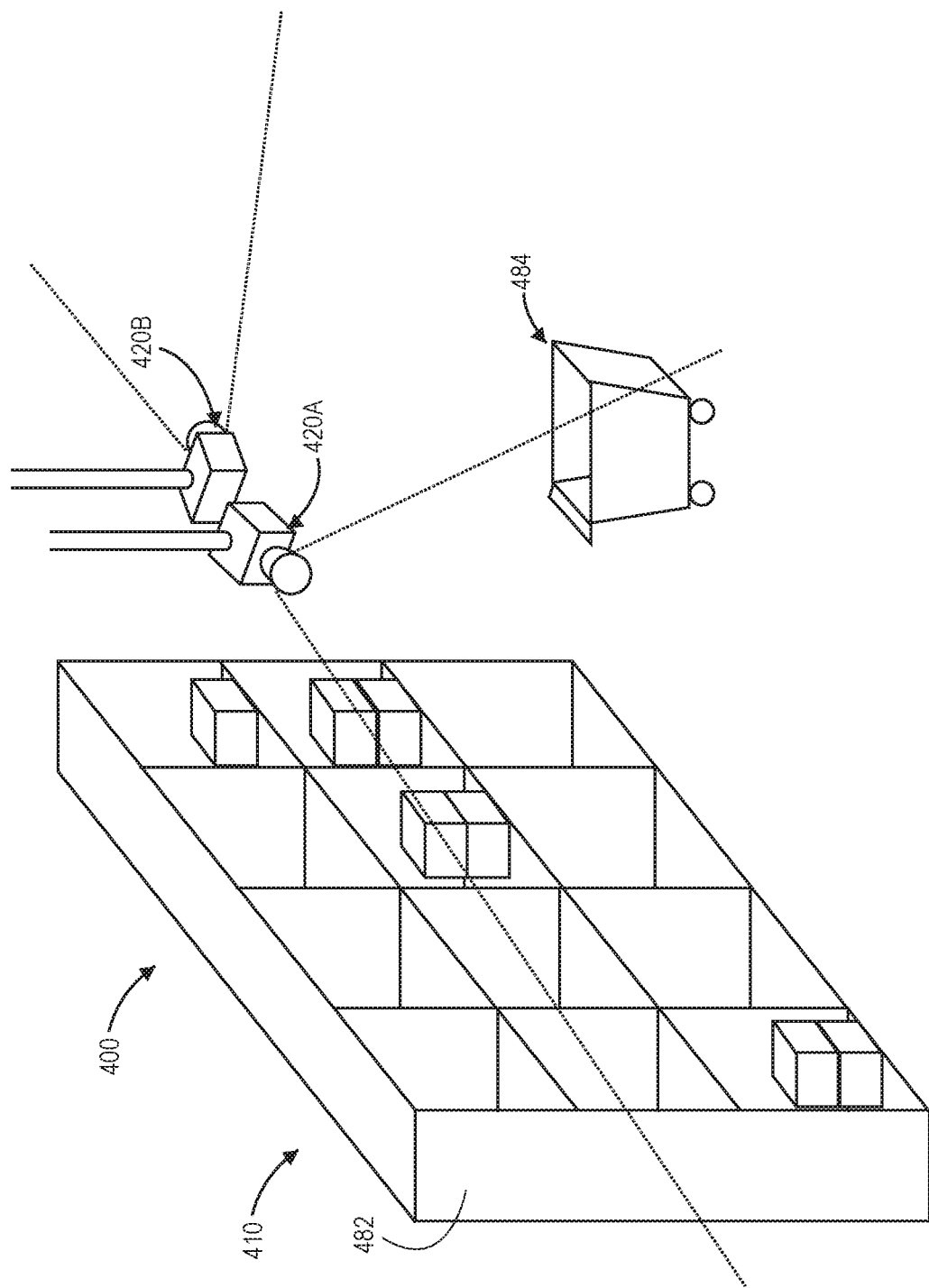

As is shown in FIGS. 4A and 4B, a pair of cameras 420A, 420B are mounted above a materials handling facility 410 having a shelving unit 482 and a cart 484. The cameras 420A, 420B may include any number of lenses, memory or storage components, photosensitive surfaces, filters, chips, electrodes, clocks, boards, timers, power sources, connectors or any other components. The cameras 420A, 420B have fields of view which overlap at least in part below the cameras 420A, 420B, and are provided at an angle with respect to one another. In some implementations, the cameras 420A, 420B may be provided in common housing, and may have fields of view extending from surfaces provided at a dihedral angle of greater than one hundred eighty degrees, e.g., approximately two hundred twenty-five degrees. Each of the cameras 420A, 420B may be configured to capture color images, grayscale images, black-and-white images, or any other type or form of imaging data (e.g., depth images).

In some implementations, the cameras 420A, 420B may include one or more sensors that are configured to capture visual imaging data at relatively high levels of resolution, e.g., eight to nine megapixels per image, and at relatively high frame rates, e.g., fifteen or more frames per second (fps). Such sensors may include arrays of photodetectors or photosensitive components such as charge coupled devices ("CCD"), complementary metal-oxide sensors ("CMOS"), photodiodes, or the like. The sensors may capture light reflected from objects and assign one or more quantitative values (e.g., red, green, blue or other color values, or distances or ranges to such objects) to aspects of the reflected light. Alternatively, or additionally, in some implementations, the cameras 420A, 420B may be configured to capture any other imaging data, such as depth imaging data, or visual imaging data at any levels of resolution or frame rates.

The cameras 420A, 420B may be in communication with one or more external devices or systems, e.g., by one or more network connections (not shown). By aligning the cameras 420A, 420B with non-parallel axes of orientation, the cameras 420A, 420B are able to capture imaging data from a larger area than a system that includes just a single camera, thereby reducing hardware, installation and maintenance costs. Additionally, in some implementations, the cameras 420A, 420B may be self-powered, e.g., by one or more power sources internal to or onboard the cameras 420A, 420B, such as batteries or fuel cells. In some other implementations, however, the cameras 420A, 420B may receive alternating current (or AC) or direct current (or DC) power from one or more external power sources, e.g., by one or more conductors or other connectors. For example, the cameras 420A, 420B may receive power by a dedicated connection to such sources, e.g., according to a Power over Ethernet (or "PoE") standard or system that may also be utilized to transfer information or data to or from the cameras 420A, 420B.

As is shown in FIG. 4B, the cameras 420A, 420B are aligned with axes of orientation $\Phi_A$, $\Phi_B$ provided at non-parallel angles. The cameras 420A, 420B are configured to capture images as actors execute one or more interactions with the shelving unit 482 and/or the cart 484. Alternatively, any number of other two-dimensional or three-dimensional storage units for accommodating items and/or containers of such items may be located within the fields of view of the cameras 420A, 420B, including but not limited to one or more aisles, rows, bays, slots, bins, racks, tiers, bars, hooks, cubbies or other like systems, or any other appropriate regions or stations, which may be flat or angled, stationary or mobile, and of any shape or size.

As is also shown in FIG. 4B, vertical vanishing points $V_A$, $V_B$ within image planes $P_A$, $P_B$ of the cameras 420A, 420B may be determined based on the positions of the optical centers of the cameras 420A, 420B. For example, where the positions of the optical centers are known, e.g., according to the extrinsic parameters of the cameras 420A, 420B, the locations of the vertical vanishing points $V_A$, $V_B$ may be determined by identifying points on a floor surface vertically below each of the optical centers, and projecting such points into the image planes $P_A$, $P_B$. Thus, as is shown in FIGS. 4C and 4D, the vertical vanishing points $V_A$, $V_B$ correspond to locations within the image planes $P_A$, $P_B$ of the cameras 420A, 420B, and to locations within images captured by the cameras 420A, 420B, to which vertical lines within such images appear to converge from the perspective of the cameras 420A, 420B.

Figure 4F:
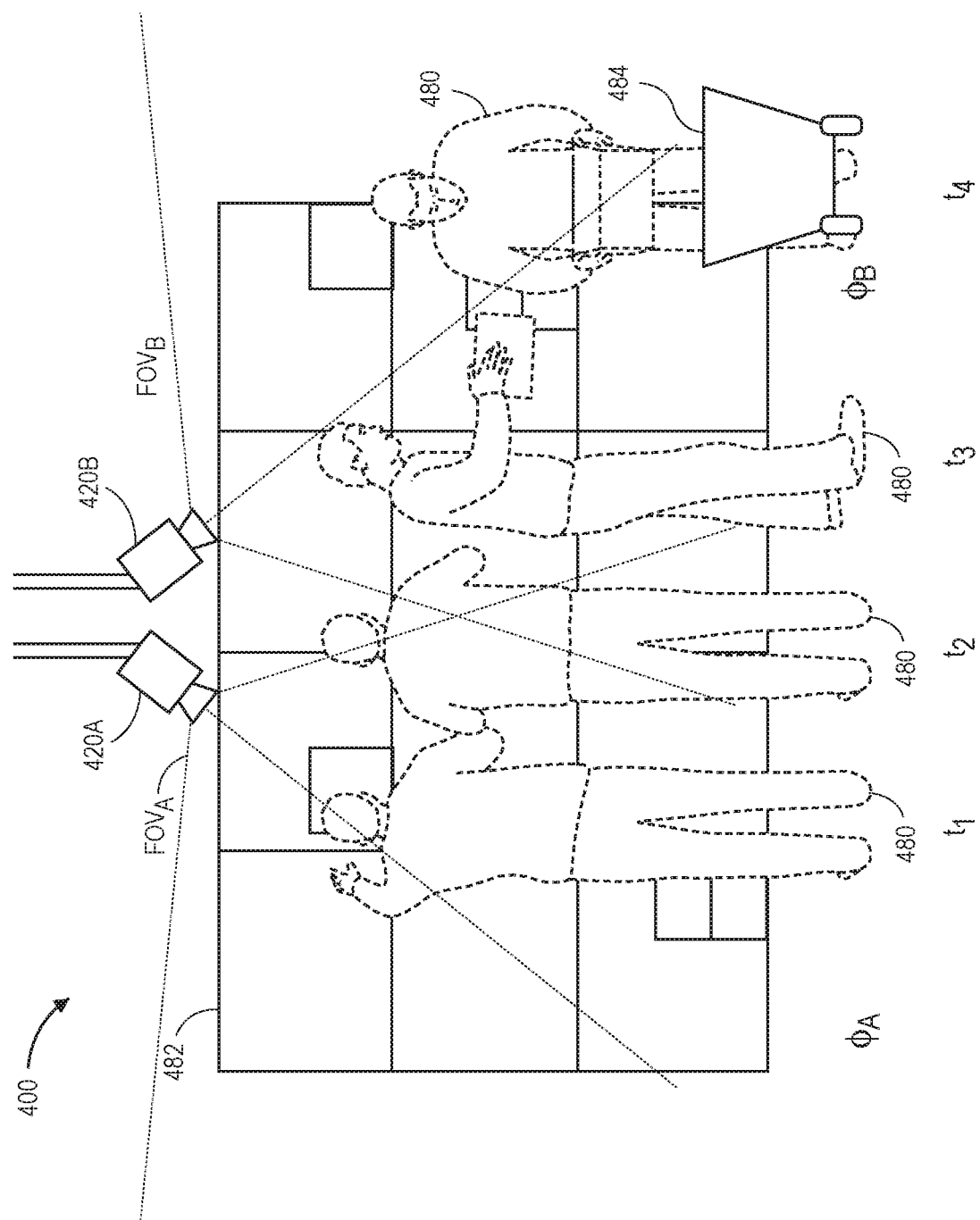

After the axes of orientation $\Phi_A$, $\Phi_B$ and the vertical vanishing points $V_A$, $V_B$ of the cameras 420A, 420B have been identified within each of the image planes $P_A$, $P_B$, the cameras 420A, 420B may capture images as one or more actors interact with the shelving unit 482 or the cart 484, or otherwise execute any number of poses or gestures within the fields of view of the cameras 420A, 420B. For example, as is shown in FIGS. 4E and 4F, an actor 480 may travel within the fields of view of the cameras 420A, 420B while removing an item 40 from the shelving unit 482 and placing the item 40 into the cart 484 over a range of times $t_1$, $t_2$, $t_3$, $t_4$.

As is shown in FIG. 4G, an image 422-1A captured by the camera 420A at the time $t_1$ may be processed to detect a head $H_{1A}$ of the actor 480, as the actor 480 interacts with the shelving unit 482. For example, in some implementations, the image 422-1A may be provided to an artificial neural network that is trained to detect heads within imaging data as an input, and a set of coordinates or other identifier of a location of the head $H_{1A}$ of the actor 480 may be determined based on an output received from the artificial neural network. Additionally, a 3D position of the actor 480 at the time $t_1$ may be determined by generating a line segment extending from the location of the head $H_{1A}$ of the actor 480 to a location corresponding to a position $(x, y, z)_{1A}$ on a floor surface of the materials handling facility 410. The line segment is aligned along a line extending between the location of the head $H_{1A}$ of the actor 480 and a location of the vertical vanishing point $V_A$ within the image plane $P_A$ of the camera 420A. In some implementations, a length of the line segment, e.g., a height of the actor 480, or the location corresponding to the position $(x, y, z)_{1A}$ on the floor surface of the materials handling facility 410 corresponding to a distal end of the line segment, may be determined based on an output received from an artificial neural network, such as the same artificial neural network that detected the location of the head $H_{1A}$ of the actor 480, e.g., a multi-task network.

Similarly, as is shown in FIG. 4H, an image 422-2A captured by the camera 420A at the time $t_2$ may be processed to detect a head $H_{2A}$ of the actor 480, as the actor 480 travels with the item 40 from the shelving unit 482 toward the cart 484. A 3D position of the actor 480 at the time $t_2$ may be determined by generating a line segment extending from a location of the head $H_{2A}$ of the actor 480 to a location corresponding to a position $(x, y, z)_{2A}$ on the floor surface of the materials handling facility 410, aligned along a line extending between the location of the head $H_{2A}$ of the actor 480 and the location of the vertical vanishing point $V_A$ within the image plane $P_A$ of the camera 420A. The location of the head $H_{2A}$ of the actor 480 and the location corresponding to the position $(x, y, z)_{2A}$ on the floor surface may be determined in any manner, such as based on outputs received from an artificial neural network.

Figure 4I:
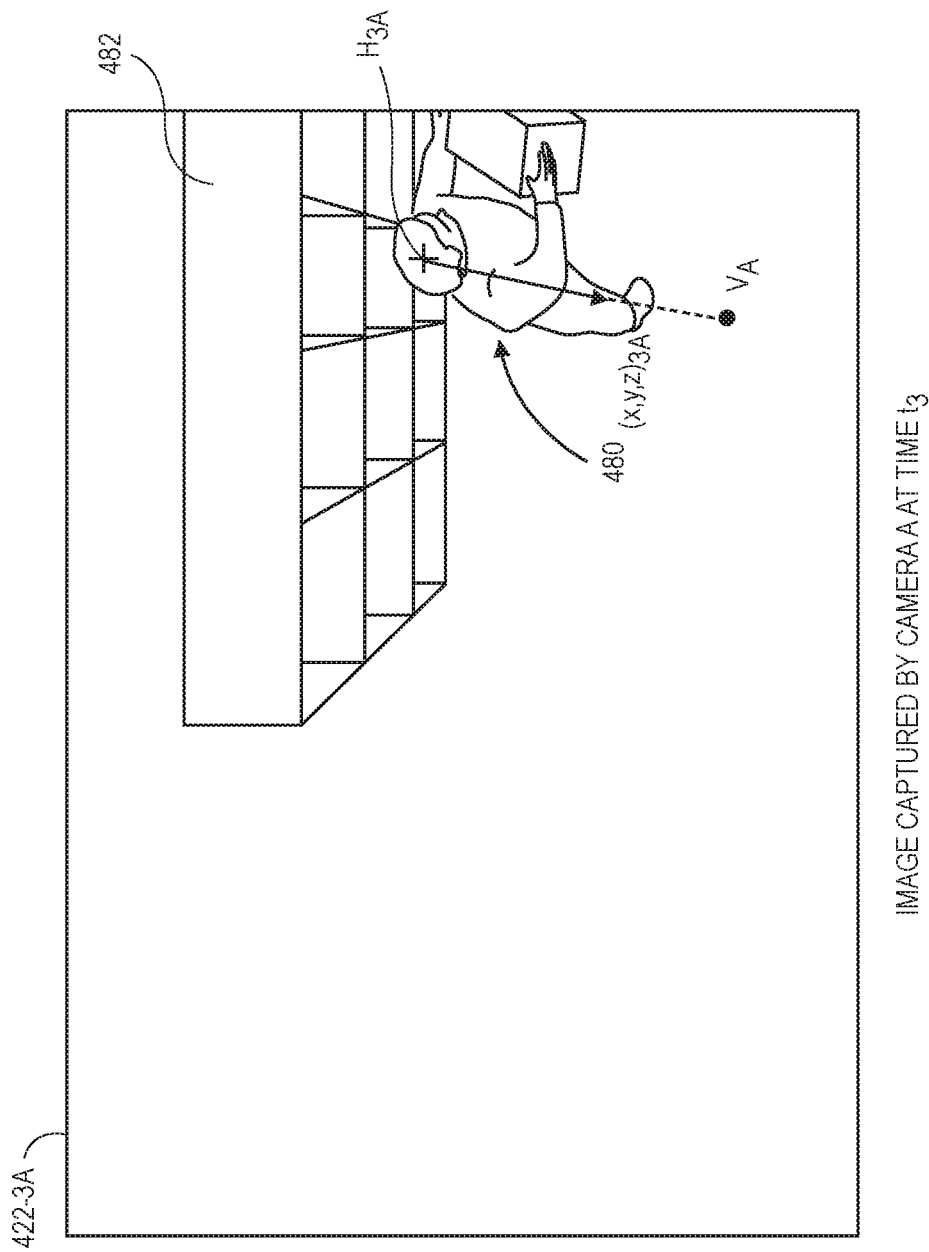

As is shown in FIG. 4I, an image 422-3A captured by the camera 420A at the time $t_3$ may be processed to detect a head $H_{3A}$ of the actor 480, as the actor 480 travels with the item 40 from the shelving unit 482 toward the cart 484. A 3D position of the actor 480 at the time $t_3$ may be determined by generating a line segment extending from a location of the head $H_{3A}$ of the actor 480 to a location corresponding to a position $(x, y, z)_{3A}$ on the floor surface of the materials handling facility 410, aligned along a line extending between the location of the head $H_{3A}$ of the actor 480 and the location of the vertical vanishing point $V_A$ within the image plane $P_A$ of the camera 420A. The location of the head $H_{3A}$ of the actor 480 and the location corresponding to the position $(x, y, z)_{3A}$ on the floor surface may be determined in any manner, such as based on outputs received from an artificial neural network.

Figure 4J:
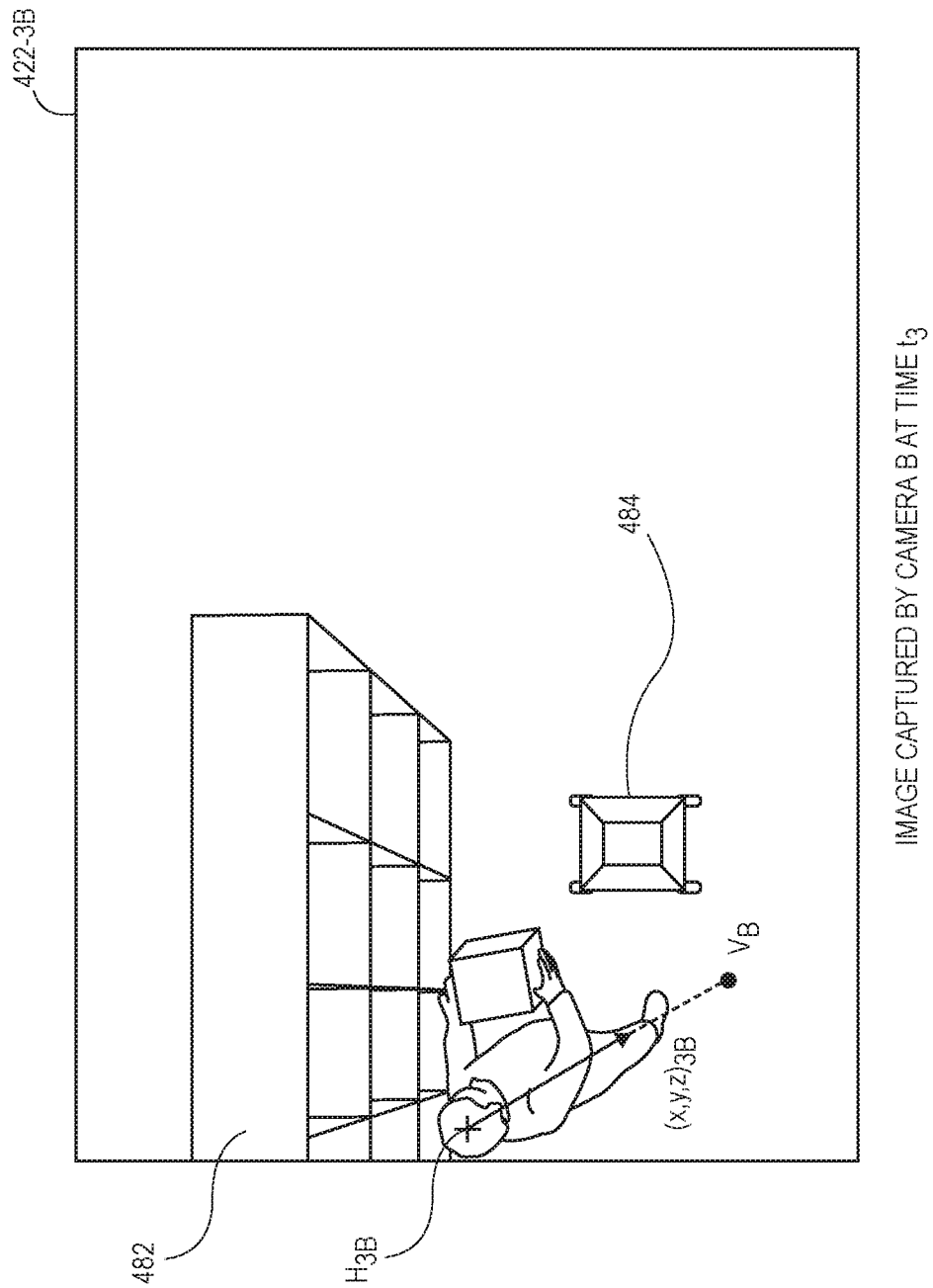

Likewise, as is shown in FIG. 4J, an image 422-3B captured by the camera 420B at the time $t_3$ may be processed to detect a head $H_{3B}$ of the actor 480, as the actor 480 travels with the item 40 from the shelving unit 482 toward the cart 484. A 3D position of the actor 480 at the time $t_3$ may be determined by generating a line segment extending from a location of the head $H_{3B}$ of the actor 480 to a location corresponding to a position $(x, y, z)_{3B}$ on the floor surface of the materials handling facility 410, aligned along a line extending between the location of the head $H_{3B}$ of the actor 480 and the location of the vertical vanishing point $V_B$ within the image plane $P_B$ of the camera 420B. The location of the head $H_{3B}$ of the actor 480 and the location corresponding to the position $(x, y, z)_{3B}$ on the floor surface may be determined in any manner, such as based on outputs received from an artificial neural network operating on the camera 420B. As is shown in FIG. 4K, an image 422-4B captured by the camera 420B at the time $t_4$ may be processed to detect a head $H_{4B}$ of the actor 480, as the actor 480 deposits the item 40 into the cart 484. A 3D position of the actor 480 at the time $t_4$ may be determined by generating a line segment extending from a location of the head $H_{4B}$ of the actor 480 to a location corresponding to the position $(x, y, z)_{4B}$ on the floor surface of the materials handling facility 410, aligned along a line extending between the location of the head $H_{4B}$ of the actor 480 and the location of the vertical vanishing point $V_B$ within the image plane $P_B$ of the camera 420B. The location of the head $H_{4B}$ of the actor 480 and the location corresponding to the position $(x, y, z)_{4B}$ on the floor surface may be determined in any manner, such as based on outputs received from an artificial neural network.

In accordance with implementations of the present disclosure, the cameras 420A, 420B may generate trajectories based on detections of the actor 480 within images captured thereby, and determine visual descriptors (e.g., appearance features, motion features, or geometry features) of pixels of such images that correspond to the actor 480. The cameras 420A, 420B may transmit such trajectories and visual descriptors to a central server 412 in communication with the cameras 420A, 420B, and any others.

Figure 4L:
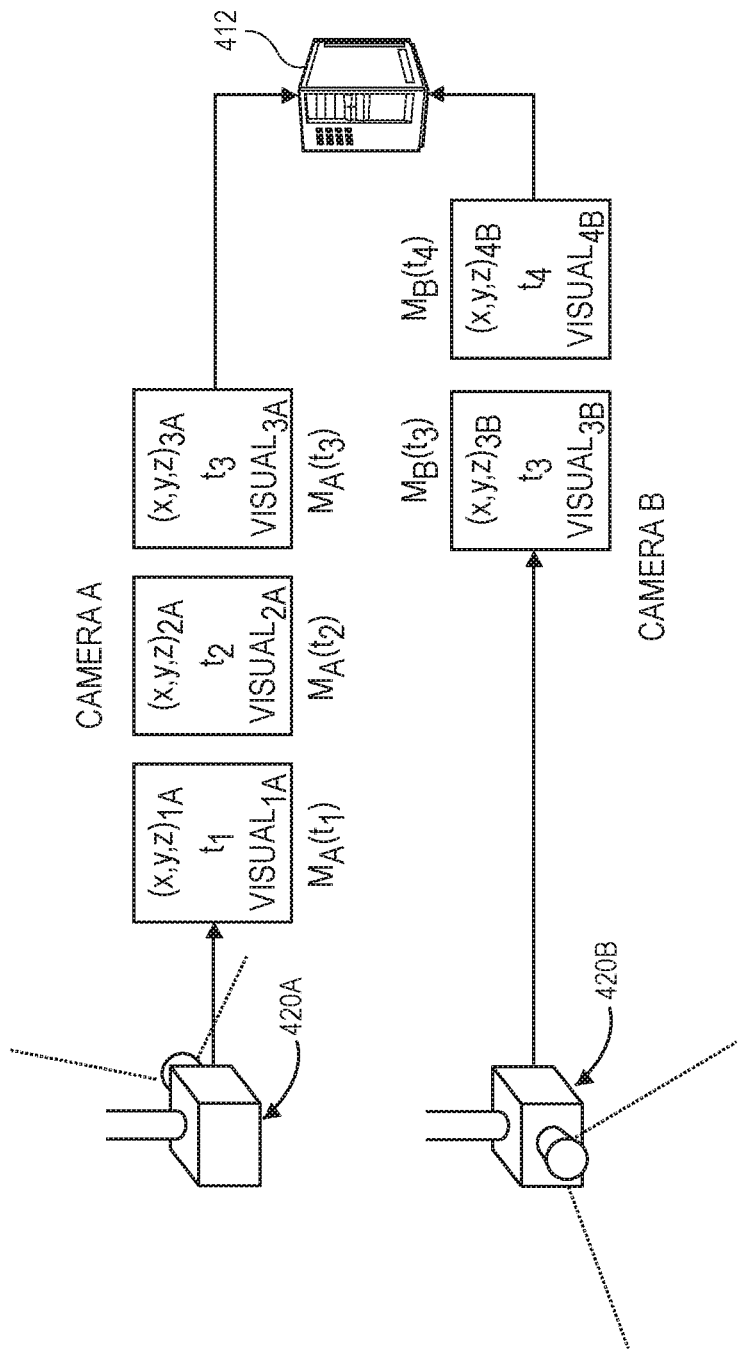

For example, as is shown in FIG. 4L, the camera 420A generates a trajectory $M_A(t)$ based on the detections of the actor 480 within the images 422-1A, 422-2A, 422-3A, including the positions $(x, y, z)_{1A}$, $(x, y, z)_{2A}$, $(x, y, z)_{3A}$ of the actor 480 at the times $t_1$, $t_2$, $t_3$, and visual descriptors $VISUAL_{1A}$, $VISUAL_{2A}$, $VISUAL_{3A}$ of pixels corresponding to the actor 480 at the times $t_1$, $t_2$, $t_3$. For example, upon determining the visual descriptors $VISUAL_{1A}$ of the pixels corresponding to the actor 480 in the image 422-1A captured at the time $t_1$, and the position $(x, y, z)_{2A}$ of the actor 480 at the time $t_1$, the camera 420A may match the visual descriptors $VISUAL_{1A}$ of the pixels with the visual descriptors $VISUAL_{2A}$ of the pixels corresponding to the actor 480 in the image 422-2A captured at the time $t_2$, and generate or update the trajectory $M_A(t)$ based on the movement of the pixels from the time $t_1$ to the time $t_2$. Likewise, the camera 420 may also detect the visual descriptors $VISUAL_{3A}$ of the pixels corresponding to the actor 480 in the image 422-3A captured at the time $t_3$, the camera 420A may match the visual descriptors $VISUAL_{2A}$ of the pixels with the visual descriptors $VISUAL_{3A}$, and generate or update the trajectory $M_A(t)$ based on the movement of the pixels from the time $t_2$ to the time $t_3$.

Similarly, as also shown in FIG. 4L, the camera 420B generates a trajectory $M_B(t)$ based on the detections of the actor 480 within the images 422-3B, 422-4B, including positions $(x, y, z)_{3B}$, $(x, y, z)_{4B}$ of the actor 480 at the times $t_3$, $t_4$, and visual descriptors $VISUAL_{3B}$, $VISUAL_{4B}$ of the actor 480 at the times $t_3$, $t_4$. For example, upon determining the visual descriptors $VISUAL_{3B}$ of the pixels corresponding to the actor 480 in the image 422-3B captured at the time $t_3$, and the position $(x, y, z)_{3B}$ of the actor 480 at the time $t_3$, the camera 420B may detect the visual descriptors $VISUAL_{2A}$ of the pixels corresponding to the actor 480 in the image 422-4A captured at the time $t_4$, the camera 420B may match the visual descriptors $VISUAL_{3B}$ of the pixels with the visual descriptors $VISUAL_{4B}$, and generate or update the trajectory $M_B(t)$ based on the movement of the pixels from the time $t_3$ to the time $t_4$.

As is further shown in FIG. 4L, the cameras 420A, 420B provide the positions $(x, y, z)_{1A}$, $(x, y, z)_{2A}$, $(x, y, z)_{3A}$, $(x, y, z)_{3B}$, $(x, y, z)_{4B}$, the trajectories $M_A(t)$, $M_B(t)$, and the visual descriptors $VISUAL_{1A}$, $VISUAL_{2A}$, $VISUAL_{3A}$, $VISUAL_{3B}$, $VISUAL_{4B}$ to a server (or another system) 412 over a network.

Figure 4M:
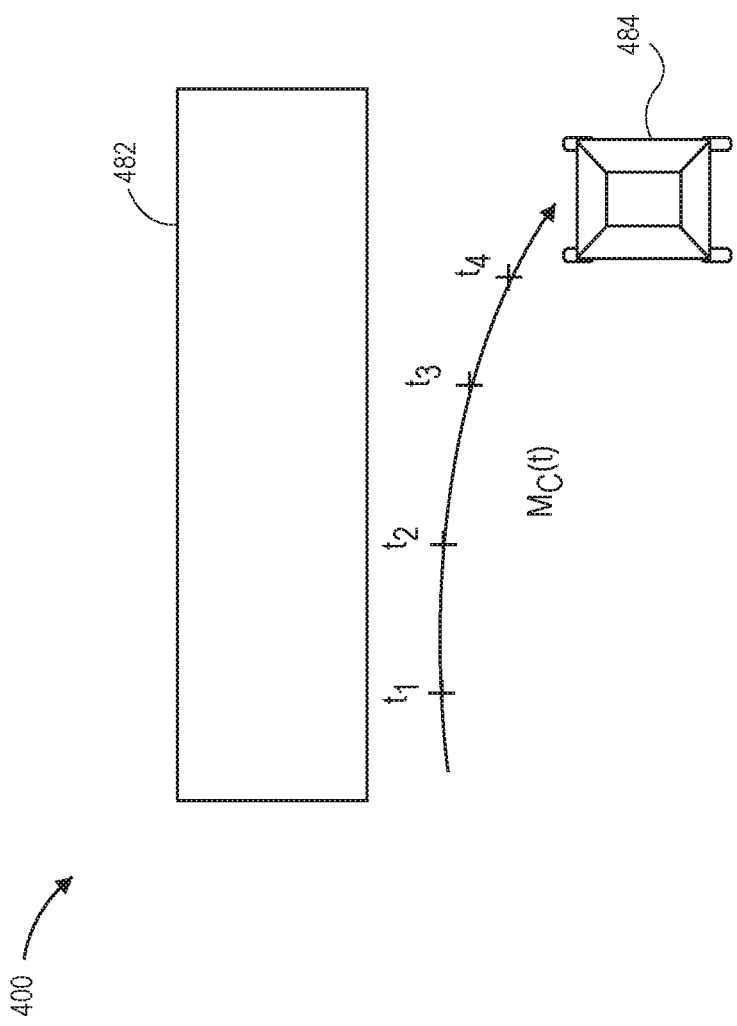

As is shown in FIG. 4M, the server 412 correlates the trajectories $M_A(t)$, $M_B(t)$ generated by the cameras 420A, 420B, e.g., by matching the positions $(x, y, z)_{1A}$, $(x, y, z)_{2A}$, $(x, y, z)_{3A}$ of the actor 480 determined at the times $t_1$, $t_2$, $t_3$, by the camera 420A with the positions $(x, y, z)_{3B}$, $(x, y, z)_{4B}$ of the actor 480 determined at the times $t_3$, $t_4$ by the camera 420B, or by matching the visual descriptors $VISUAL_{1A}$, $VISUAL_{2A}$, $VISUAL_{3A}$ of pixels depicting the actor 480 determined at the times $t_1$, $t_2$, $t_3$ by the camera 420A with the visual descriptors $VISUAL_{3B}$, $VISUAL_{4B}$ of pixels depicting the actor 480 determined at the times $t_3$, $t_4$ by the camera 420B. The server 412 may determine that the trajectory $M_A(t)$ correlates with the trajectory $M_B(t)$ on any basis, and may generate a trajectory $M_C(t)$ based on any aspect of the trajectories $M_A(t)$, $M_B(t)$.

Trajectories or visual descriptors generated by cameras may be correlated with one another in any manner and on any basis in accordance with the present disclosure. For example, multiple trajectories or visual descriptors generated for an actor by the same camera may be correlated with one another where positions of the trajectories of the actor or the visual descriptors of pixels corresponding to the actor are identified as consistent with one another, e.g., by matching the visual descriptors on a temporal basis, from frame to frame. Likewise, trajectories or visual descriptors generated for an actor by multiple cameras may be correlated where positions of such trajectories or visual descriptors of pixels corresponding to the actor are identified as consistent with one another, regardless of whether the fields of view of the cameras overlap. Referring to FIGS. 5A through 5H, views of aspects of one system for locating actors in accordance with implementations of the present disclosure are shown. Except where otherwise noted, reference numerals preceded by the number "5" shown in FIGS. 5A through 5H indicate components or features that are similar to components or features having reference numerals preceded by the number "4" shown in FIGS. 4A through 4M, by the number "2" shown in FIG. 2A or 2B, or by the number "1" shown in FIGS. 1A through 1K.

Figure 5A:
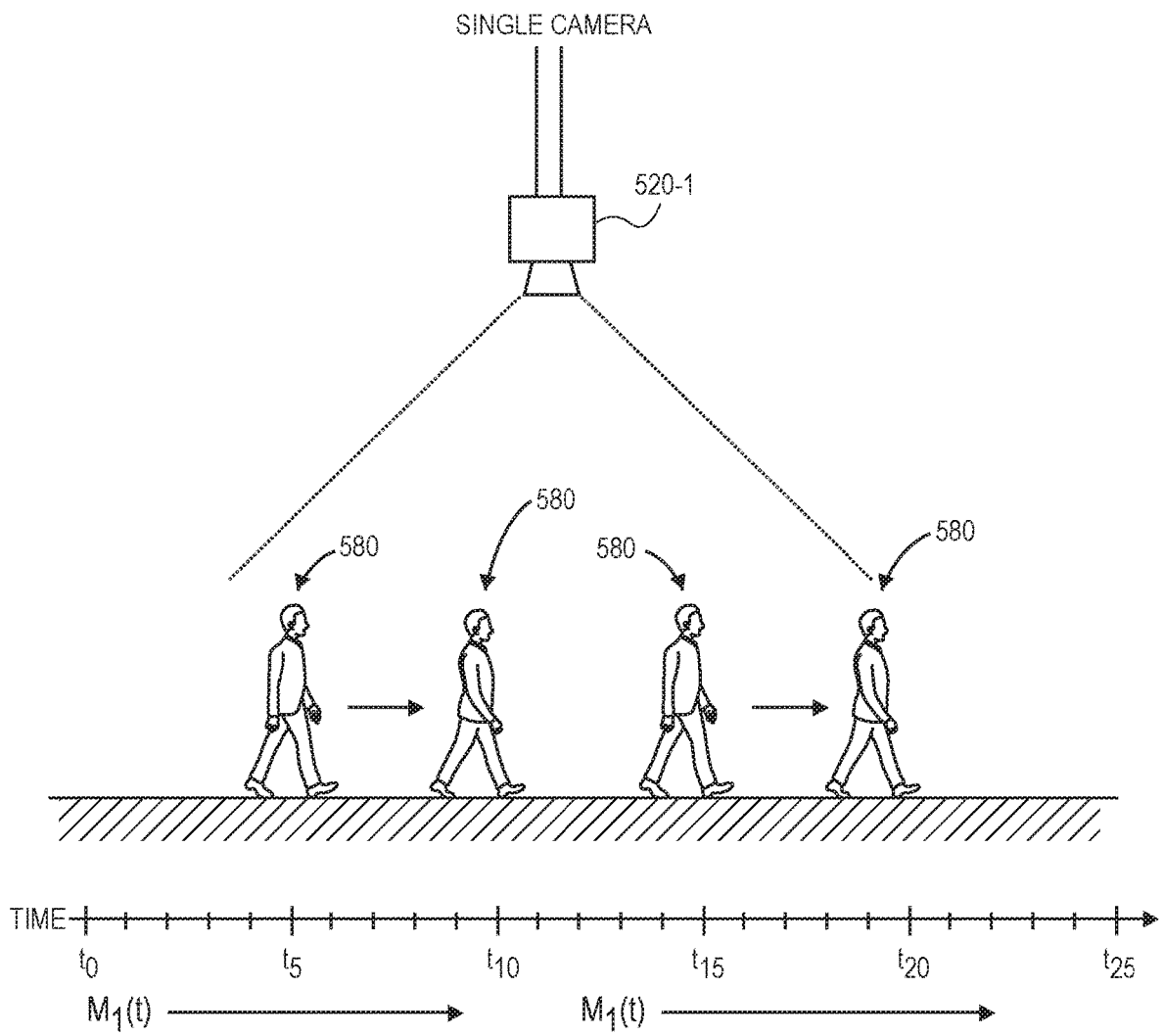
FIGS. 5A through 5H are views of aspects of one system for locating actors in accordance with implementations of the present disclosure.
Figure 5B:
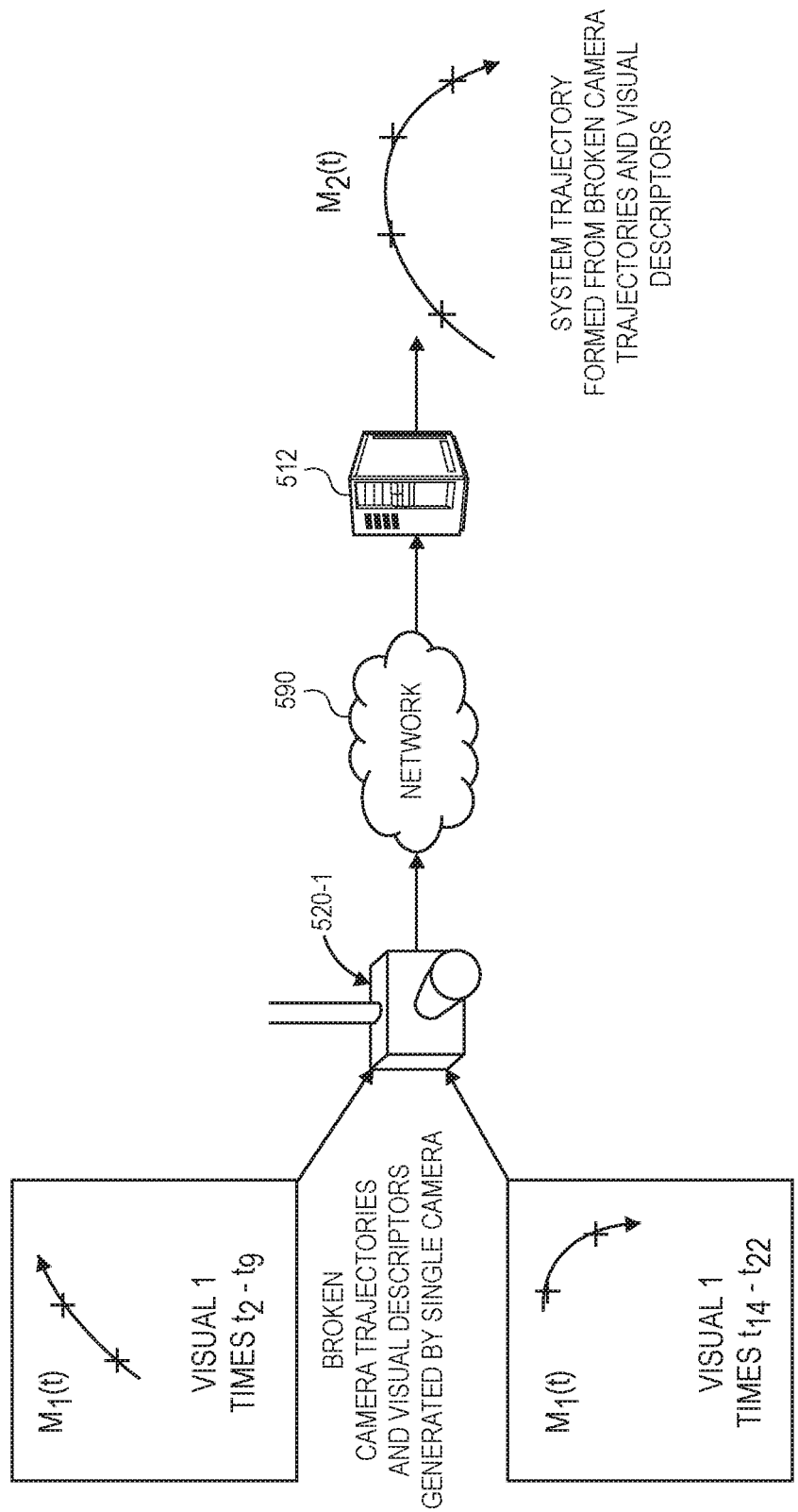

As is shown in FIGS. 5A and 5B, an actor 580 travels within a field of view of a single camera 520-1 over periods of time from time $t_0$ to $t_{25}$. A camera trajectory $M_1(t)$ may be generated and visual descriptors $VISUAL_1$ of pixels may be determined for the actor 580 based on images captured by the camera 520-1 over the period of time from time $t_2$ to $t_9$, and again from time $t_{16}$ to $t_{14}$, e.g., by determining positions of the actor 580 in 3D space, and by matching the visual descriptors $VISUAL_1$ appearing within the images captured over the periods of time from time $t_2$ to $t_9$, and from time $t_{16}$ to $t_{14}$. The camera 520-1 transmits the camera trajectory $M_1(t)$ and the visual descriptors $VISUAL_1$ to a server 512 in real time or in near-real time, and a system trajectory $M_2(t)$ may be formed by a server 512 or other system from time $t_2$ to time $t_9$, and updated after the camera 520-1 regains or reidentifies the camera trajectory $M_1(t)$ and the visual descriptors $VISUAL_1$ in images captured over a period of time from time $t_{16}$ to time $t_{24}$.

Even where the camera trajectory $M_1(t)$ and the visual descriptors $VISUAL_1$ are subsequently lost for brief durations, or are no longer detected at a sufficiently high level of confidence over such durations, the server 512 may continue to locate the actor 580, e.g., by propagating the system trajectory $M_2(t)$ over time. Upon receiving the camera trajectory $M_1(t)$ and visual descriptors corresponding to the actor 580, the server 512 may determine that the camera trajectory $M_1(t)$ received from the camera 520-1 from time $t_{14}$ to time $t_{22}$ correlates with the camera trajectory $M_1(t)$ received from the camera 520-1 from time $t_2$ to time $t_9$, such as where the visual descriptors $VISUAL_1$ determined from the images captured from time $t_2$ to time $t_9$ are consistent with the visual descriptors $VISUAL_1$ determined from the images captured from time $t_{14}$ to time $t_{22}$. The server 512 may continue to locate and/or update the system trajectory $M_2(t)$ based on any trajectories and/or visual descriptors received from the camera 520-1, or from any other cameras (not shown in FIGS. 5A and 5B).

Figure 5C:
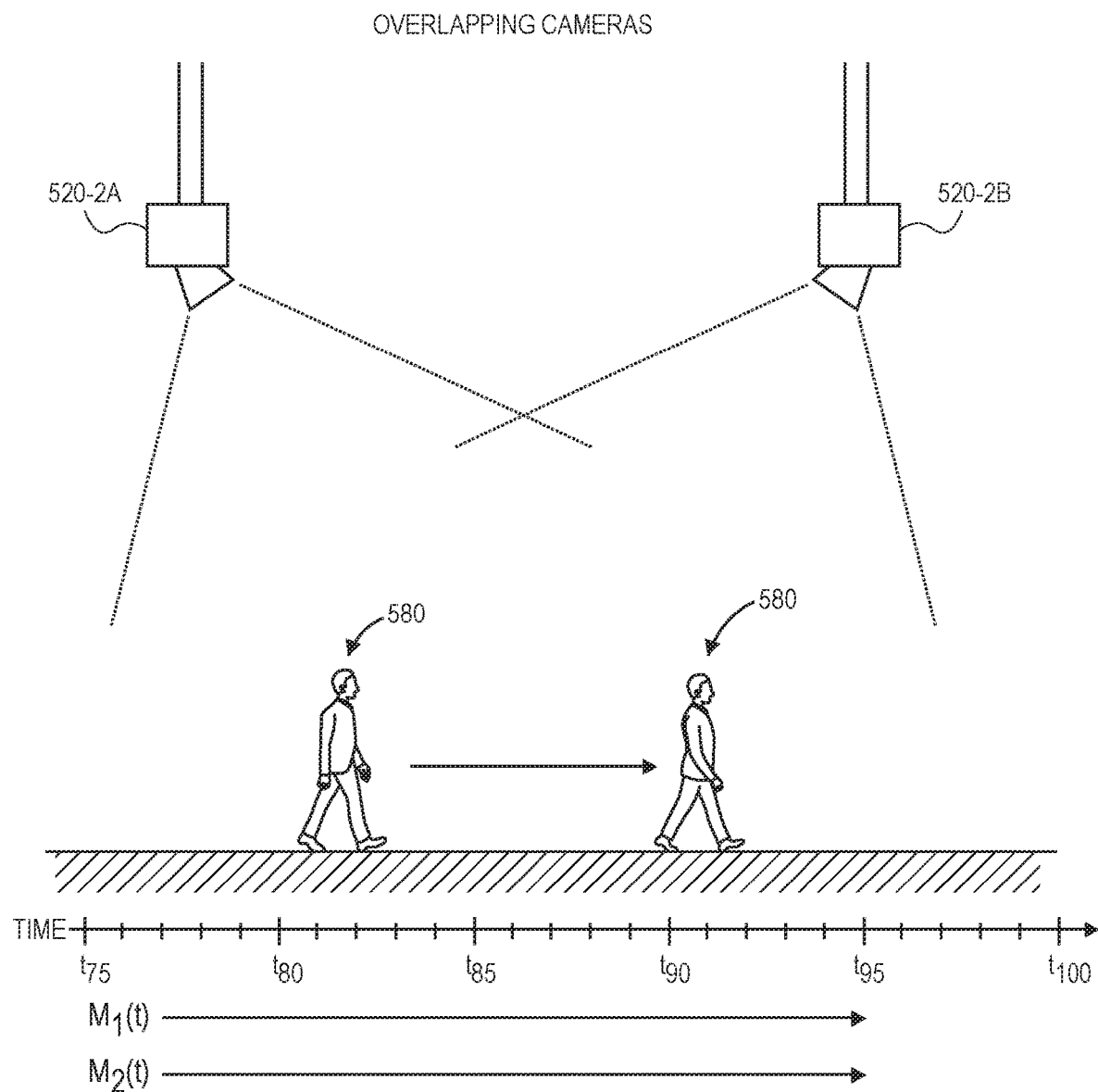
Figure 5D:
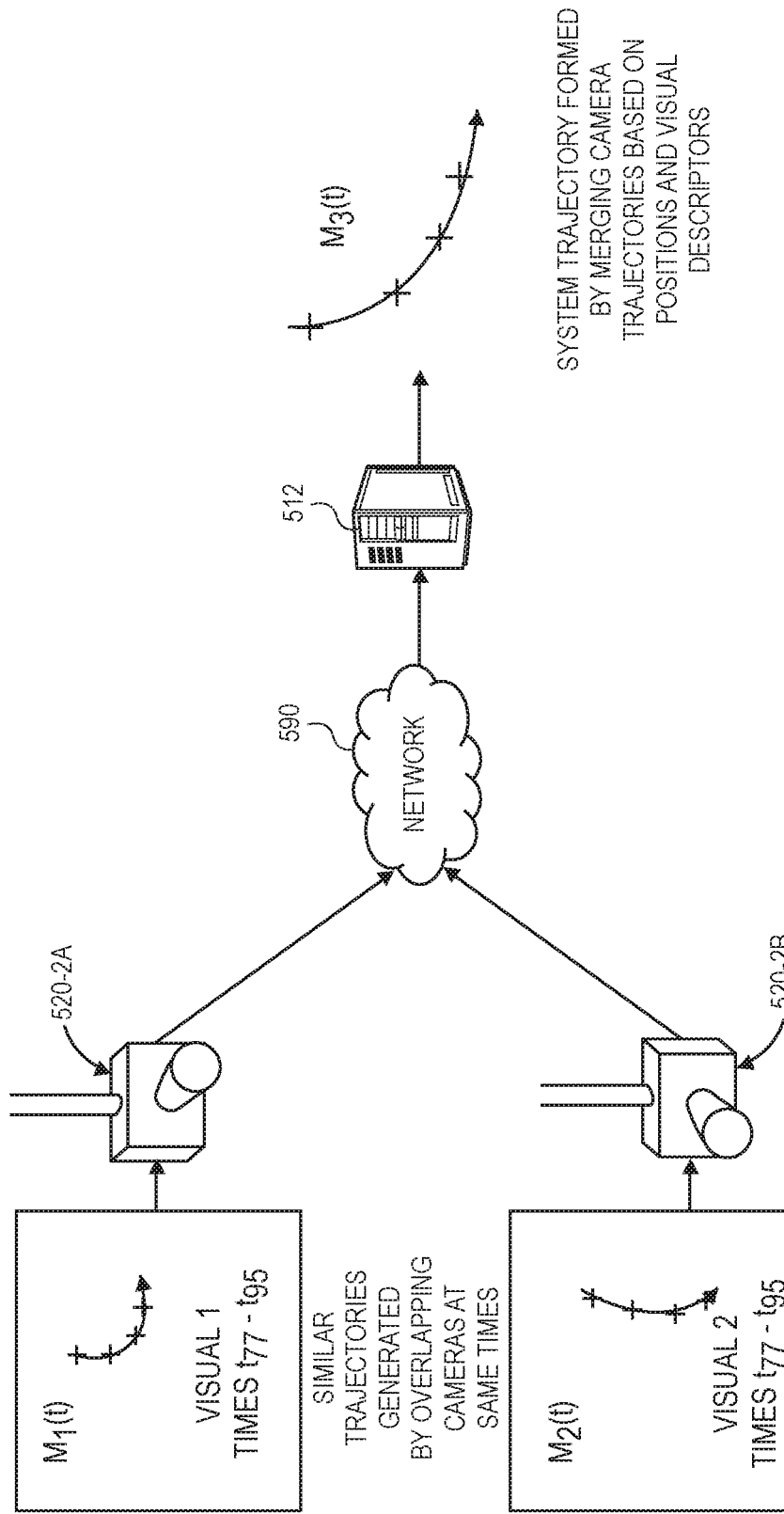

As is shown in FIGS. 5C and 5D, the actor 580 travels within fields of view of a pair of overlapping cameras 520-2A, 520-2B over a period of time from time $t_{75}$ to $t_{100}$. Where cameras 520-2A, 520-2B independently generate camera trajectories $M_1(t)$, $M_2(t)$ and determine visual descriptors $VISUAL_1$, $VISUAL_2$ of pixels from images captured over the period of time from time $t_{77}$ to $t_{95}$, and provide the camera trajectories $M_1(t)$, $M_2(t)$ and the visual descriptors $VISUAL_1$, $VISUAL_2$ to the server 512 over a network 590, the server 512 may generate a system trajectory $M_3(t)$ based on the camera trajectories $M_1(t)$, $M_2(t)$ and the visual descriptors $VISUAL_1$, $VISUAL_2$, to the extent that positions of the camera trajectories $M_1(t)$, $M_2(t)$ and the visual descriptors $VISUAL_1$, $VISUAL_2$ at such positions are consistent with (e.g., match, or are similar to) one another.

Figure 5E:
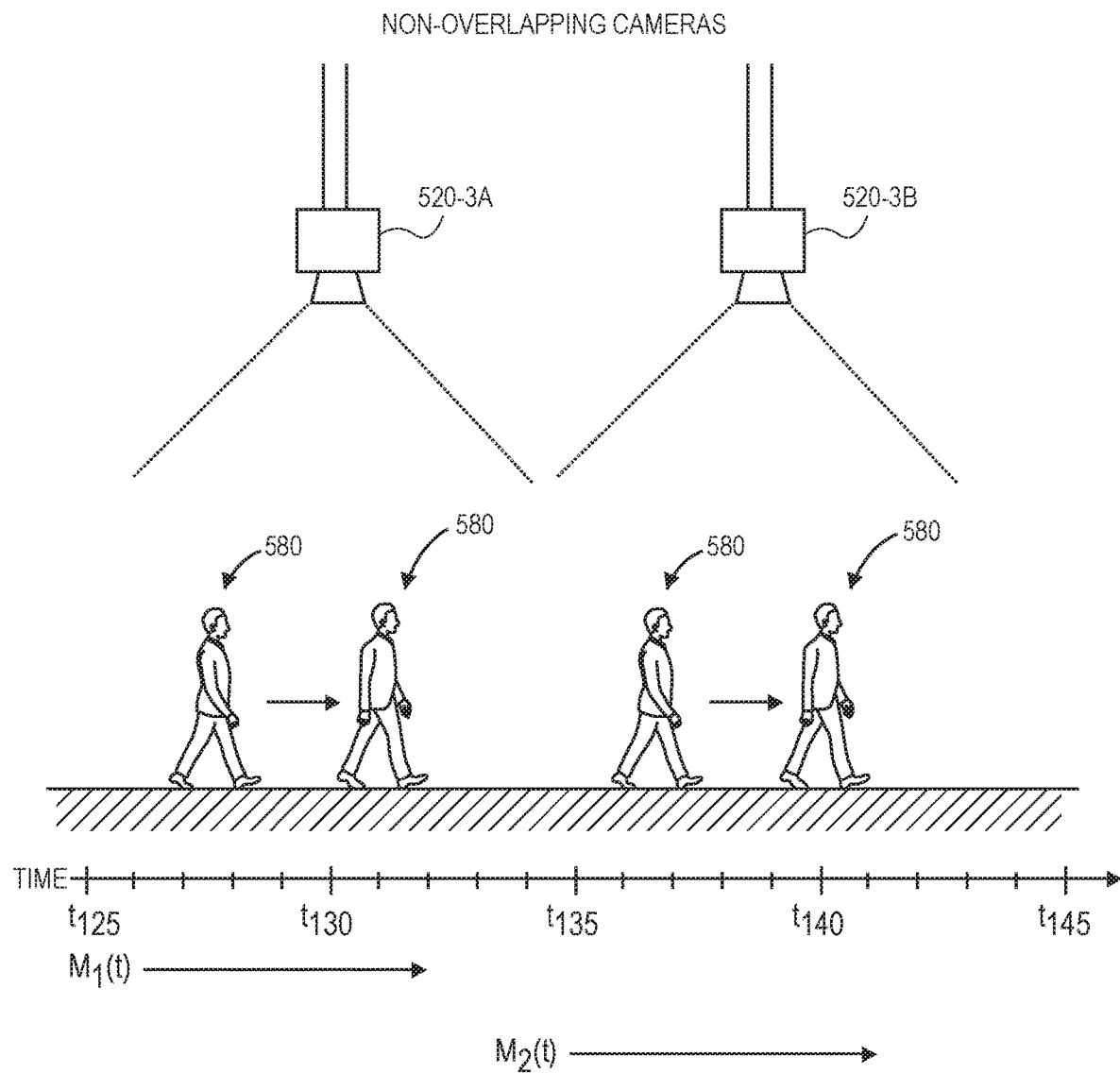
Figure 5F:
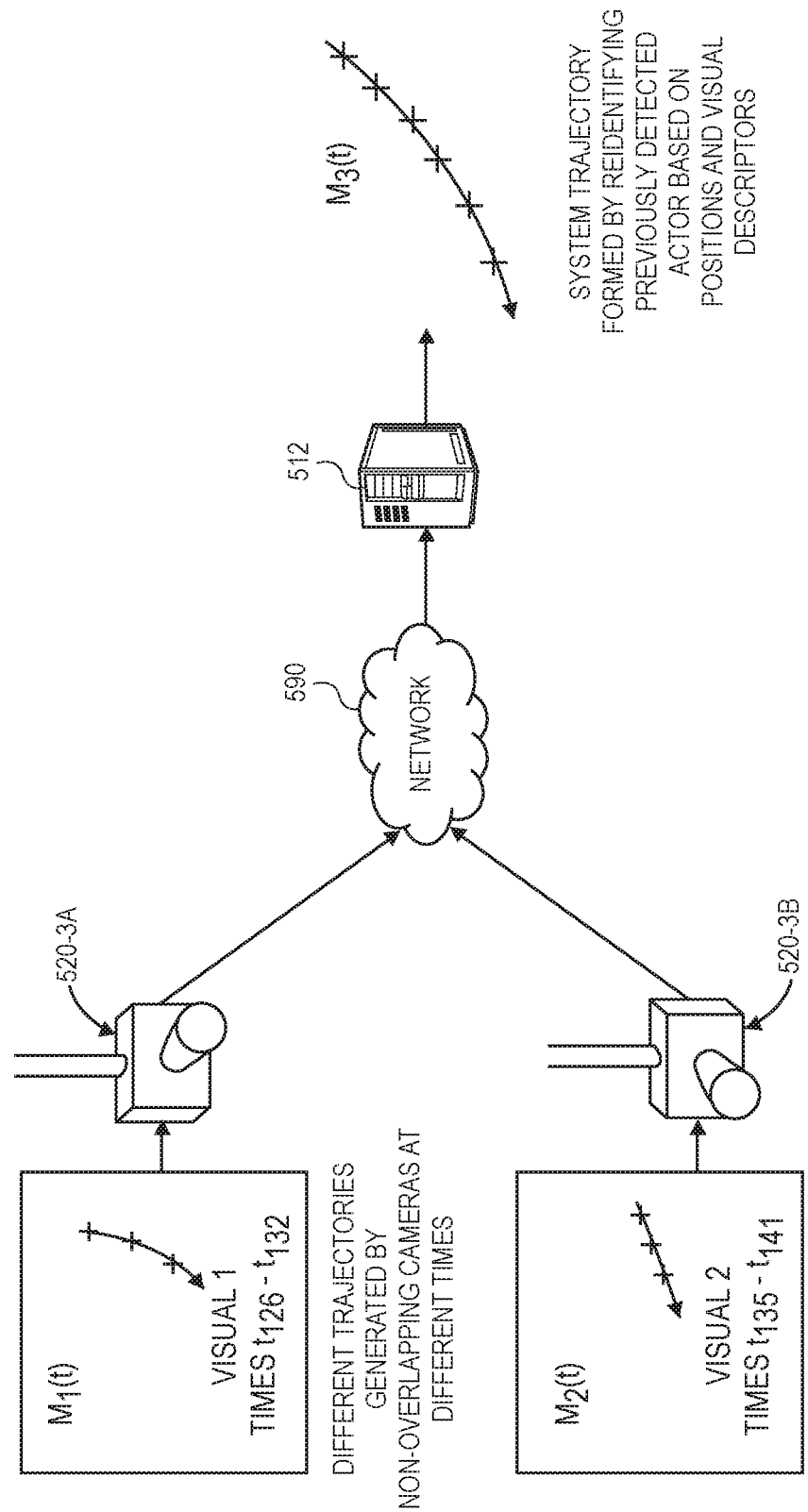

As is shown in FIGS. 5E and 5F, the actor 580 travels within fields of view of a pair of non-overlapping cameras 520-3A, 520-3B over a period of time from $t_{125}$ to $t_{145}$. Where the camera 520-3A generates a camera trajectory $M_1(t)$ and visual descriptors $VISUAL_1$ of pixels based on images captured over a period of time from time $t_{126}$ to $t_{132}$, and where camera 520-3B generates a camera trajectory $M_2(t)$ and visual descriptors $VISUAL_2$ of pixels based on images captured over a period of time from time $t_{135}$ to $t_{141}$, the server 512 may generate a system trajectory $M_3(t)$ based on the camera trajectories $M_1(t)$, $M_2(t)$, e.g., by matching the positions of the camera trajectory $M_2(t)$ are consistent with the propagated camera trajectory $M_1(t)$, or the visual descriptors $VISUAL_2$ to the visual descriptors $VISUAL_1$. To the extent that the positions of the camera trajectory $M_2(t)$ are consistent with the propagated camera trajectory $M_1(t)$, or the visual descriptors $VISUAL_2$ are consistent with the visual descriptors $VISUAL_1$, the camera trajectory $M_2(t)$ and the propagated camera trajectory $M_1(t)$ may be correlated, and determined to depict the motion of the same actor, viz., the actor 580.

Figure 5G:
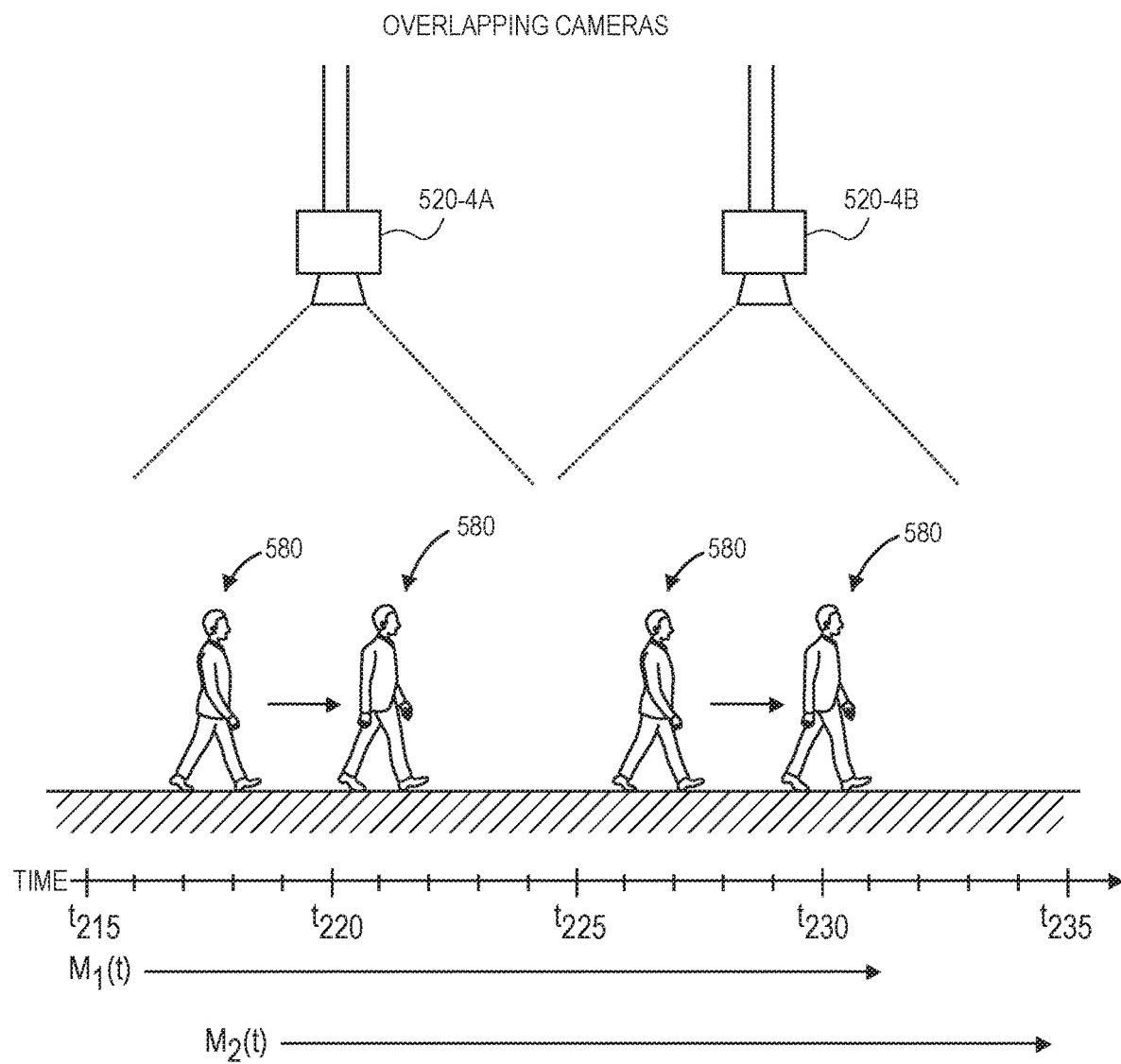
Figure 5H:
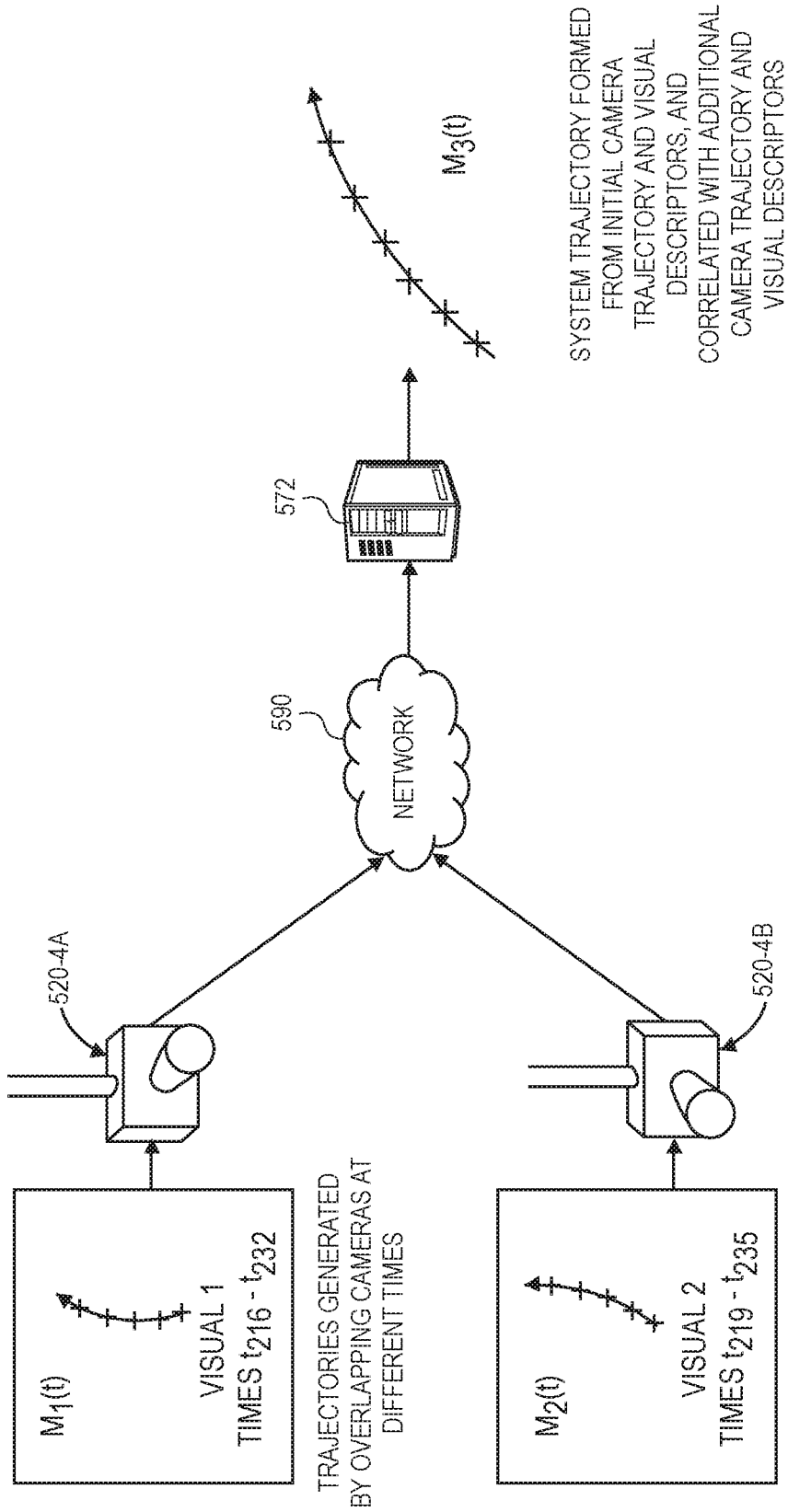

As is shown in FIGS. 5G and 5H, the actor 580 travels within fields of view of a pair of overlapping cameras 520-4A, 520-4B over a period of time from $t_{215}$ to $t_{235}$. Where the camera 520-4A generates a camera trajectory $M_1(t)$ and visual descriptors $VISUAL_1$ of pixels based on images captured over a period of time from time $t_{216}$ to $t_{232}$, the server 512 may generate a system trajectory $M_3(t)$ based on the camera trajectory $M_1(t)$ and visual descriptors $VISUAL_1$. Subsequently, where camera 520-4B generates a camera trajectory $M_2(t)$ and visual descriptors $VISUAL_2$ of pixels based on images captured over a period of time from time $t_{219}$ to $t_{235}$, the server 512 may correlate the camera trajectory $M_2(t)$ and visual descriptors $VISUAL_2$ with the camera trajectory $M_1(t)$ and the visual descriptors $VISUAL_1$, and update the system trajectory $M_3(t)$ accordingly. When the actor 580 departs from the field of view of the camera 520-4A, or is otherwise not detected in images captured by the camera 520-4A, the server 512 may update the system trajectory $M_3(t)$ based exclusively on camera trajectory $M_2(t)$ and the visual descriptors $VISUAL_2$ received from the camera 520-4B, and assign an identifier of the camera trajectory $M_1(t)$ or visual descriptors $VISUAL_1$ of pixels to a "confusion set" associated with the system trajectory $M_3(t)$, while continuing to propagate the camera trajectory $M_2(t)$ and visual descriptors $VISUAL_2$ over time.

Thereafter, when camera 520-4A transmits a record or other set of data corresponding to an actor detected within images thereby to the server 512, the server 512 may attempt to correlate the trajectory or visual descriptors with the system trajectory $M_3(t)$, or with the propagated camera trajectory $M_1(t)$. To the extent that a detected actor is consistent with the camera trajectory $M_1(t)$, the server 512 may update the system trajectory $M_3(t)$ based on such detections. To the extent that a detected actor is not consistent with the camera trajectory $M_1(t)$, however, the server 512 may generate a new system trajectory accordingly.

Figure 6:
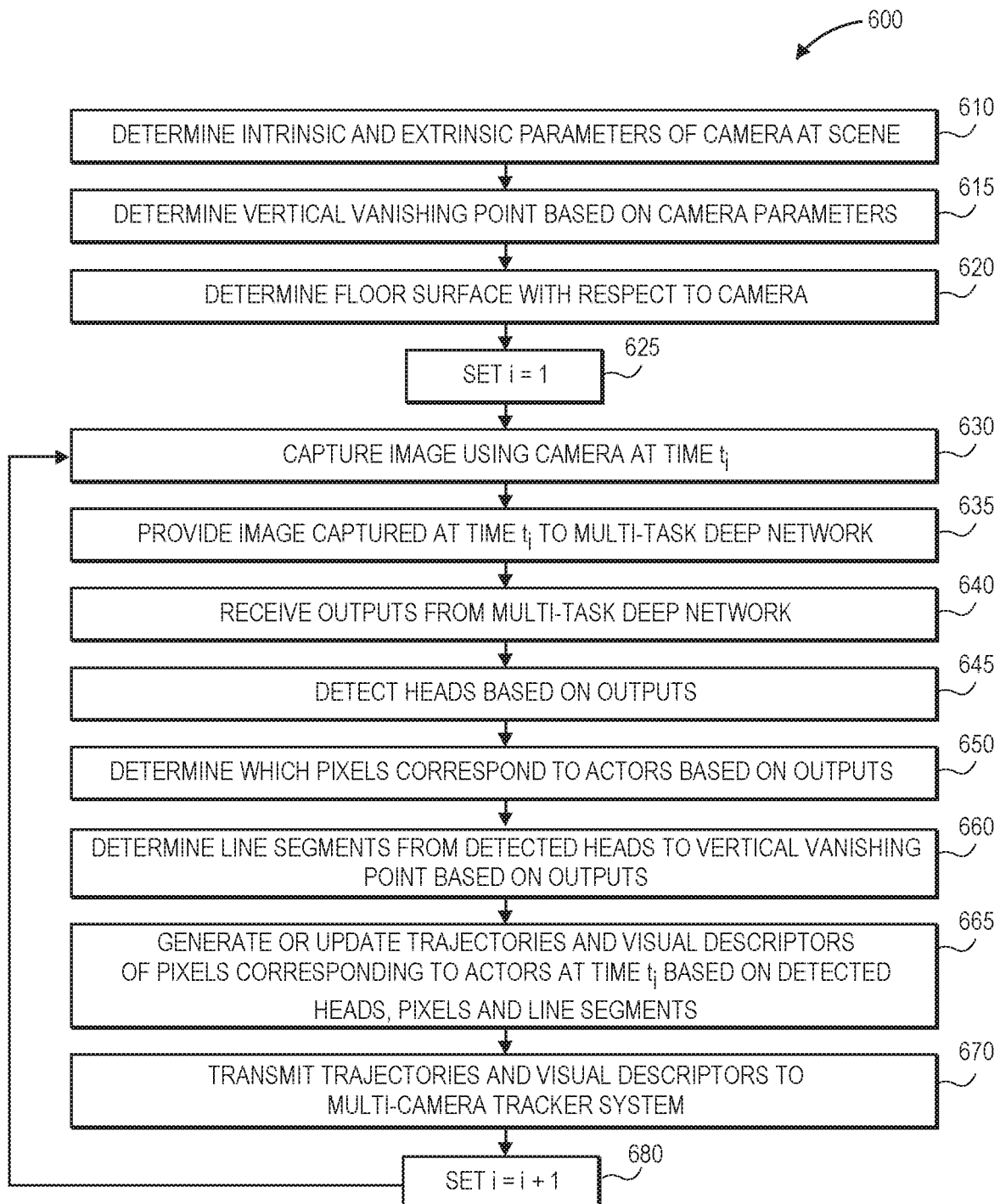
FIG. 6 is a flow chart of one process for locating actors in accordance with implementations of the present disclosure.

As is discussed above, actors may be located based on images that are provided to multi-task machine learning tools (e.g., artificial neural networks) operating on the cameras that captured the images. Referring to FIG. 6, a flow chart 600 of one process for locating actors in accordance with implementations of the present disclosure is shown. At box 610, intrinsic and extrinsic parameters of a camera at a scene, which may include but need not be limited to one or more portions of a materials handling facility, are determined. For example, one or more cameras may have fields of view that includes one or more storage units, floor surfaces or other portions of a materials handling facility, or any other facility, e.g., a financial institution, a transportation center, or any other indoor or outdoor space. At box 615, a vertical vanishing point is determined based on the camera parameters. The vertical vanishing point may be a point within an image plane, or a position in 3D space, at which vertical lines appear to converge from the perspective of the camera, and may be determined on the intrinsic and extrinsic parameters of the camera, e.g., a height of an optical sensor of the camera above a position on the floor surface, projected into an image plane of the camera.

At box 620, a floor surface is determined with respect to the camera. The floor surface may be defined as a plane that intersects the field of view of the camera, or any other set of points in 3D space onto which one or more actors may travel within the materials handling facility.

At box 625, a value of a step variable i is set equal to one, or i=1. At box 630, an image is captured using the camera at time $t_i$. For example, the camera may capture a single image, or a plurality of images at any frame rate (e.g., fifteen, thirty, forty-five, sixty or other number of frames per second).

At box 635, the image captured at time $t_i$ is provided as an input to a multi-task deep network. For example, the multi-task deep network may be a fully convolutional neural network or other artificial neural network having a common backbone and a plurality of decoding layers, including layers associated with the performance of one or more tasks. At box 640, outputs are received from the multi-task deep network.

One or more of the outputs received from the multi-task deep network may be utilized to perform tasks associated with the location of actors on the scene. At box 645, heads or other body parts are detected based on the outputs. For example, one or more of the outputs received at box 640 may identify positions of heads as coordinate pairs of locations of heads within the image captured at the time $t_i$ with a sufficiently high confidence score, subject to any uncertainties. Alternatively, a head (or another body part) may be detected within the image in any other manner.

At box 650, sets of pixels corresponding to each of the actors having the detected heads or other body parts are determined. For example, one or more of the outputs received at box 640 may identify a bounding box of the image that includes or depicts the actor, and such portions may be boxes, e.g., rectangles, or have any other polygonal or curvilinear shapes within the image. One or more of the outputs received at box 640 may also result in an instance segmentation for actors having each of the detected heads. For example, one or more of the outputs may identify unique sets of pixels corresponding to actors within the image and designate such pixels as distinct or individual sets, viz., instances of actors.

At box 660, line segments aligned along lines extending from each of the heads detected at box 645 to the vertical vanishing point determined at box 615 are predicted. For example, the multi-task deep network may be trained to predict lengths of line segments from heads detected at any portion within the image to the vertical vanishing point as depicted within the image, or heights of actors having such heads. Each of the line segments points to, and each of the lines on which the line segments are aligned appears to converge at, the vertical vanishing point.

At box 665, trajectories of actors and visual descriptors of pixels corresponding to the actors at time $t_i$ are generated or updated based on the detected heads, the sets of pixels and the line segments. In some implementations, visual descriptors may be determined by one or more algorithms or techniques operating on the camera and stored in one or more memory components provided aboard the camera. Positions of actors in 3D space may be determined based on line segments extending from the detections of heads to the floor surfaces as predicted at box 660 within the 2D image to points in 3D space, and the sets of pixels corresponding to each of the actors may be processed to determine appearance features of the actors, including but not limited to colors, textures, shading, shapes or other visual attributes of the actors, which may be associated with such positions. Trajectories may be generated for a plurality of actors, where visual descriptors of pixels corresponding to the actors are detected within images captured at different times. The trajectories and visual descriptors may be determined for the plurality of actors, and stored in one or more memory components of the camera. Visual descriptors of actors detected from an image may be compared to the visual descriptors previously determined, which may be associated with a trajectory by a linking algorithm or technique operating on the camera, and the trajectory for that actor may be updated accordingly.

At box 670, the trajectories and the visual descriptors are transmitted to a multi-camera tracker system operating on a server or other computer system. For example, the trajectories and the visual descriptors may be transmitted in real time or in near-real time, e.g., by wireless or wired means, to the server, or to one or more other servers or other computer devices. The server may be configured to map trajectories of actors and visual descriptors of actors received from the camera, and from other cameras, to positions within 3D space, or to process the visual descriptors to compute one or more appearance, motion or geometric features, and to correlate such trajectories or positions and appearance, motion or geometric features to one another, to the extent that such trajectories, positions or features are consistent with one another.

At box 680, a value of the step variable i is incremented by one, or set to equal i+1, before the process returns to box 630, where an image is captured using the camera at time $t_i$. The process steps shown in boxes 630 through 670 may be repeated as many times as is necessary, or halted when one or more stopping conditions are determined.

As is discussed above, imaging devices of the present disclosure may be configured to generate trajectories of actors or visual descriptors of pixels corresponding to the actors based on outputs received from one or more artificial neural networks. Referring to FIGS. 7A through 7D, views of aspects of one system for locating actors in accordance with implementations of the present disclosure are shown. Except where otherwise noted, reference numerals preceded by the number "7" shown in FIGS. 7A through 7D indicate components or features that are similar to components or features having reference numerals preceded by the number "5" shown in FIGS. 5A through 5H, by the number "4" shown in FIGS. 4A through 4M, by the number "2" shown in FIG. 2A or 2B, or by the number "1" shown in FIGS. 1A through 1K.

Figure 7B:
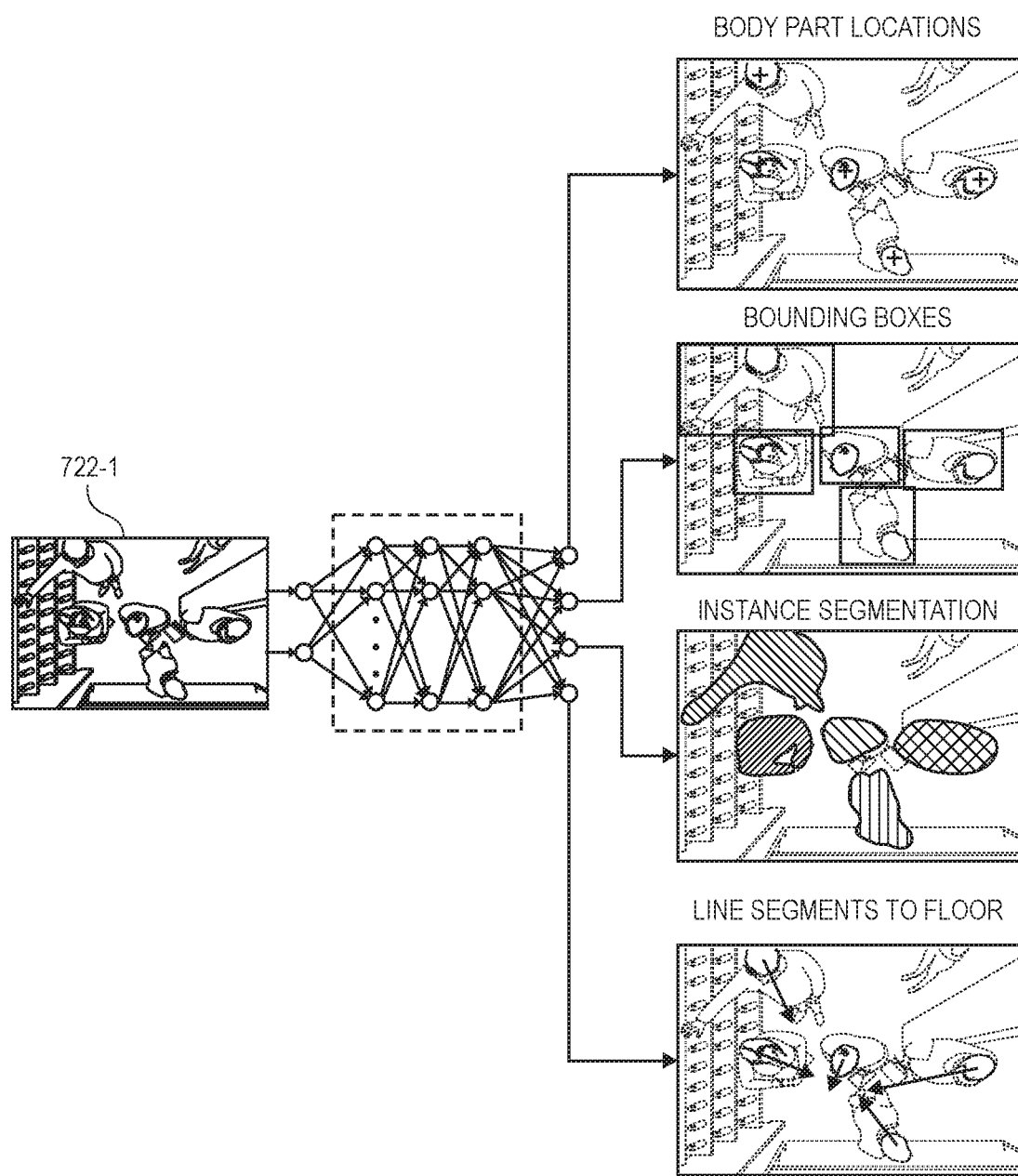

As is shown in FIGS. 7A and 7B, an image 722-1 captured using an imaging device 720-1 is provided to a multi-task deep network operating on the imaging device 720-1. The multi-task deep network may be a fully convolutional neural network having one or more layers dedicated to the performance of each of a plurality of tasks, e.g., in a common architecture. For example, as is shown in FIGS. 7A and 7B, the multi-task deep network may be configured to output locations of one or more body parts (e.g., heads) of actors depicted within the image 722-1, to generate bounding boxes around such actors, to perform instance segmentation on the image 722-1 to identify pixels corresponding to each of such actors, and to generate line segments between locations of the body parts within the image 722-1 to corresponding locations on floor surfaces, aligned along lines extending between the locations of the body parts within the image 722-1 and a location of a vertical vanishing point.

As is shown in FIG. 7C, the imaging device 720-1 transmits positions $(x, y, z)_1$, $(x, y, z)_2$, $(x, y, z)_3$, $(x, y, z)_4$, $(x, y, z)_5$ of each of the actors detected within the image 722-1, along with visual descriptors $VISUAL_1$, $VISUAL_2$, $VISUAL_3$, $VISUAL_4$, $VISUAL_5$ of sets of pixels corresponding to such actors to a server 712 over a network 790. The positions $(x, y, z)_1$, $(x, y, z)_2$, $(x, y, z)_3$, $(x, y, z)_4$, $(x, y, z)_5$ may be determined based on distal ends of the line segments having proximal ends at the locations of the heads depicted within the image 722-1, and may correspond to points on floor surfaces lying directly beneath the actors detected therein. The descriptor data $VISUAL_1$, $VISUAL_2$, $VISUAL_3$, $VISUAL_4$, $VISUAL_5$ may include appearance features (e.g., colors, textures, shapes or other visual attributes), motion features (e.g., velocities or orientations), geometry features (e.g., construction of a scene), or any other features of such actors.

Figure 7D:
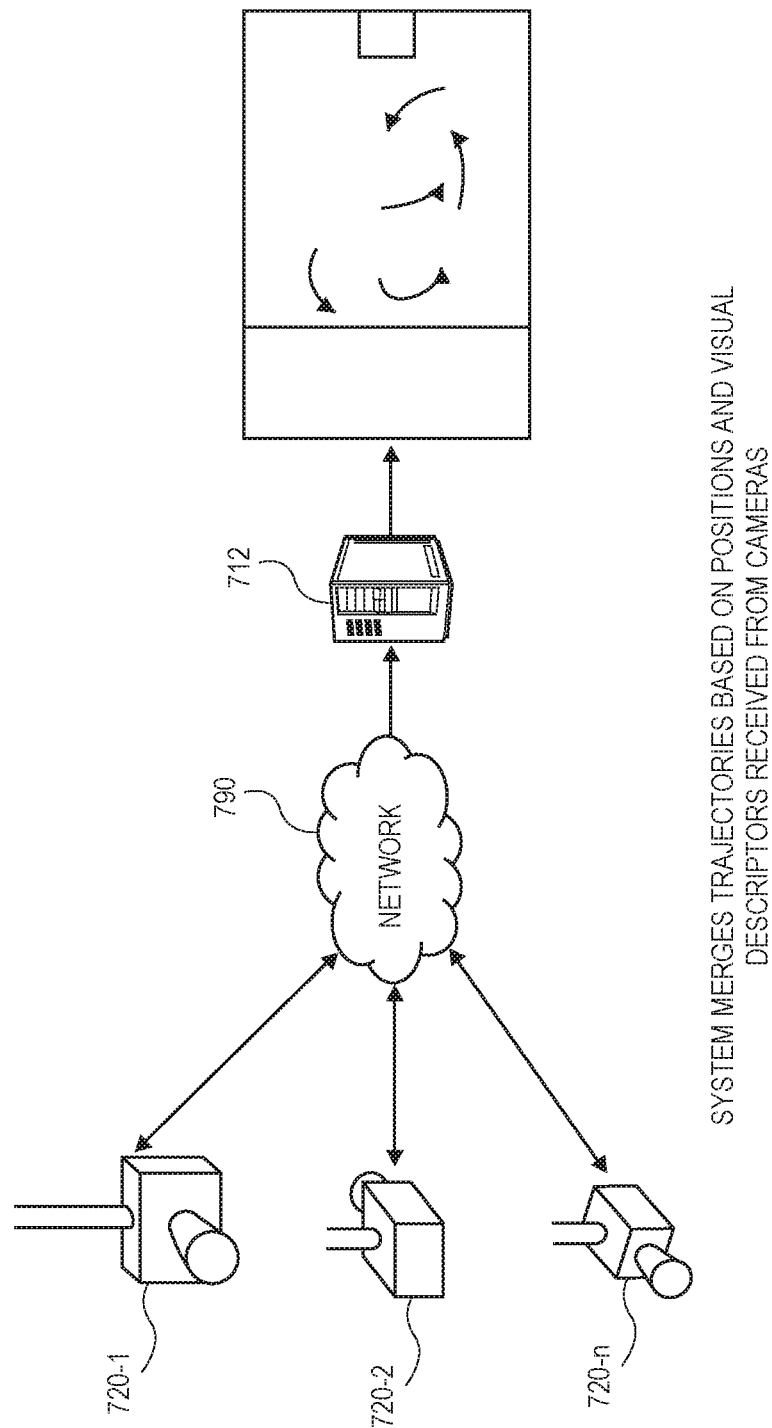

As is shown in FIG. 7D, the server 712 may receive trajectories generated based on the positions of actors and visual descriptors received from a plurality of imaging devices 720-1, 720-2 . . . 720-n, including the imaging device 720-1, and generate system trajectories of such actors based on trajectories and visual descriptors received from the cameras 720-1, 720-2 . . . 720-n that are determined to correlate to one another, e.g., by matching 3D positions of the actors calculated by the respective cameras, or by matching visual descriptors of the actors provided by the respective cameras.

Figure 8:
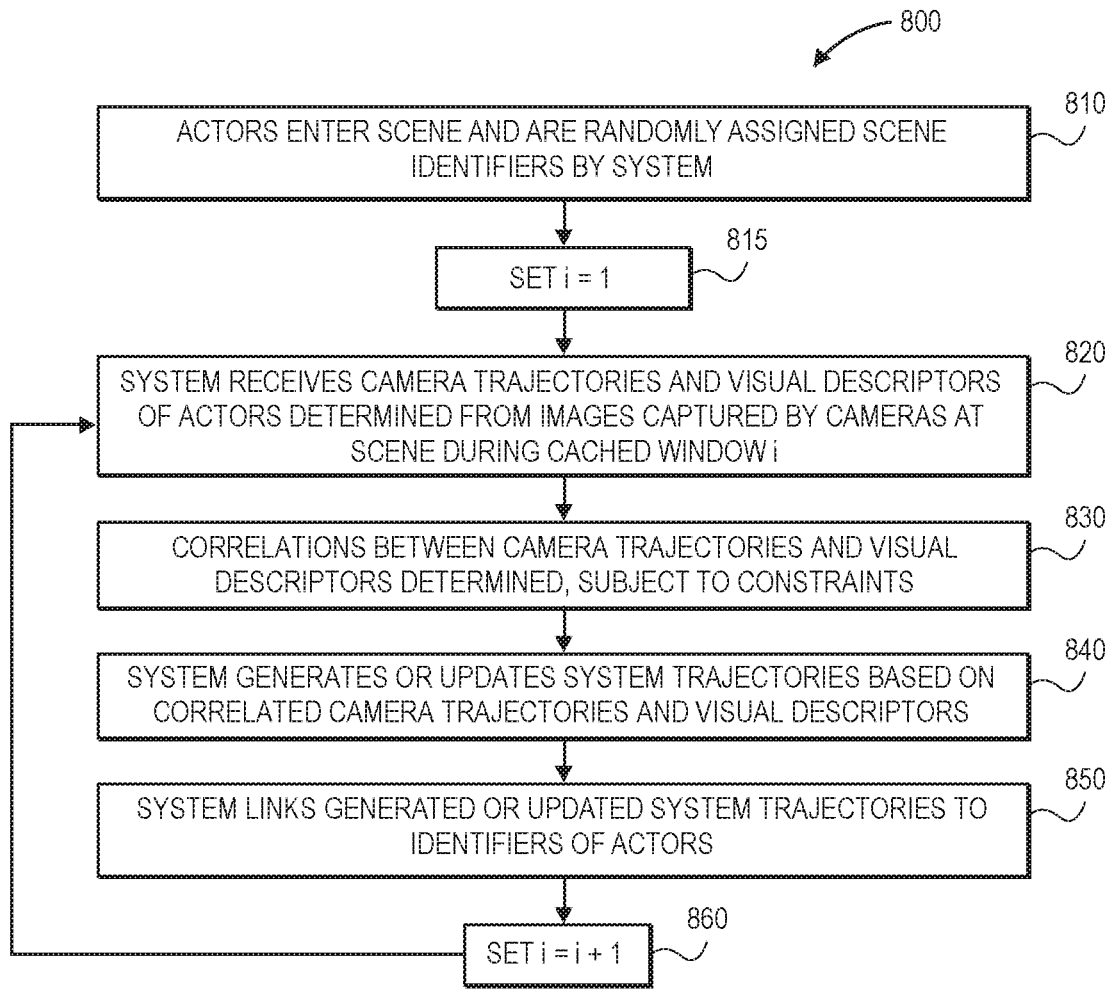
FIG. 8 is a flow chart of one process for locating actors in accordance with implementations of the present disclosure.

Referring to FIG. 8, a flow chart 800 of one process for locating actors in accordance with implementations of the present disclosure is shown. At box 810, one or more actors enter a scene and are assigned identifiers, e.g., entry identifiers, by a system, such as a server. For example, in some implementations, an actor may bear or present a virtual or physical credential, such as an object (e.g., a sheet of paper, or a mobile device with a display) bearing a bar code (e.g., a one-dimensional or two-dimensional bar code, such as a QR bar code) or other symbol or marking, and the actor may scan the object or otherwise enable the bar code, symbol or marking to be read or interpreted at an entrance to the scene, or another location associated with the scene. Upon identifying an account, a payment instrument or another record associated with the actor, an entry identifier may be generated for the actor. The entry identifiers may be randomly generated on any basis, and may but need not bear any relation to one or more attributes of the actors, such as accounts, payment instruments or other records of the actors.

At box 815, a value of a step variable i is set to equal one, or i=1. At box 820, a system receives camera trajectories of actors and visual descriptors of pixels corresponding to the actors determined from images captured by cameras at the scene during a cached window i. For example, as is discussed above, the system receives trajectories, or sets of positions of actors detected within images captured by a plurality of cameras, along with visual descriptors of sets of pixels corresponding to the actors such as appearance features (e.g., colors, textures, shapes or other visual attributes), motion features (e.g., velocities or orientations), or geometry features (e.g., construction of a scene) of such actors, from each of the cameras. The sets of positions and visual descriptors are derived from images captured by the cameras within the cached window i, which may have any finite duration, e.g., two seconds, or any other duration. Additionally, each of the cameras may assign a camera-specific identifier to a camera trajectory and visual descriptors, and transmit the camera-specific identifier to the system, along with the camera trajectory and the visual descriptors.

At box 830, correlations between the camera trajectories and the visual descriptors determined from the images captured during the cached window i are determined, subject to one or more constraints. For example, where one or more camera trajectories mapped to 3D space indicate that detected actors were located proximate to one another at common times, or where similar or consistent visual descriptors (e.g., appearance features, motion features or geometry features) received from the one or more cameras are located proximate to one another at common times, the camera trajectories and the visual descriptors may be determined to correlate to one another. The correlations may be determined in any manner, such as by a clustering algorithm. For example, camera trajectories or visual descriptors received from cameras based on images captured during the cached window i may be determined by bipartite matching, or by arranging the camera trajectories and visual descriptors in graphs having edges that encode similarities, and nodes that are partitioned into identifiers (e.g., global identifiers) of such clusters. The clustering of camera trajectories or visual descriptors may be performed subject to one or more space-based, time-based or appearance-based constraints, or any other constraints, in order to minimize or reduce any unlikely or inaccurate associations of camera trajectories.

At box 840, the system generates or updates one or more system trajectories based on correlated camera trajectories and the visual descriptors generated from the images captured by the cameras during the cached window i. For example, where the system identifies correlated camera trajectories or visual descriptors received from one or more cameras, a system trajectory representing the correlated camera trajectories may be initially generated based on the correlated camera trajectories or visual descriptors, or updated where the camera trajectories or visual descriptor data have positions or appearances that are consistent with a previously generated system trajectory. Additionally, a global identifier may be assigned to a system trajectory defined based on a camera trajectory, or based on two or more camera trajectories that are consistent in their respective positions or appearances.

At box 850, the system links the generated or updated system trajectories to identifiers of actors that are known to be at the scene during the cached window i. Where a set of actors located on a scene is known, a system trajectory generated based on one or more camera trajectories or visual descriptors received from one or more cameras on the scene may be associated with an entry identifier (or another identifier) of one of the actors of the set, e.g., by a linking algorithm.

At box 860, a value of the step variable i is incremented by one, or set to equal i+1, before the process returns to box 820, where the system receives camera trajectories of actors and visual descriptors corresponding to actors determined from images captured by the cameras during a cached window i. The process steps shown in boxes 820 through 860 may be repeated as many times as necessary, or halted when one or more stopping conditions are determined.

Figure 9:
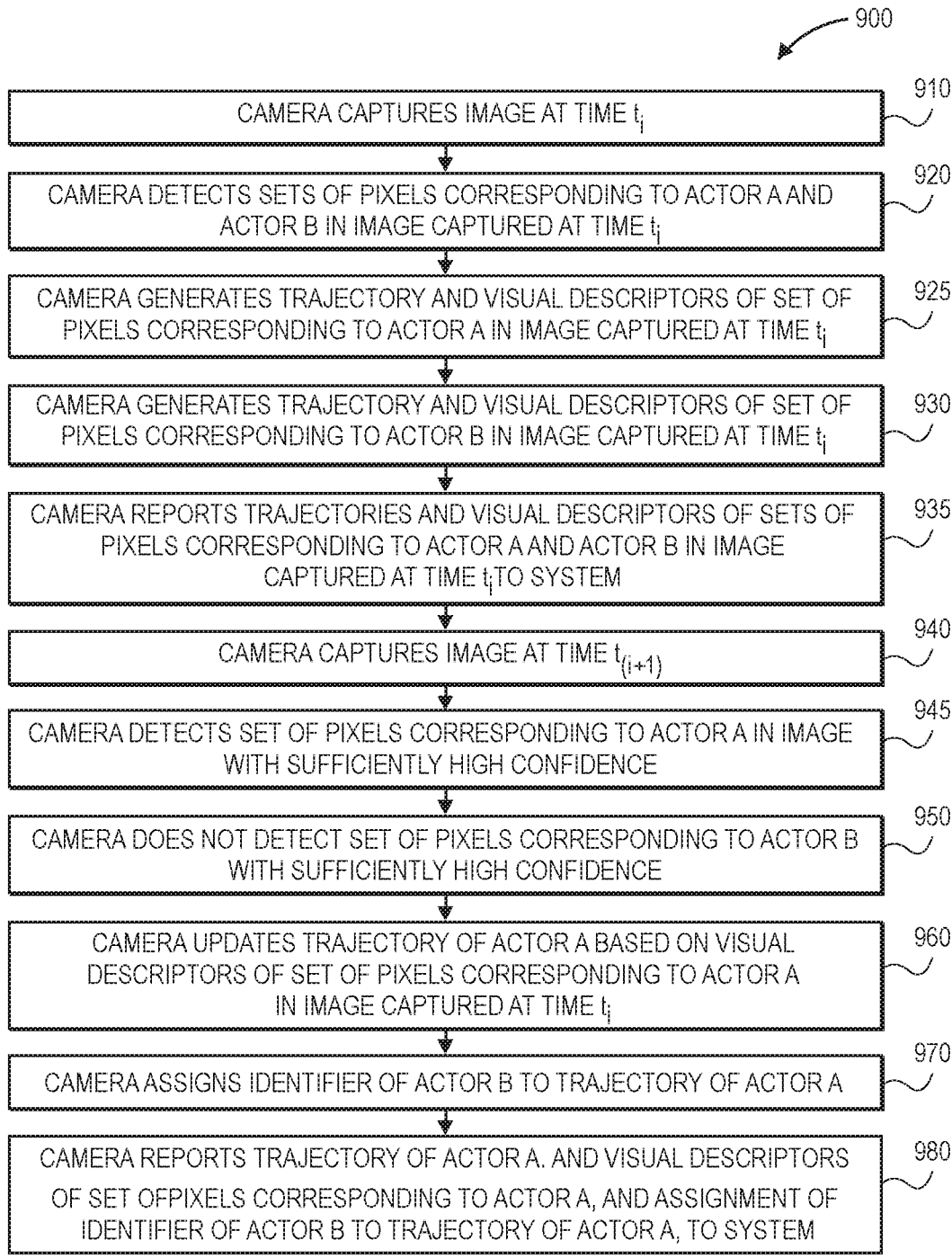
FIG. 9 is a flow chart of one process for locating actors in accordance with implementations of the present disclosure.

As is discussed above, where a trajectory for an actor is no longer detected on a scene at a sufficiently high level of confidence, the actor may be further located by propagating a trajectory over time until the actor is reidentified, or until the actor is determined to have departed the scene. Referring to FIG. 9, a flow chart 900 of one process for locating actors in accordance with implementations of the present disclosure is shown. At box 910, a camera captures an image at a time 4, and at box 920, the camera detects sets of pixels corresponding to at least two actors, viz., an Actor A and an Actor B, within the image captured at the time $t_i$. For example, the camera may provide the image to one or more machine learning tools operating thereon, and the machine learning tools may be configured to detect one or more heads (or other body parts) of actors depicted within imaging data, to generate one or more bounding boxes around such actors depicted within imaging data, to perform instance segmentations on such imaging data, or to generate or predict positions of the actors based on the imaging data.

At box 925, the camera generates a trajectory and one or more visual descriptors of the set of pixels corresponding to Actor A within the image captured at the time $t_i$. The vertical vanishing point may be determined based on intrinsic and extrinsic parameters of the camera, or in any other manner, and the line segment and the set of pixels may be generated based on one or more outputs received from a machine learning tool, including but not limited to the machine learning tool that detected the heads at box 925. Likewise, at box 930, the camera generates a trajectory and one or more visual descriptors of pixels corresponding to Actor B within the image captured at the time $t_i$.

At box 935, the camera reports the trajectories and the visual descriptors of the sets of pixels corresponding to Actor A and Actor B to a system, e.g., a server or other component in communication with the camera and any number of other cameras. The trajectories may be accompanied by any variables or other identifiers corresponding to each of the respective actors. At box 940, the camera captures another image at a time $t_{(i+1)}$, i.e., a time later than the time $t_i$. For example, the camera may be configured to capture imaging data at frame rates of fifteen, thirty, forty-five or sixty frames per second, or any other frame rates. In some implementations, the image captured at the time $t_{(i+1)}$ may be a next image captured immediately after the image captured at the time $t_i$, e.g., where a difference between the time $t_i$ and the time $t_{(i+1)}$ is defined by the frame rate of the camera. In some other implementations, the time $t_{(i+1)}$ may be any time after the time $t_i$. At box 945, the camera detects a set of pixels corresponding to one of the actors, viz., Actor A, within the image captured at the time $t_{(i+1)}$. For example, the set of pixels may be detected based on an output received from a machine learning tool operating on the camera, which may be the same machine learning tool that was used to detect the set of pixels corresponding to the Actor A at box 920 or the set of pixels corresponding to the Actor B, or another machine learning tool, or in any other manner.

At box 950, the camera does not detect a set of pixels corresponding to the other actor, viz., Actor B, within the image captured at the time $t_{(i+1)}$ to a sufficiently high degree of confidence. For example, the camera may determine a position associated with the trajectory of Actor B generated at box 930, and may determine that the set of pixels corresponding to Actor B are not detected within the image captured at the time $t_{(i+1)}$, including but not limited to locations in or around a position associated with the trajectory of Actor B.

After failing to detect the set of pixels corresponding to the Actor B at box 950, the process advances to box 960, where the camera updates the trajectory of Actor A based on the visual descriptors of the set of pixels corresponding to the Actor A detected within the image captured at the time $t_{(i+1)}$. By matching the visual descriptors of the set of pixels detected within the image captured at the time $t_{(i+1)}$ to the visual descriptors of the set of pixels detected within the image captured at the time $t_i$, for example, by an optical flow algorithm, changes in the position of Actor A from the time $t_i$ to the time $t_{(i+1)}$ may be inferred, and the trajectory of Actor A may be updated accordingly. At box 970, the camera assigns an identifier of Actor B to the trajectory of the Actor A, as updated at box 960, such as by storing one or more variables identifying Actor B in a "confusion set" or any other record associated with Actor A. After the Actor B is not detected to a sufficiently high degree of confidence, and the identifier of Actor B has been assigned to Actor A, Actor B may be determined to be in a "tangled state" or otherwise functionally or logically coupled with Actor A. At box 975, the camera propagates the trajectory of Actor B to a position associated with the time $t_{(i+1)}$, e.g., based on a most recently calculated position and/or velocity of the actor, such as the trajectory of Actor B determined based on the image captured at the time $t_i$. Alternatively, or additionally, the identifier of Actor B may be assigned to any other trajectories of actors that were identified as being near Actor B prior to the time $t_{(i+1)}$, when the set of pixels corresponding to Actor B was no longer detected by the camera, in addition to the trajectory of Actor A.

At box 980, the camera reports the trajectory of Actor A, as well as the visual descriptors of Actor A determined from the image captured at the time $t_{(i+1)}$, and the assignment of the identifier of Actor B to that trajectory, to the system. The process steps shown in boxes 940 through 980 may be repeated as many times as is necessary, such as until visual descriptors of pixels corresponding to Actor B are detected within one or more images subsequently captured by the camera, or halted when one or more stopping conditions are determined.

Figure 10A:
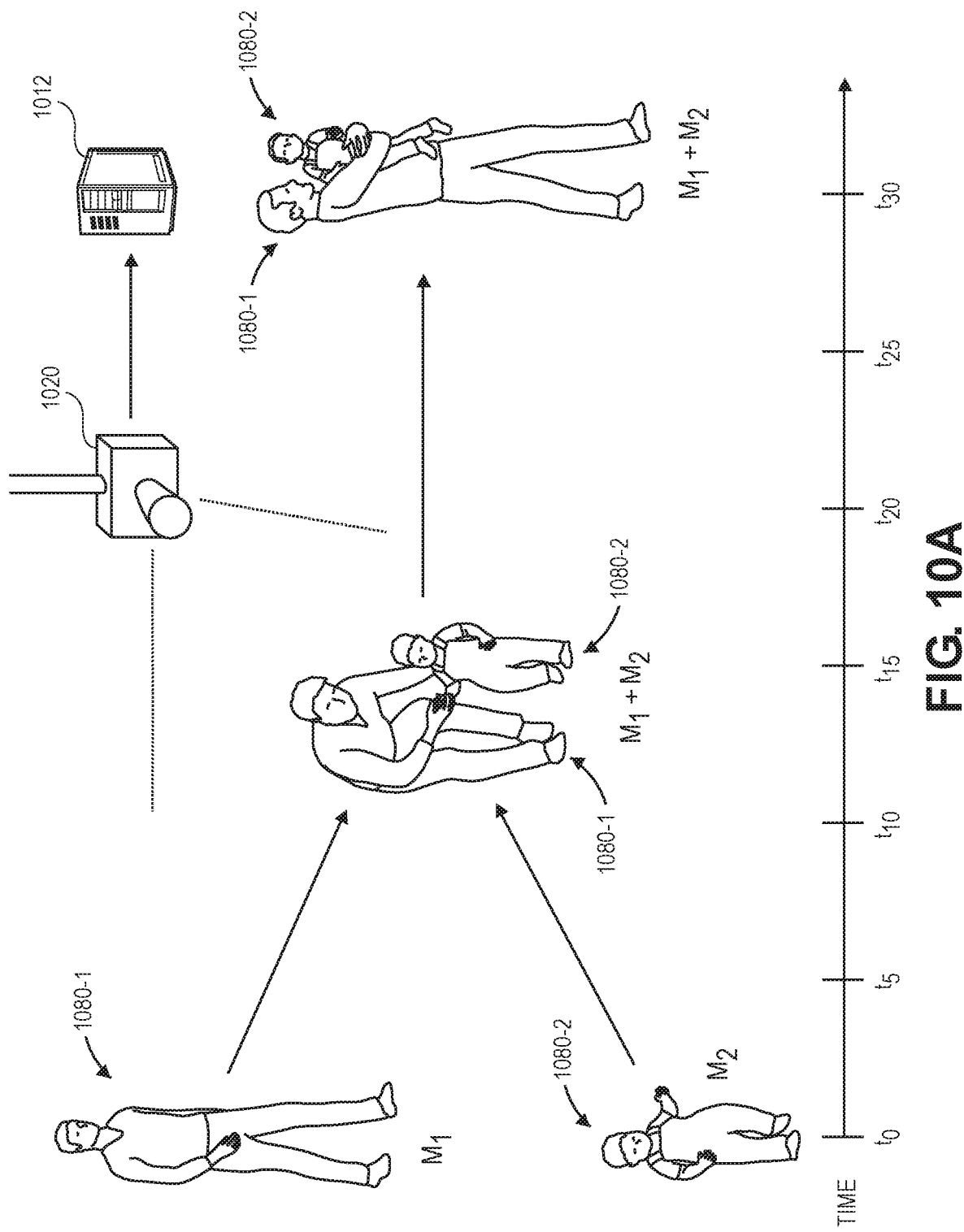
FIGS. 10A and 10B are views of aspects of one system for locating actors in accordance with implementations of the present disclosure.
Figure 10B:
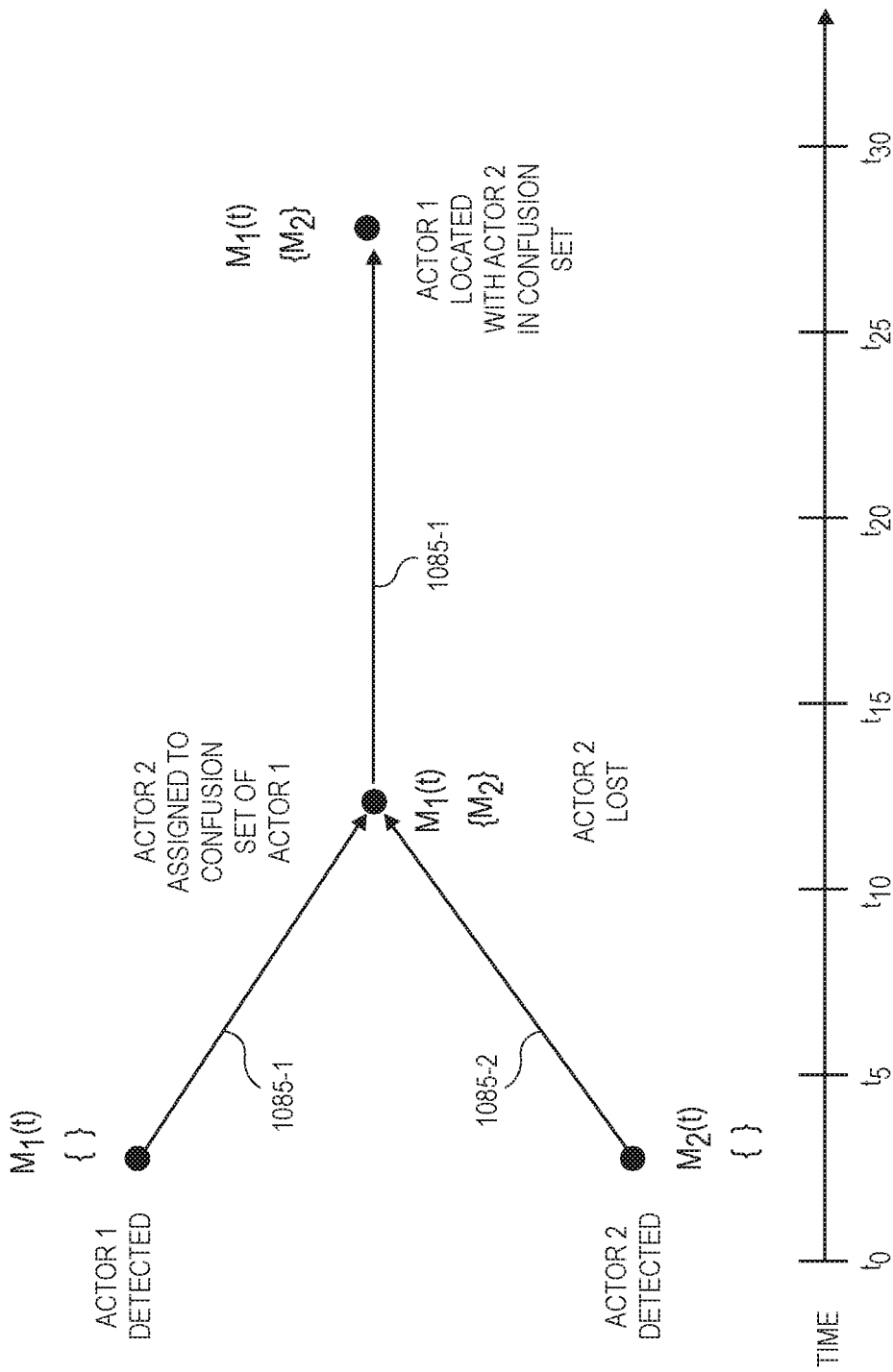

Referring to FIGS. 10A and 10B, views of aspects of one system for locating actors in accordance with implementations of the present disclosure is shown. Except where otherwise noted, reference numerals preceded by the number "10" shown in FIGS. 10A and 10B indicate components or features that are similar to components or features having reference numerals preceded by the number "7" shown in FIGS. 7A through 7D, by the number "5" shown in FIGS. 5A through 5H, by the number "4" shown in FIGS. 4A through 4M, by the number "2" shown in FIG. 2A or 2B, or by the number "1" shown in FIGS. 1A through 1K.

As is shown in FIG. 10A, a pair of actors 1080-1, 1080-2 are executing one or more poses or gestures within a field of view of a camera 1020 on a scene over a period of time from time $t_0$ to time $t_{30}$. The actor 1080-1 may be an adult or another actor that is substantially larger than the actor 1080-2, who may be a child or another actor that is substantially smaller than the actor 1080-1. The camera 1080 is connected to a system 1012 (e.g., a server) over one or more networks.

As is also shown in FIG. 10A, at approximately time $t_{13}$, the actor 1080-1 lifts or otherwise embraces the actor 1080-2, and travels in concert with the actor 1080-2 across the scene thereafter.

As is shown in FIG. 10B, a pair of camera trajectories 1085-1, 1085-2, or $M_1(t)$, $M_2(t)$, of the actor 1080-1 and the actor 1080-2, respectively, are generated by the camera 1020 based on images captured thereby over the period of time from time $t_0$ to time $t_{13}$. As is also shown in FIG. 10B, the trajectories 1085-1, 1085-2 are generated with sufficiently high confidence in order to independently locate the respective actors 1080-1, 1080-2, and "confusion sets," or sets or subsets of identifiers of other actors, represented in FIG. 10B with pairs of brackets, are empty for each of the trajectories 1085-1, 1085-2 from time $t_0$ to time $t_{13}$.

As is further shown in FIG. 10B, at time $t_{13}$, the actor 1080-1 continues to be located with a sufficiently high level of confidence, while the actor 1080-2 is "lost," or is no longer detected with the sufficiently high level of confidence. Therefore, an identifier of the trajectory 1085-2 of the actor 1080-2, or $M_2$, is assigned to the confusion set of the trajectory 1085-1 of the actor 1080-1, or to trajectories of any other actors (not shown) that are nearby at the time $t_{13}$ when the actor 1080-2 is "lost," or is no longer detected with the sufficiently high level of confidence. The actor 1080-1 and the actor 1080-2 are thus determined to be functionally or logically coupled to one another, e.g., in a "tangled state," as of time $t_{13}$.

From time $t_{13}$ and beyond, the actor 1080-1 continues to be located at a sufficiently high level of confidence, and the identifier $M_2$ remains within the confusion set of the trajectory 1085-1 of the actor 1080-1. Should the camera 1020 detect a set of pixels at positions or with appearances that match or are otherwise consistent with the trajectory 1085-2 after time $t_{13}$, for example, by an optical flow algorithm, with a sufficiently high level of confidence, the actor 1080-2 may be reidentified as such by the camera 1020. In such an event, the identifier of the 1085-2 of the actor 1080-2, or $M_2$, may be removed from the confusion set of the actor 1080-1.

Should the camera 1020 detect a new actor (e.g., a head or another body part), and determine a position of the actor in 3D space and visual descriptors of pixels corresponding to the new actor, the camera 1020 may compare the position and the visual descriptors to the trajectory 1085-1 of the actor 1080-1, or $\underline{M}_1(t)$, or the visual descriptors of the actor 1080-2, or to trajectories of other actors or visual descriptors of pixels corresponding to the other actors within confusion sets or in tangled states, in order to determine whether the newly detected actor and the set of pixels correspond to a new and previously undetected actor at the position in 3D space, or whether the head and the set of pixels correspond to a previously detected actor, e.g., the actor 1080-2.

Figure 11A:
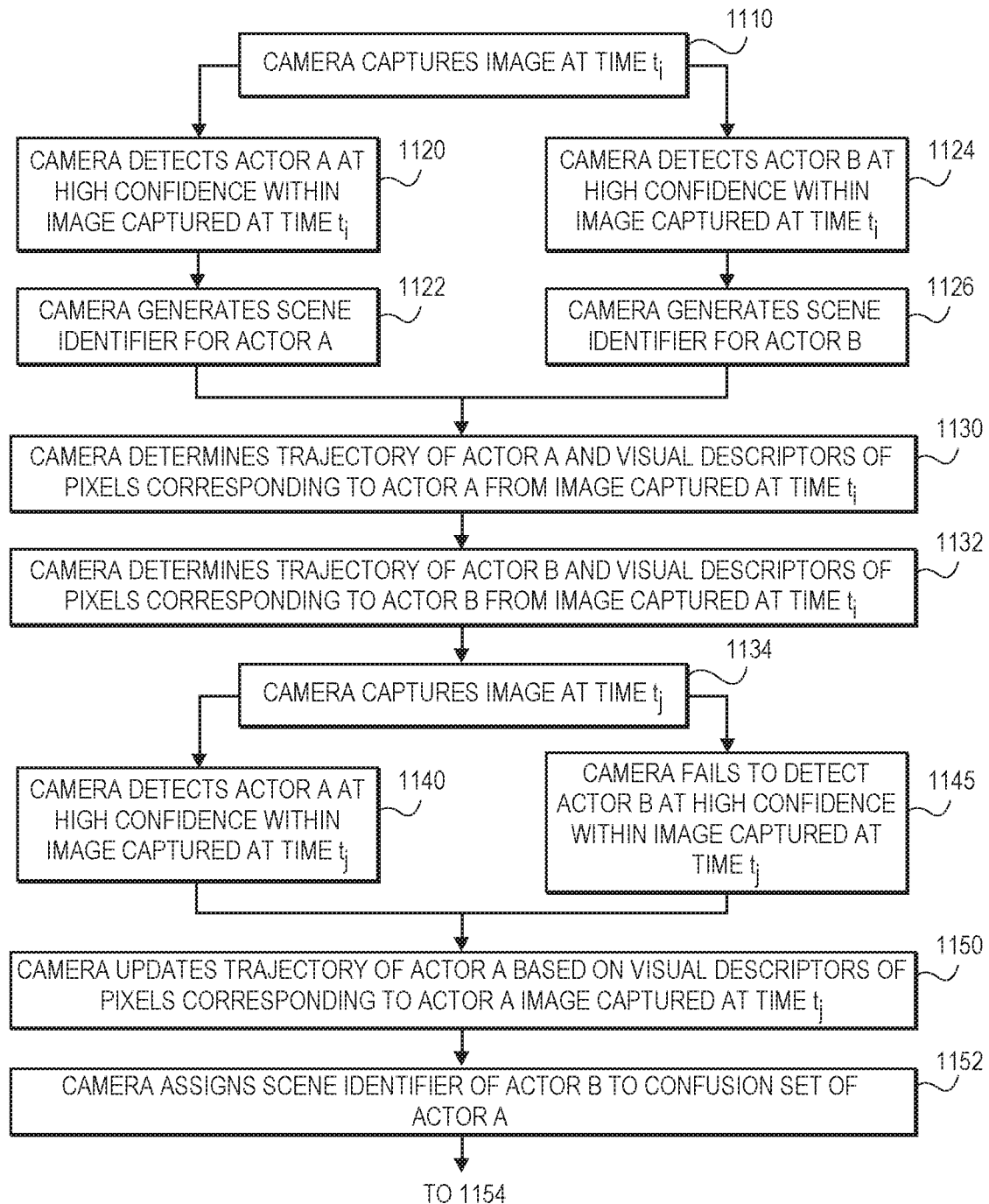
FIGS. 11A and 11B are a flow chart of one process for locating actors in accordance with implementations of the present disclosure.
Figure 11B:
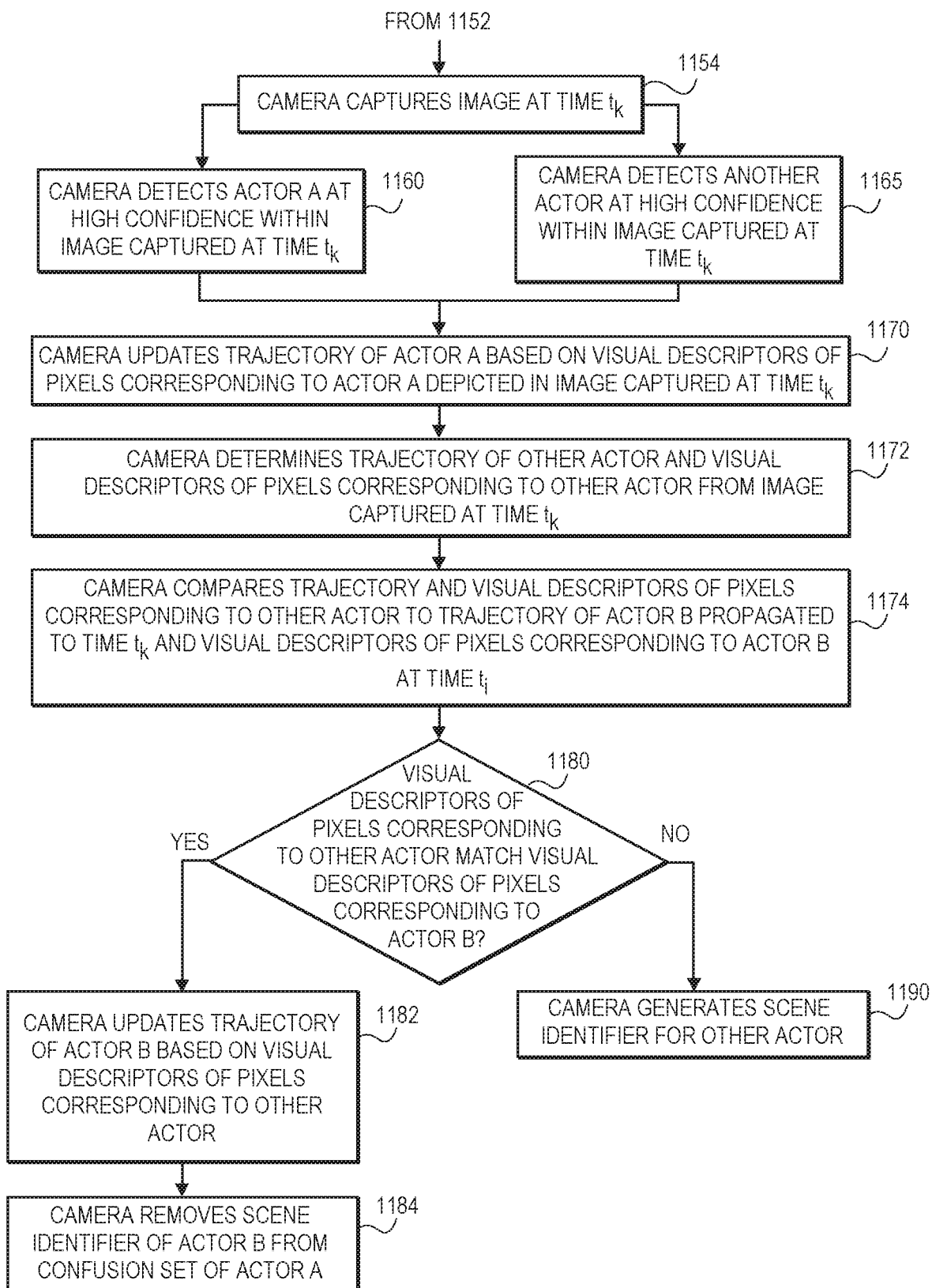

Referring to FIGS. 11A and 11B, a flow chart 1100 of one process for locating actors in accordance with implementations of the present disclosure is shown. At box 1110, a camera captures an image at a time $t_i$. The camera may be mounted in any manner at the scene, which may include one or more portions of a materials handling facility, a financial institution, a transportation center, or any other indoor or outdoor space, and with an axis of orientation that is aligned substantially vertically downward, or at any angle with respect to normal.

At box 1120, the camera detects a first actor, viz., Actor A, at a sufficiently high level of confidence within the image captured at the time $t_i$. At box 1122, the camera generates a scene identifier for Actor A, at random or on any other basis. In parallel, at box 1124, the camera detects a second actor, viz., Actor B, at a high level of confidence within the image captured at the time $t_i$. At box 1126, the camera generates a scene identifier for Actor B. The camera may detect the actors within the image captured at the time $t_i$ in any manner, e.g., by providing the image captured at time $t_i$ as an input to a machine learning tool operating on the camera, and detecting the actors based on one or more outputs received from the machine learning tool.

At box 1130, the camera determines a trajectory of Actor A, and visual descriptors of pixels corresponding to Actor A, from the image captured at the time $t_i$. At box 1132, the camera determines a trajectory of Actor B, and visual descriptors of pixels corresponding to Actor B, from the image captured at the time $t_i$. For example, the camera may provide the image to one or more machine learning tools operating thereon, and the machine learning tools may be configured to identify one or more sets of pixels corresponding to actors, or to generate or predict positions of the actors based on the imaging data.

At box 1134, the camera captures an image at time $t_j$, and at box 1140, the camera detects Actor A at a sufficiently high level of confidence within the image captured at time $t_j$. In parallel, at box 1145, however, the camera fails to detect Actor B at a sufficiently high level of confidence within the image captured at time $t_j$. Actor A may be detected within the image captured at time $t_j$ in the same manner that Actor A was detected at box 1120, or in a different manner. Likewise, Actor B may not be detected in the same manner that Actor B was detected at box 1124, or in a different manner.

At box 1150, the camera updates a trajectory of Actor A based on visual descriptors of pixels corresponding to Actor A within the image captured at the time $t_j$, e.g., in the same manner that the trajectory and the visual descriptors were determined at box 1130, or in a different manner. By matching the visual descriptors of the set of pixels corresponding to Actor A detected within the image captured at the time $t_j$ to the visual descriptors of the set of pixels detected within the image captured at the time $t_i$, for example, by an optical flow algorithm, changes in the position of Actor A from the time $t_i$ to the time $t_j$ may be inferred, and the trajectory of Actor A may be updated accordingly. At box 1152, the camera assigns the scene identifier of Actor B generated at box 1126 to a confusion set of Actor A, e.g., to a set of data, a record or a file associated with Actor A, or to confusion sets of any other neighboring actors.

At box 1156, the camera captures an image at time $t_k$, and at box 1160, the camera detects Actor A at a sufficiently high level of confidence within the image captured at time $t_k$. In parallel, at box 1165, the camera detects another actor at a sufficiently high level of confidence within the image captured at time $t_k$.

At box 1170, the camera determines a trajectory of Actor A based on the visual descriptors of pixels corresponding to Actor A depicted in the image captured at the time $t_k$. At box 1172, the camera determines a trajectory of the other actor detected at box 1165, and visual descriptors of pixels corresponding to the other actor depicted in the image captured at the time $t_k$. At box 1174, the camera compares the visual descriptors of the other actor to the visual descriptors of the pixels corresponding to the actor at the time $t_i$.

At box 1180, whether the visual descriptors of pixels corresponding to the other actor depicted in the image captured at the time $t_k$ correspond to the visual descriptors of the pixels corresponding to Actor B depicted in the image captured at the time $t_i$ is determined. For example, the other actor may be correlated to Actor B if the visual descriptors of the other actor are located in a position consistent with the propagated trajectory of Actor B, or are sufficiently similar to the visual descriptors most recently determined for Actor B, or on any other basis. If the visual descriptors of pixels corresponding to the other actor depicted in the image captured at the time $t_k$ correspond to the visual descriptors of the pixels corresponding to Actor B depicted in the image captured at the time $t_i$, then the process advances to box 1182, where the camera updates the trajectory of Actor B and the visual descriptors of pixels corresponding to Actor B based on the visual descriptors of the pixels corresponding to the other actor depicted in the image captured at the time $t_k$. At box 1184, the camera removes the scene identifier of Actor B from the confusion set of Actor A. If the visual descriptors of pixels corresponding to the other actor depicted in the image captured at the time $t_k$ do not correspond to the visual descriptors of the pixels corresponding to Actor B depicted in the image captured at the time $t_i$, then the process advances to box 1190, where the camera generates a scene identifier for the other actor, e.g., "Actor C," which may be located at later times based on the trajectory and the visual descriptors of that actor depicted in the image captured at the time $t_k$.

The process steps shown in boxes 1110 through 1190 may be repeated as many times as is necessary, or halted when one or more stopping conditions are determined. Additionally, any durations may lapse between the time $t_i$ and $t_j$, the time or between the time $t_j$ and the time $t_k$, or any number of images may be captured between the time $t_i$ and the time $t_j$, or between the time $t_j$ and the time $t_k$, in accordance with the present disclosure.

Referring to FIGS. 12A through 12F, views of aspects of one system for locating actors in accordance with implementations of the present disclosure are shown. Except where otherwise noted, reference numerals preceded by the number "12" shown in FIGS. 12A through 12F indicate components or features that are similar to components or features having reference numerals preceded by the number "10" shown in FIGS. 10A and 10B, by the number "7" shown in FIGS. 7A through 7D, by the number "5" shown in FIGS. 5A through 5H, by the number "4" shown in FIGS. 4A through 4M, by the number "2" shown in FIG. 2A or 2B, or by the number "1" shown in FIGS. 1A through 1K.

Figure 12A:
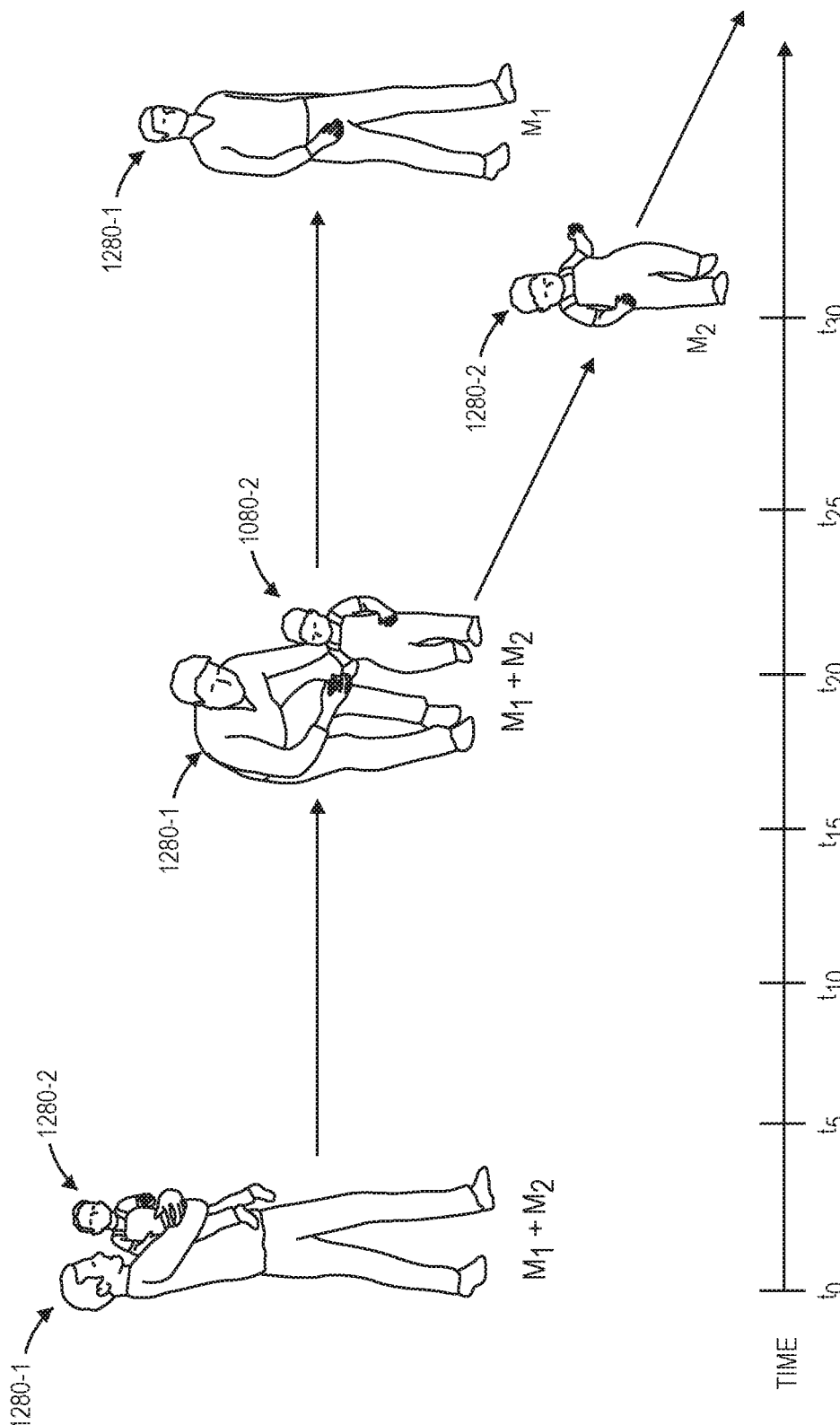

As is shown in FIG. 12A, an actor 1280-1 and an actor 1280-2 are within a field of view of a camera 1220 on a scene over a period of time from time $t_0$ to time $t_{30}$. The actor 1280-1 may be an adult or another actor that is substantially larger than the actor 1280-2, who may be a child or another actor that is substantially smaller than the actor 1280-1. Alternatively, the actor 1280-1 and the actor 1280-2 may be of any size, e.g., both adults or both children, and may travel in close proximity to one another, such as while embracing, but need not carry one another. The camera 1280 is connected to a system 1212 (e.g., a server) over one or more networks.

As is also shown in FIG. 12A, the actor 1280-1 carries the actor 1280-2 from time $t_0$ until approximately time $t_{16}$, when the actor 1280-1 places the actor 1280-2 down on a floor or other traveling surface. After the time $t_{16}$, the actor 1280-1 and the actor 1280-2 may travel across the scene within the field of view of the camera 1220, and at different velocities, e.g., at different speeds or in different directions.

Figure 12B:
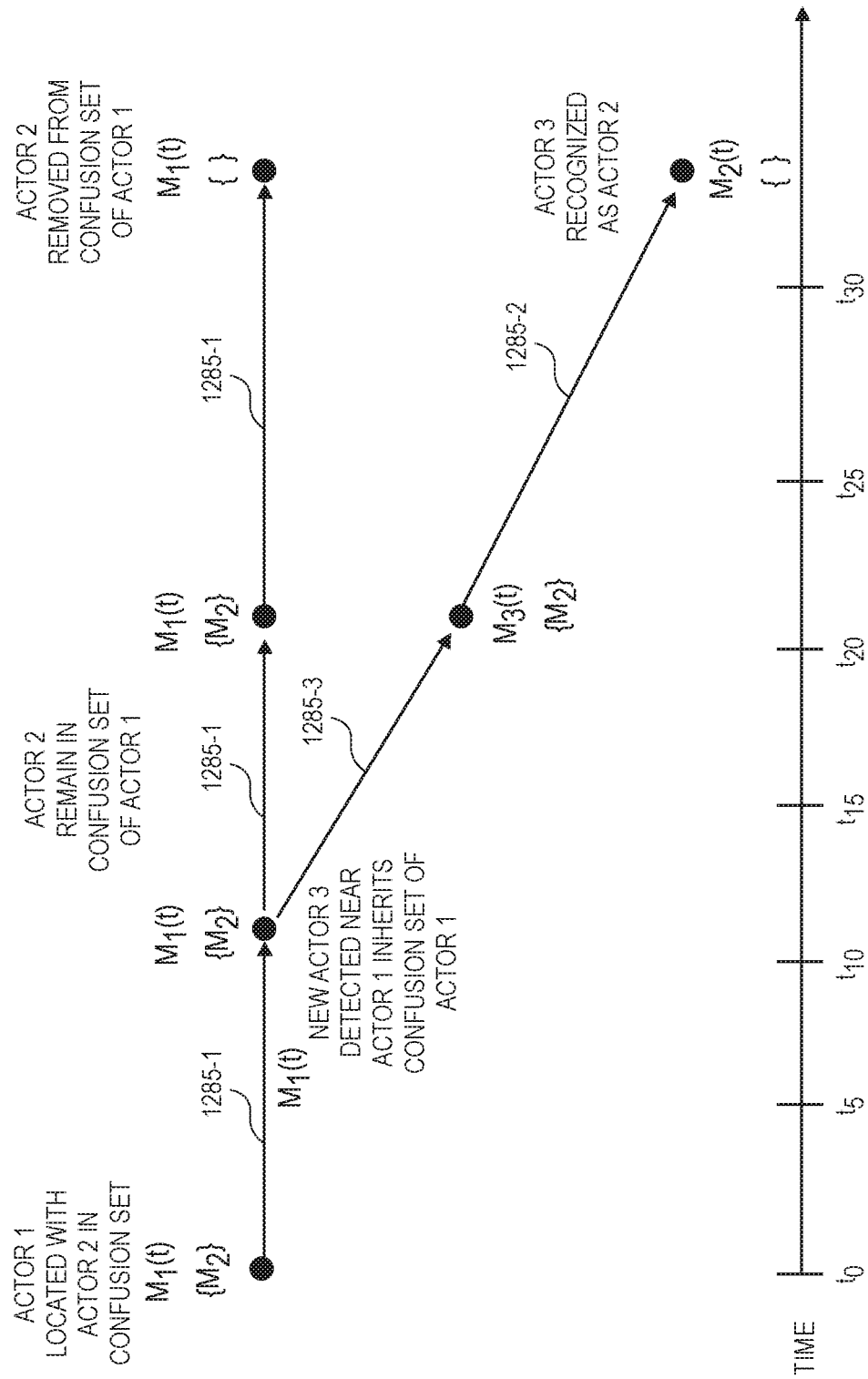

As is shown in FIG. 12B, the camera 1220 generates a camera trajectory 1285-1, or $M_1(t)$, of the actor 1280-1 based on images captured between time $t_0$ and time $t_{16}$, in which the actor 1280-1 is detected with a sufficiently high level of confidence. As is also shown in FIG. 12B, an identifier of the actor 1280-2, viz., $M_2$, is stored in a "confusion set" of the actor 1280-1 associated with the trajectory 1285-1 between time $t_0$ and time $t_{16}$. For example, where the actor 1280-2 had previously been detected and located by the camera 1220, e.g., prior to being picked up and carried by the actor 1280-1, and was no longer being detected or located in images captured by the camera 1220, the identifier of the actor 1280-2 may be stored in the "confusion set" of the actor 1280-1, or in confusion sets of any other actors (not shown).

As is further shown in FIG. 12B, the actor 1280-1 is located within images captured by the camera 1220 at time $t_{16}$ and beyond, to a sufficiently high level of confidence, while a new actor is also detected within such images to a sufficiently high level of confidence. The images captured by the camera 1220 at time $t_{16}$ and beyond may be processed to generate a trajectory 1285-3, or $M_3(t)$ of the new actor, and to determine visual descriptors of sets of pixels corresponding to the new actor. Additionally, because the new actor was detected within images near the actor 1280-1, the trajectory 1285-3 generated for the new actor inherits the confusion sets of all nearby trajectories, e.g., the trajectory 1285-1 generated for the actor 1280-1. Meanwhile, the trajectory 1285-1 of the actor 1280-1 and the visual descriptors of the pixels corresponding to the actor 1280-1 may also be updated based on images captured by the camera 1220 at time $t_{16}$ and beyond.

As is also shown in FIG. 12B, at time $t_{25}$, after the trajectory 1285-3 and visual descriptors of the new actor have been determined and updated for a period of time, the trajectory 1285-3 or the visual descriptors may be compared to trajectories or visual descriptors associated with actors in the confusion set of the trajectory 1285-3, viz., the identifier $M_2$ of the actor 1280-2, in order to determine whether the trajectory 1285-3 or the visual descriptors may be correlated with one of such actors, viz., the actor 1280-2. As is further shown in FIG. 12B, upon confirming that the trajectory 1285-3 or visual descriptors of sets of pixels corresponding to the new actor are consistent with the visual descriptors of sets of pixels corresponding to the actor 1280-2, the identifier $M_2$ of the actor 1280-2 may be removed from the confusion set of the actor 1280-1, and also from the confusion set associated with the trajectory 1285-3. Thereafter, the trajectory 1285-2 may be located and updated based on detections of the actor 1280-2.

Additionally, as is shown in FIG. 12C, the actor 1280-1 is carrying the actor 1280-2 within the field of view of the camera 1220 on the scene over the period of time from time $t_0$ to time $t_{30}$. The actor 1280-1 and the actor 1280-2 may travel in close proximity to one another, as the actor 1280-1 carries the actor 1280-2, or embraces the actor 1280-2. Additionally, another actor 1280-3 also travels along the scene, within the field of view of the camera 1220.

As is also shown in FIG. 12C, at approximately time $t_5$, the actor 1280-3 passes within a vicinity of the actor 1280-1 and the actor 1280-2. After the time $t_5$, the actor 1280-1 continues to carry the actor 1280-2, and the actor 1280-3 further continues to travel across the scene within the field of view of the camera 1220, and at different velocities, e.g., at different speeds or in different directions.

Figure 12D:
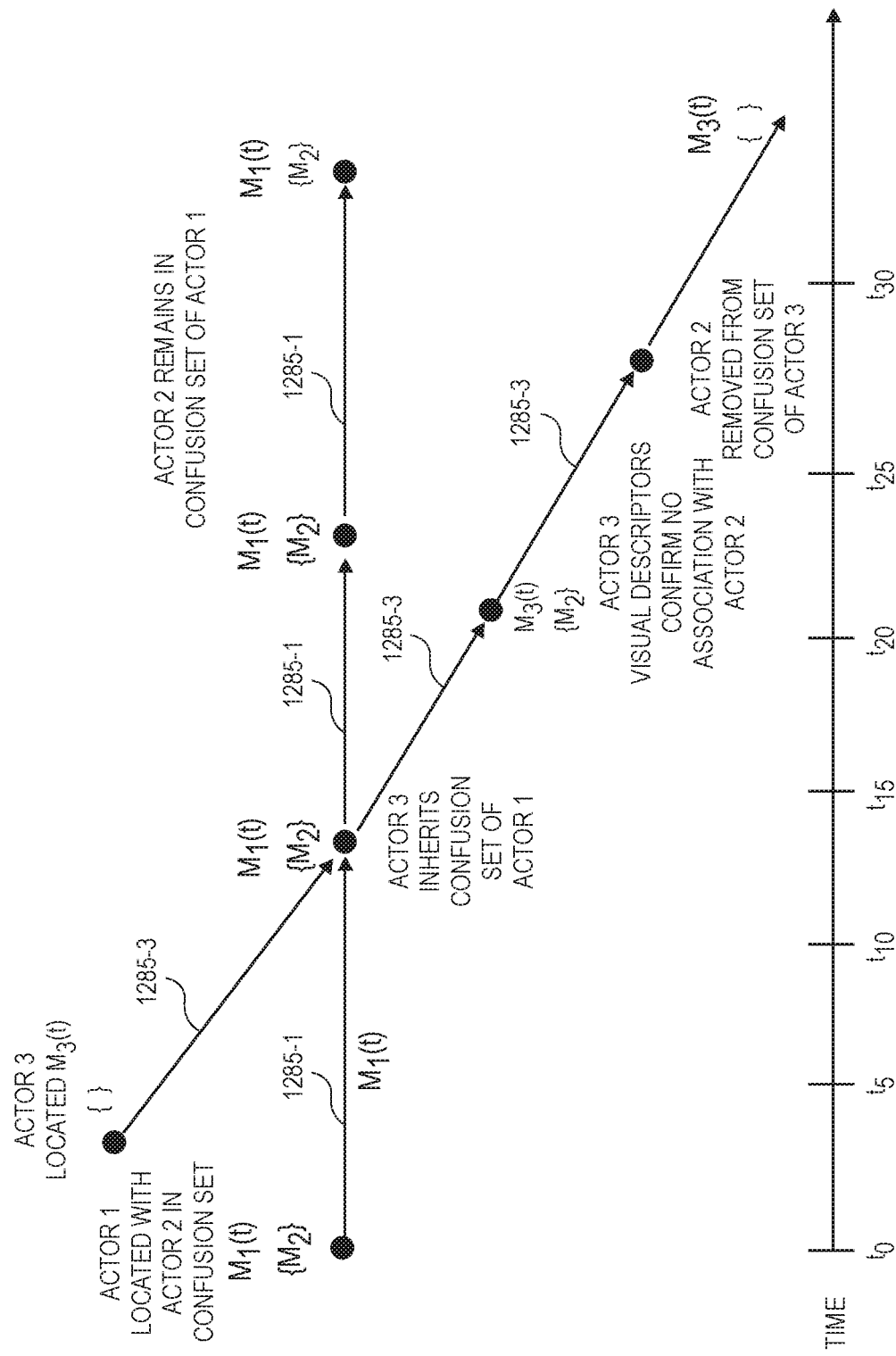

As is shown in FIG. 12D, the camera 1220 generates a camera trajectory 1285-1, or $M_1(t)$, of the actor 1280-1 based on images captured between time $t_0$ and time $t_{25}$, in which the actor 1280-1 is detected with a sufficiently high level of confidence. As is also shown in FIG. 12D, an identifier of the actor 1280-2, viz., $M_2$, is stored in a "confusion set" of the actor 1280-1 associated with the trajectory 1285-1 between time $t_0$ and time $t_5$. For example, where the actor 1280-2 had previously been detected and located by the camera 1220, e.g., prior to being picked up and carried by the actor 1280-1, and was no longer being detected or located in images captured by the camera 1220, the identifier of the actor 1280-2 may be stored in the "confusion set" of the actor 1280-1, or in confusion sets of any other actors (not shown).

As is further shown in FIG. 12D, the actor 1280-1 and the actor 1280-3 are located within images captured by the camera 1220 at time $t_5$ and beyond, to a sufficiently high level of confidence. Additionally, because the actor 1280-1 and the actor 1280-3 passed within close proximity to one another, as determined from the images captured by the camera 1220 at or near time $t_5$, the trajectory 1285-3 inherits the confusion set of the trajectory 1285-1 as of the time $t_5$. Thereafter, images captured by the camera 1220 may be processed to determine whether visual descriptors of sets of pixels corresponding to the actors 1280-1, 1280-3 may include, or do not include, any sets of pixels corresponding to the actor 1280-2. Thus, as is shown in FIG. 12D, upon determining that the visual descriptors of the set of pixels corresponding to the actor 1280-3 do not show any association with the actor 1280-2, the identifier of the actor 1280-2 may be removed from the confusion set of the actor 1280-3. Meanwhile, the identifier of the actor 1280-2 may remain in the confusion set of the trajectory 1285-1 of the actor 1280-1, which may also be updated based on images captured by the camera 1220 at time $t_5$ and beyond.

Figure 12E:
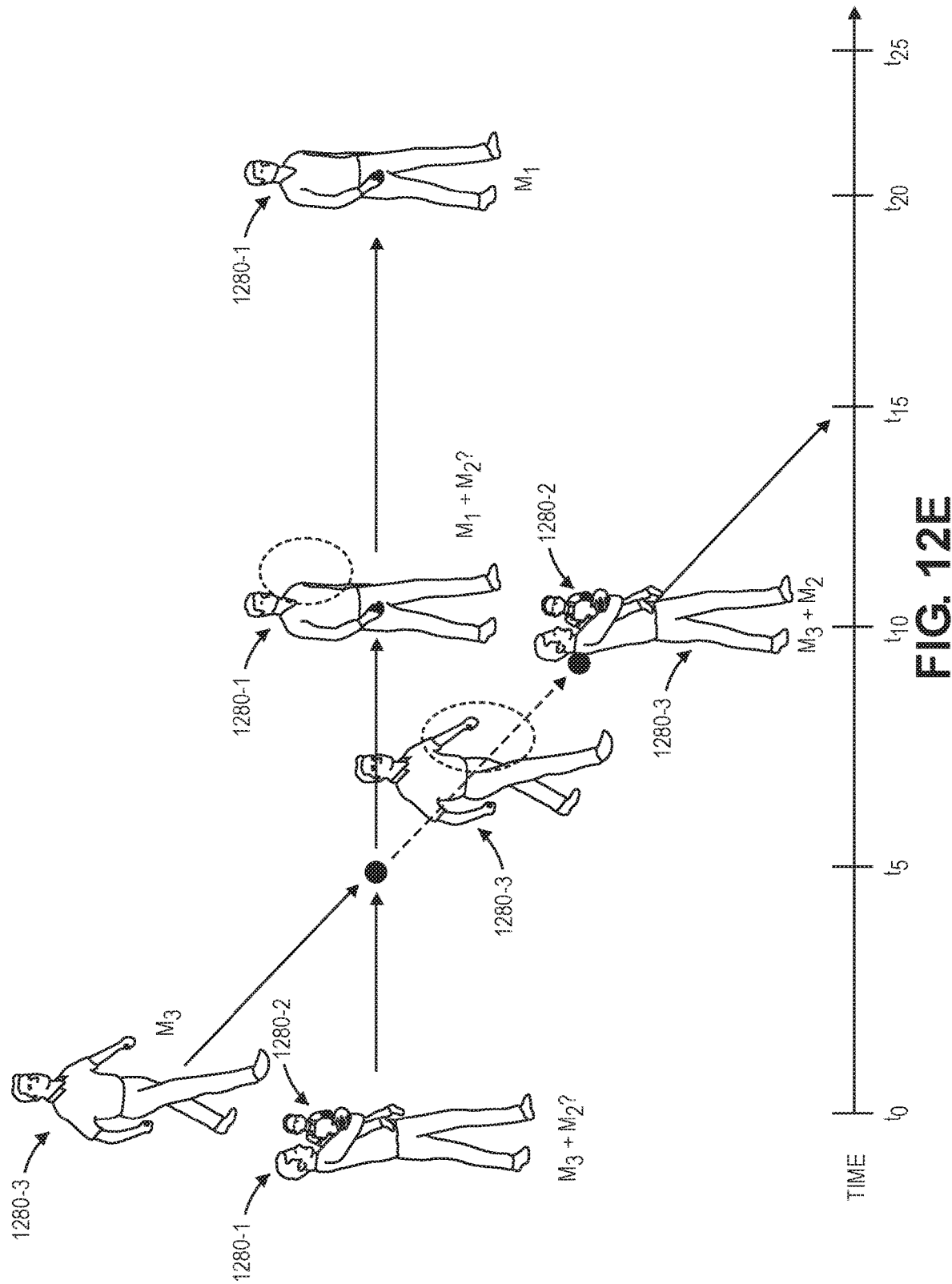

Additionally, as is shown in FIG. 12E, the actor 1280-1 is carrying the actor 1280-2 within the field of view of the camera 1220 on the scene over the period of time from time $t_0$ to time $t_5$. Additionally, the actor 1280-3 also travels along the scene, within the field of view of the camera 1220, and passes within a vicinity of the actor 1280-1 and the actor 1280-2. After the time $t_5$, the actor 1280-1 hands the actor 1280-2 to the actor 1280-3, and the actor 1280-1 and the actor 1280-3 further continue to travel across the scene within the field of view of the camera 1220, and at different velocities, e.g., at different speeds or in different directions.

Figure 12F:
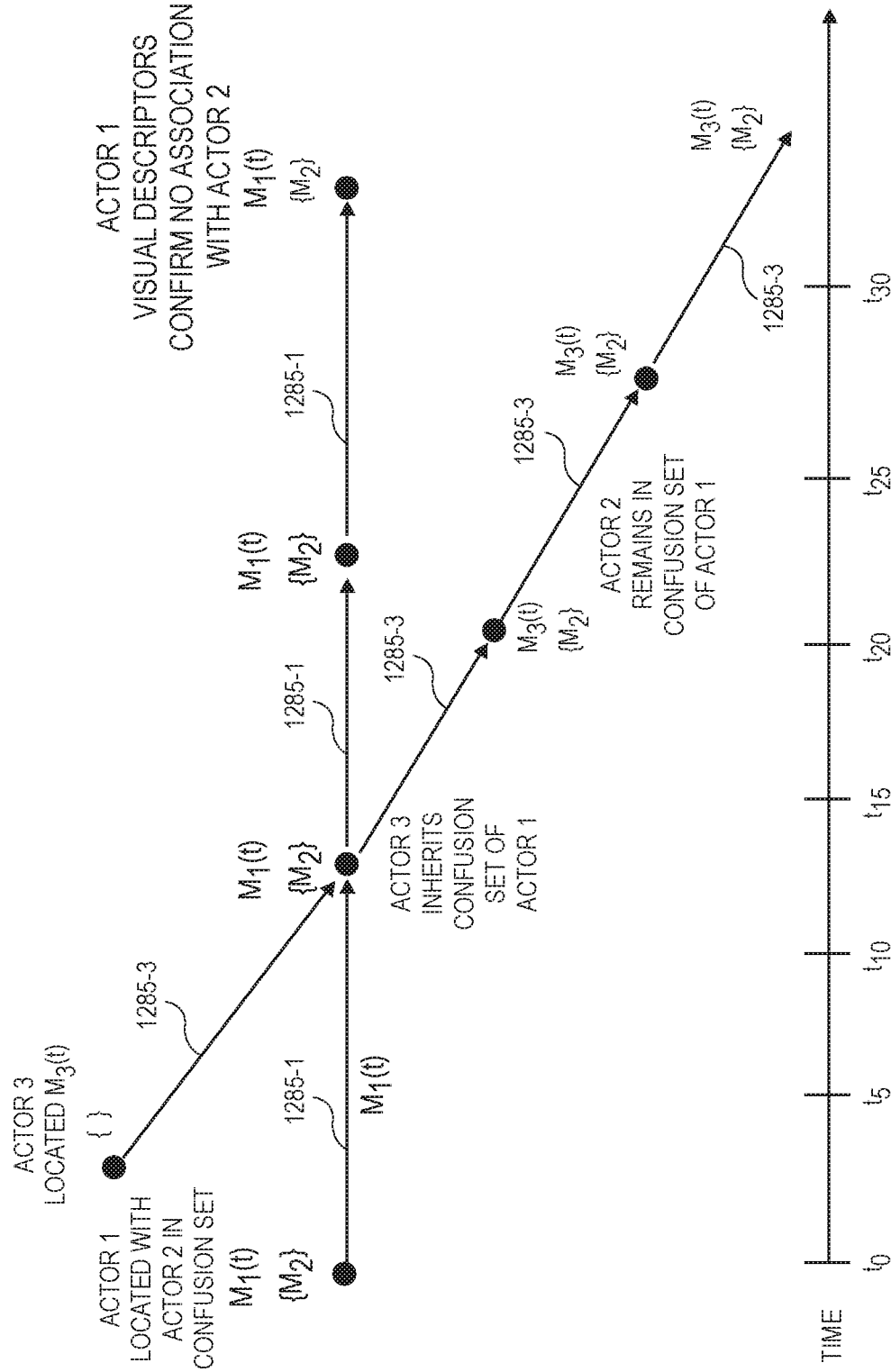

As is shown in FIG. 12F, the camera 1220 generates camera trajectories 1285-1, 1285-3, or $M_1(t)$, $M_3(t)$, of the actors 1280-1, 1280-3 based on images captured between time $t_0$ and time $t_{25}$, in which the actors 1280-1, 1280-3 are detected with a sufficiently high level of confidence. As is also shown in FIG. 12F, an identifier of the actor 1280-2, viz., $M_2$, is stored in a "confusion set" of the actor 1280-1 associated with the trajectory 1285-1 between time $t_0$ and time $t_5$.

As is further shown in FIG. 12F, because the actor 1280-1 and the actor 1280-3 passed within close proximity to one another, as determined from the images captured by the camera 1220 at or near time $t_5$, the trajectory 1285-3 inherits the confusion set of the trajectory 1285-1 as of the time $t_5$. Thereafter, images captured by the camera 1220 may be processed to determine whether visual descriptors of sets of pixels corresponding to the actors 1280-1, 1280-3 may include, or do not include, any sets of pixels corresponding to the actor 1280-2. Thus, as is shown in FIG. 12F, upon determining that the visual descriptors of the set of pixels corresponding to the actor 1280-3 show an association with the actor 1280-2 with the actor 1280-3, and that the visual descriptors of the set of pixels corresponding to the actor 1280-1 do not show any association with the actor 1280-2, the identifier of the actor 1280-2 may be removed from the confusion set of the actor 1280-1. Meanwhile, the identifier of the actor 1280-2 may remain in the confusion set of the trajectory 1285-3 of the actor 1280-3, which may also be updated based on images captured by the camera 1220 at time $t_5$ and beyond.

Figure 13:
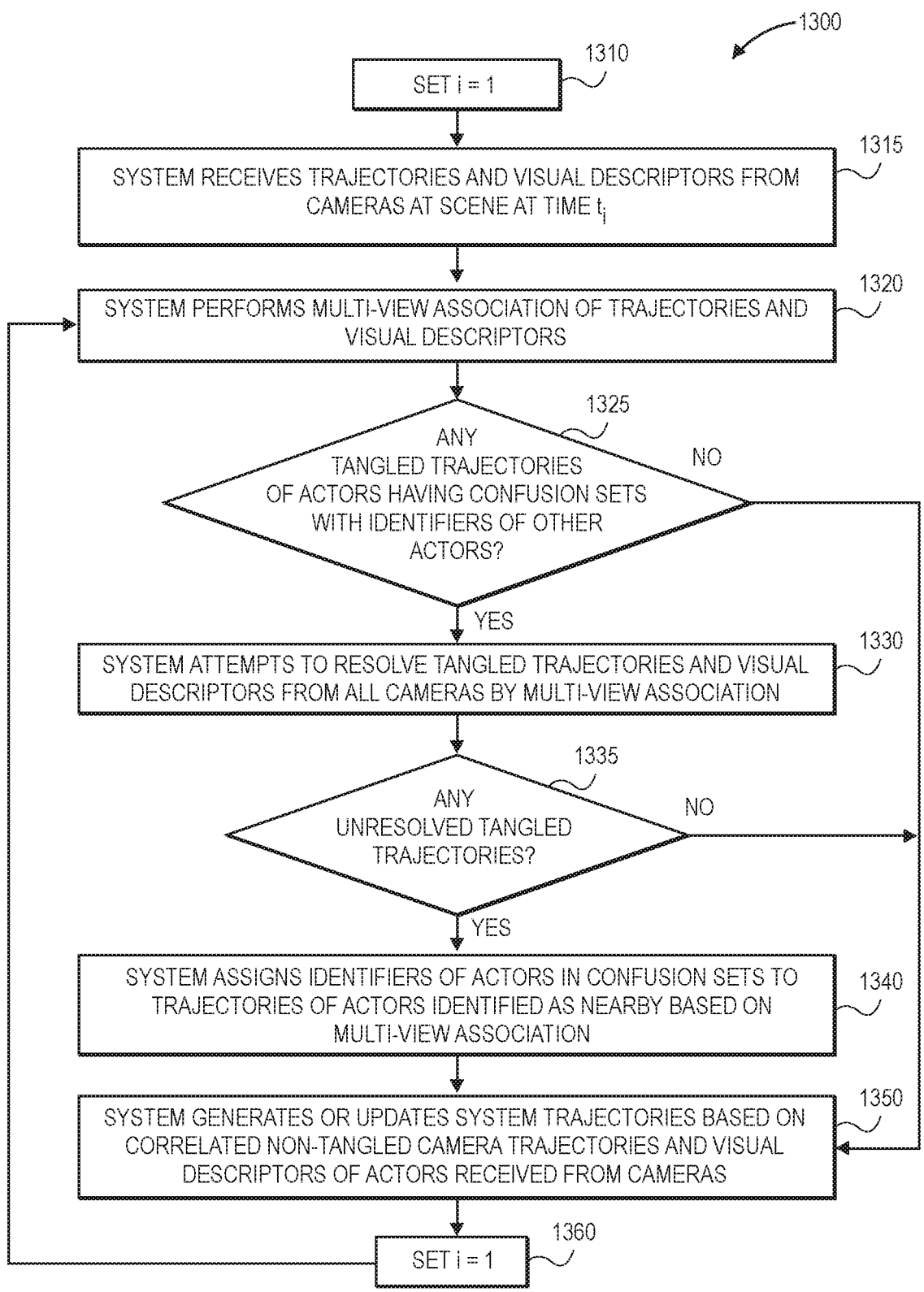
FIG. 13 is a flow chart of one process for locating actors in accordance with implementations of the present disclosure.

A system that receives trajectories of actors and visual descriptors of pixels corresponding to the actors from multiple cameras, including indications that one or more actors is in a "confusion set" of one or more other actors, or that two or more actors are in a "tangled state," may attempt to resolve the tangled states of such actors where positions of trajectories or visual descriptors determined by different cameras are consistent with one another. Referring to FIG. 13, a flow chart 1300, at box 1310, a value of a step variable i is set to equal one, or i=1. At box 1315, a system receives a plurality of trajectories and visual descriptors of pixels corresponding to actors from multiple cameras at a scene at time $t_i$. For example, the scene may include one or more storage units, floor surfaces or other portions of a materials handling facility, or any other facility, e.g., a financial institution, a transportation center, or any other indoor or outdoor space.

At box 1320, the system performs associations (e.g., multi-view associations) of the trajectories and the visual descriptors that are received from the cameras at the scene at time $t_i$. For example, where the positions of the actors determined from images captured by the cameras, e.g., based on 3D line segments extending from locations of heads or other actors to positions on ground surfaces or other floor surfaces, as discussed above, trajectories determined from the multiple views of different cameras may be determined to be associated with one another, such as to represent a common actor, where positions of such trajectories are sufficiently proximate to one another.

At box 1325, whether any of the cameras have reported tangled trajectories of actors having confusion sets including identifiers of other actors is determined. Tangled trajectories may be identified where a trajectory of one actor is associated with identifiers of one or more other actors, e.g., in a confusion set of one or more of such actors, or where a trajectory of an actor is identified as being of low confidence, and thus propagated or otherwise advanced with respect to a previously generated trajectory of sufficiently high confidence. For example, upon receiving the trajectories and visual descriptors from the cameras at box 1315, and performing multi-view associations of the trajectories and the visual descriptors at box 1320, the system may determine whether any of the trajectories of actors or visual descriptors of pixels corresponding to the actors are associated with one or more additional identifiers of actors, thereby signifying that such actors were previously detected and located at the scene while within a vicinity of one or more other actors, but are no longer detected or located with a sufficiently high level of confidence.

If none of the cameras reports any tangled trajectories of multiple actors, then the process advances to box 1350, where the system generates or updates system trajectories of the respective actors based on correlations between the non-tangled camera trajectories and visual descriptors received from the actors at box 1315. For example, where camera trajectories received from a camera are based on positions of actors on a floor surface, as determined from detections of heads or other body parts of the actors within images captured by the camera and predictions of lengths of line segments extending between the detected heads and floor surfaces associated with the actors within such images, the camera trajectories may be compared to one or more previously generated system trajectories, in order to determine whether any of such camera trajectories may be correlated with one another. Where visual descriptors of pixels received from the cameras include colors, textures, outlines or other aspects of actors, as determined from images captured by the cameras, the visual descriptors may be compared to visual descriptors received from other cameras, in order to determine whether any of such visual descriptors may be correlated. Actors detected by cameras may be associated with one another, or with previously generated system trajectories, based on trajectories (e.g., similar or proximate positions at common times), based on visual descriptors (e.g., common colors, textures, outlines or other aspects), or in any other manner.

If any of the cameras reports tangled trajectories of actors, or trajectories of actors having confusion sets with identifiers of one or more other actors associated therewith, then the process advances to box 1325, where the system attempts to resolve the tangled trajectories from one of the cameras with reported trajectories and visual descriptors received from one or more other cameras based on the multi-view associations. For example, a trajectory (e.g., a propagated trajectory) of an actor or visual descriptors of pixels corresponding to the actor are identified by a camera at low levels of confidence, and associated with a trajectory or visual descriptors that were identified by a camera at a sufficiently high level of confidence, the trajectory and the visual descriptors of the actor identified with low levels of confidence may be provided to a machine learning tool (e.g., a classifier) that considers whether positions of the trajectory or the visual descriptors are consistent with any other trajectories or other visual descriptors reported by other cameras. To the extent that a low-confidence trajectory or visual descriptors generated by one camera are identified as being associated with a trajectory or visual descriptors generated by another camera with sufficiently high confidence, an identifier of the actor associated with the low-confidence trajectory or visual descriptors may be removed from a confusion set of another actor, and the actors may be disentangled or otherwise unassociated with one another.

At box 1330, whether any unresolved tangled trajectories remain following the attempted resolution at box 1325 is determined. If any identifiers of actors within confusion sets of other trajectories may not be correlated with one or more other trajectories, e.g., based on multi-view associations, then the process advances to box 1340, where the system assigns identifiers of the actors within such confusion sets to trajectories of actors identified as nearby based on the multi-view association. For example, the identifiers of actors in a confusion set of one trajectory that cannot be correlated with any other trajectories, all nearby trajectories may inherit the identifiers of such other actors. At box 1350, the system generates or updates system trajectories of the respective actors based on correlations between the non-tangled camera trajectories and visual descriptors, as described above.

At box 1360, after the system has generated or updated system trajectories of actors based on correlations between non-tangled camera trajectories and visual descriptors, the value of the step variable i is incremented by one, or i=i+1, before returning to box 1315, where the system receives a plurality of trajectories and visual descriptors from the multiple cameras at the scene. The process steps shown in boxes 1315 through 1360 may be repeated as many times as is necessary, or halted when one or more stopping conditions are determined.

Figure 14B:
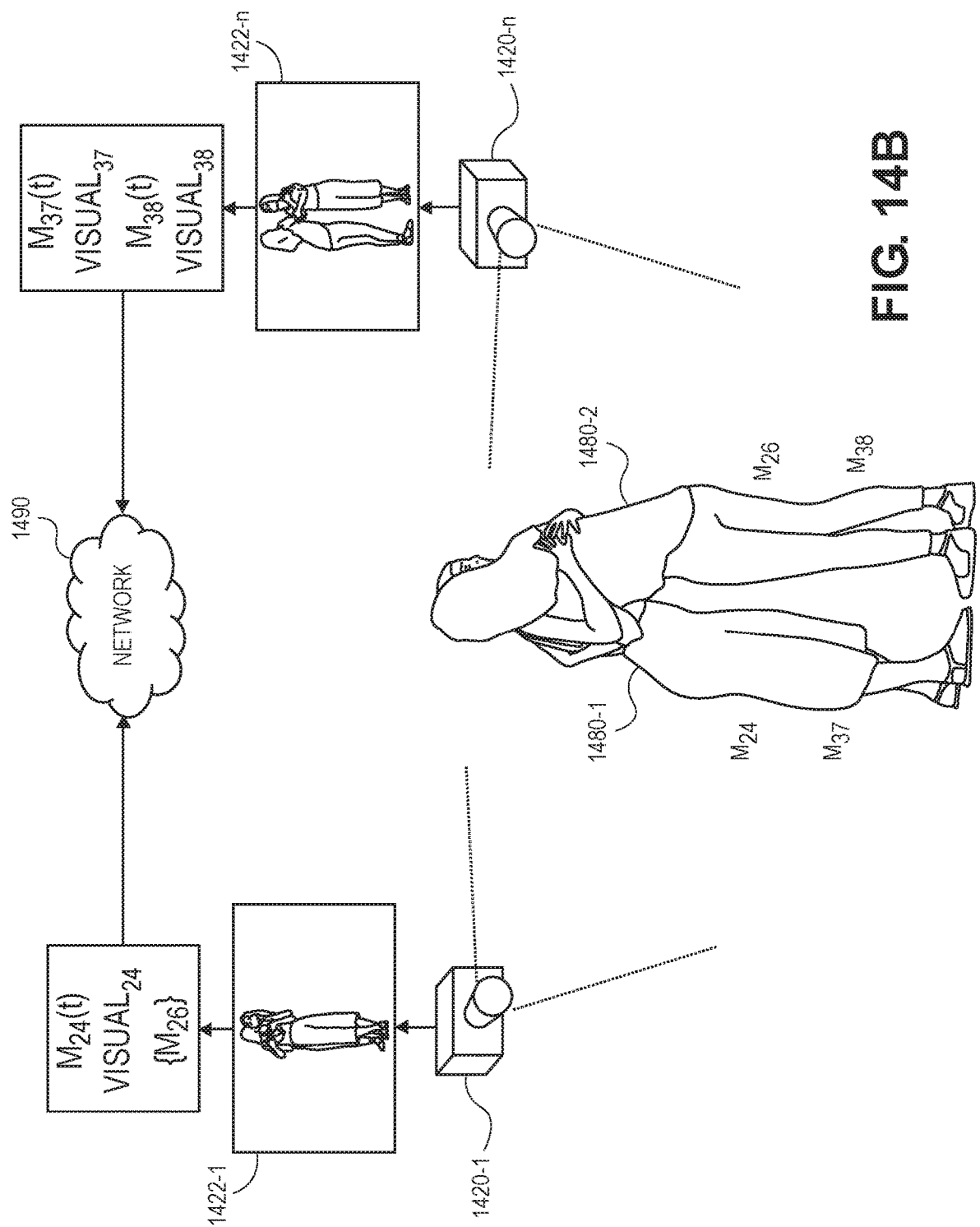

Referring to FIGS. 14A and 14B, views of aspects of one system for locating actors in accordance with implementations of the present disclosure are shown. Except where otherwise noted, reference numerals preceded by the number "14" shown in FIGS. 14A and 14B indicate components or features that are similar to components or features having reference numerals preceded by the number "12" shown in FIGS. 12A through 12F, by the number "10" shown in FIGS. 10A and 10B, by the number "7" shown in FIGS. 7A through 7D, by the number "5" shown in FIGS. 5A through 5H, by the number "4" shown in FIGS. 4A through 4M, by the number "2" shown in FIG. 2A or 2B, or by the number "1" shown in FIGS. 1A through 1K.

As is shown in FIGS. 14A and 14B, a pair of actors 1480-1, 1480-2, execute one or more poses, gestures or other actions within the fields of view of a plurality of imaging devices 1420-1, 1420-2 . . . 1420-n that are connected to a network 1490. The actors 1480-1, 1480-2 are shown within a vicinity of one another, and embracing or otherwise making close contact with one another.

As is further shown in FIG. 14B, the cameras 1420-1, 1420-n capture and process images 1422-1, 1422-n. For example, the cameras 1420-1, 1420-n may provide the images 1422-1, 1422-n as inputs to one or more machine learning tools operating thereon, in order to determine whether either of the images 1420-1, 1420-2 depicts actors, to determine positions of such actors, to identify sets of pixels corresponding to the actors, and to generate trajectories of any actors depicted therein based on such positions or sets of pixels. In particular, as is shown in FIG. 14B, the camera 1420-1 generates a camera trajectory $M_{24}(t)$ and a set of visual descriptors $VISUAL_{24}$ for the actor 1480-1, and places an identifier $M_{26}$ of the actor 1480-2 in a confusion set of the actor 1480-1. Additionally, as is also shown in FIG. 14B, the camera 1420-n generates a camera trajectory $M_{37}(t)$ and a set of visual descriptors $VISUAL_{37}$ for the actor 1480-1, and a camera trajectory $M_{38}(t)$ and a set of visual descriptors $VISUAL_{38}$ for the actor 1480-2.

Figure 14C:
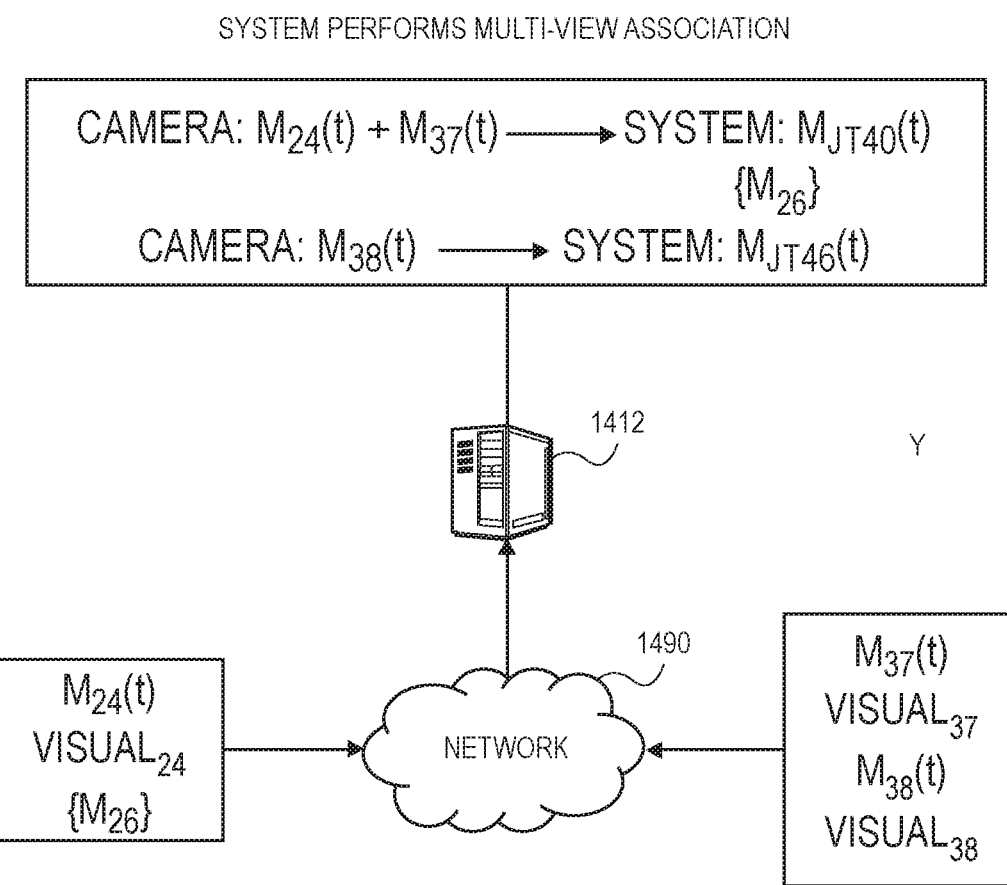

As is also shown in FIG. 14C, the cameras 1420-1, 1420-2 forward records, sets of data or other information regarding the trajectories generated for actors thereby, as well as visual descriptors of sets of pixels corresponding to such actors, to a server (or other system) 1412 over the network 1490. The server 1412 then performs a multi-view association on the camera trajectories that were received from the respective cameras 1420-1, 1420-2, to determine whether any of the camera trajectories may be correlated with one another, e.g., based on the positions of the actors associated with each of such trajectories. For example, as is shown in FIG. 14C, the server 1412 may correlate the camera trajectory $M_{24}(t)$ generated by the camera 1420-1 and the camera trajectory $M_{37}(t)$ generated by the camera 1420-n with one another, based on the similarities in position of each of the trajectories. The server 1412 may then generate a system trajectory $M_{JT40}(t)$ based on the camera trajectory $M_{24}(t)$ and the visual descriptors $VISUAL_{24}$ reported by the camera 1420-1 and the camera trajectory $M_{37}(t)$ and the visual descriptors $VISUAL_{37}$ reported by the camera 1420-n, and assign a unique identifier, viz., JT40, to the system trajectory $M_{JT40}(t)$. The system trajectory $M_{JT40}(t)$ also inherits the contents of the confusion set of the camera trajectory $M_{38}(t)$, viz., the identifier $M_{26}$.

Additionally, the server 1412 generates a system trajectory $M_{RT46}(t)$ based on the camera trajectory $M_{38}(t)$ and the visual descriptors $VISUAL_{38}$ received from the camera 1420-n, and assign a unique identifier, viz., RT46, to the system trajectory $M_{RT46}(t)$.

Figure 14D:
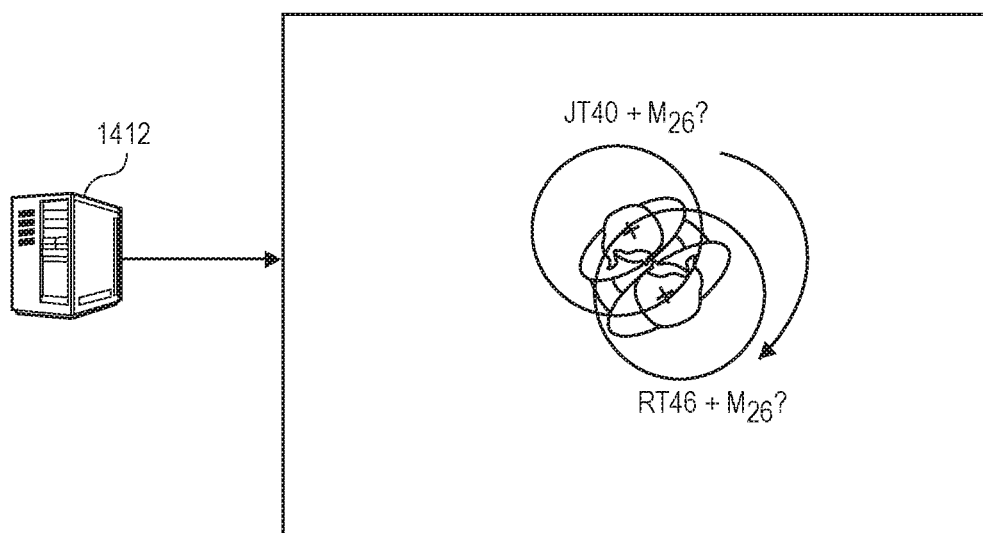

As is shown in FIG. 14D, upon generating the system trajectory $M_{JT40}(t)$ and the system trajectory $M_{RT46}(t)$, and determining that the system trajectory $M_{JT40}(t)$ and the system trajectory $M_{RT46}(t)$ are proximate to one another, the server 1412 causes the system trajectory $M_{RT46}(t)$ to adopt the confusion set of the system trajectory $M_{JT40}(t)$, viz., the identifier $M_{26}$ received from the camera 1420-1.

Figure 14E:
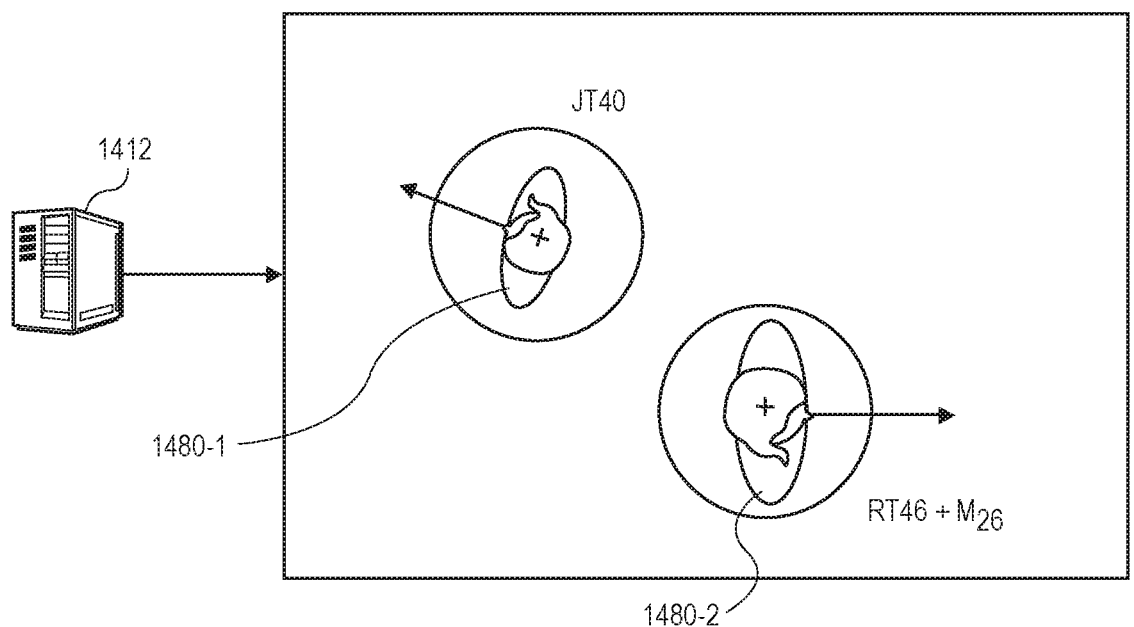

Subsequently, trajectories and the visual descriptors received from the cameras 1420-1, 1420-2 . . . 1420-n may be processed to determine whether any of the actors or identifiers residing in a confusion set of one of the system trajectories then being located by the server 1412, may be correlated with any of the camera trajectories or visual descriptors received from such cameras. For example, as is shown in FIG. 14E, upon determining that one or more camera trajectories received from one of the cameras is correlated with the system trajectory $M_{RT46}(t)$ having the identifier $M_{26}$ in a confusion set, e.g., a camera trajectory $M_{26}(t)$ received from the camera 1480-1, but is not correlated with the system trajectory $M_{JT40}(t)$, the identifier $M_{26}$ may be removed from the confusion sets of both the actor 1480-1 and the actor 1480-2. Subsequently, the system trajectory $M_{JT40}(t)$ may be updated based on both the camera trajectory $M_{38}(t)$ received from the camera 1420-n and the camera trajectory $M_{26}(t)$ received from the camera 1420-1.

Although some of the implementations disclosed herein reference the detection and location of human actors by digital cameras, the systems and methods of the present disclosure are not so limited. For example, the systems and methods disclosed herein utilize digital cameras or other imaging devices to locate any objects, including one or more body parts of non-human animals, as well as portions of any number of machines or robots, and are not limited to detecting and locating humans. Furthermore, although some of the implementations disclosed herein reference detecting and locating actors in a commercial setting, e.g., within a materials handling facility such as a fulfillment center or a retail establishment, the systems and methods of the present disclosure are likewise not so limited. Rather, the systems and methods disclosed herein may be utilized to locate objects in 3D space within any type of commercial or non-commercial settings. Additionally, although some of the implementations described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale.

Moreover, any of the systems or methods disclosed herein may be utilized as a primary technique or means, or as an exclusive technique or means, for locating target objects such as actors on a scene based on imaging data captured using one or more cameras or other imaging devices. Alternatively, any of the systems and methods disclosed herein may be utilized as a secondary technique or means, or as an alternate or backup technique or means, for locating target objects such as actors on a scene. For example, those of ordinary skill in the pertinent arts will recognize that any of the systems and methods disclosed herein may be utilized in connection with, or in support of, any other technique or means for locating target objects such as actors on a scene.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIGS. 3, 6, 8, 9, 11A and 11B, or 13, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
   a first camera including at least a first portion of a scene within a first field of view, wherein the first camera comprises a first processor unit and a first optical sensor;
   a second camera including at least a second portion of the scene within a second field of view, wherein the second camera comprises a second processor unit and a second optical sensor; and
   a computer system in communication with the first camera and the second camera,
   wherein the computer system is programmed with one or more sets of instructions that, when executed by the computer system, cause the computer system to at least:
      receive a first camera trajectory for a first object comprising a first set of positions of the first object and a first object identifier from the first camera, wherein the first camera trajectory is generated by the first camera based at least in part on:
         a location of a first set of pixels representing the first object depicted within a first image captured by the first camera at a first time; and
         a location of a second set of pixels representing the first object depicted within a second image captured by the first camera at a second time, wherein a second set of visual descriptors of the second set of pixels is similar to a first set of visual descriptors of the first set of pixels,
      wherein a first one of the first set of positions corresponds to a first point on a ground plane determined based at least in part on a first line segment extending from a location of a head depicted within the first set of pixels to a location corresponding to the first point on the ground plane;

receive a second camera trajectory for a second object comprising a second set of positions of the second object and a second object identifier from the second camera, wherein the second camera trajectory is generated by the second camera based at least in part on:
- a location of a third set of pixels representing the second object depicted within a third image captured by the second camera at the first time; and
- a location of a fourth set of pixels representing the second object depicted within a fourth image captured by the second camera at the second time, wherein a fourth set of visual descriptors of the fourth set of pixels is similar to a third set of visual descriptors of the third set of pixels, wherein a second one of the second set of positions corresponds to a second point on the ground plane determined based at least in part on a second line segment extending from a location of a head depicted within the second set of pixels to a location corresponding to the second point on the ground plane;

determine that the first one of the first set of positions is consistent with the second one of the second set of positions; and in response to determining that the first one of the first set of positions is consistent with the second one of the second set of positions,
- generate a first system trajectory based at least in part on the first camera trajectory and the second camera trajectory; and
- store the first system trajectory in association with the first object identifier and the second object identifier in at least one data store.

2. The system of claim 1, further comprising a third camera in communication with the computer system,
wherein the one or more sets of instructions, when executed by the computer system, further cause the computer system to at least:
receive a third camera trajectory for a third object comprising a third set of positions and a third object identifier from the third camera, wherein the third camera trajectory is generated by the third camera based at least in part on:
- a location of a fifth set of pixels representing the third object depicted within a fifth image captured by the third camera at a third time, wherein the third time follows the second time; and
- a location of a sixth set of pixels representing the third object depicted within a sixth image captured by the third camera at a fourth time, wherein a sixth set of visual descriptors of the sixth set of pixels is similar to a fifth set of visual descriptors of the fifth set of pixels, wherein a third one of the third set of positions corresponds to a third point on the ground plane determined based at least in part on a third line segment extending from a location of a head depicted within the fifth set of pixels to a location corresponding to the third point on the ground plane;

determine a position associated with the first system trajectory at the third time;

determine that the third one of the third set of positions is consistent with the position associated with the first system trajectory at the third time; and in response to determining that the third one of the third set of positions is consistent with the position associated with the first system trajectory at the third time,
- generate an updated first system trajectory based at least in part on the third camera trajectory; and
- store the updated first system trajectory in association with the first object identifier, the second object identifier and the third object identifier in the at least one data store.

3. The system of claim 1, further comprising a third camera in communication with the computer system,
wherein the one or more sets of instructions, when executed by the computer system, further cause the computer system to at least:
receive a third camera trajectory for a third object comprising a third set of positions and a third object identifier from the third camera, wherein the third camera trajectory is generated by the third camera based at least in part on:
- a location of a fifth set of pixels representing the third object depicted within a fifth image captured by the third camera at a third time, wherein the third time follows the second time; and
- a location of a sixth set of pixels representing the third object depicted within a sixth image captured by the third camera at a fourth time, wherein a sixth set of visual descriptors of the sixth set of pixels is similar to a fifth set of visual descriptors of the fifth set of pixels, wherein a third one of the third set of positions corresponds to a third point on the ground plane determined based at least in part on a third line segment extending from a location of a head depicted within the fifth set of pixels to a location corresponding to the third point on the ground plane;

determine a position associated with the first system trajectory at the third time;

determine that the third one of the third set of positions is not consistent with the position associated with the first system trajectory at the third time; and in response to determining that the third one of the third set of positions is not consistent with the position associated with the first system trajectory at the third time,
- generate a second system trajectory based at least in part on the third camera trajectory; and
- store the second system trajectory in association with the third object identifier in the at least one data store.

4. A method comprising:
receiving, by a computer system, at least a first trajectory and a first identifier of the first trajectory from a first camera including at least a portion of a scene within a first field of view,
wherein the first trajectory comprises a first set of positions in three-dimensional space,
wherein each of the first set of positions is determined from one of a first plurality of images captured by the first camera over a first period of time, and
wherein each of the first set of positions is on a ground plane associated with the scene;

receiving, by the computer system, at least a second trajectory and a second identifier of the second trajectory from a second camera including at least a portion of the scene within a second field of view,
  wherein the second trajectory comprises a second set of positions in three-dimensional space,
  wherein each of the second set of positions is determined from one of a second plurality of images captured by the second camera over the first period of time, and
  wherein each of the second set of positions is on the ground plane;
determining, by the computer system, that at least a first position of the first set of positions determined from a first image of the first plurality of images captured at a first time within the first period of time is consistent with at least a second position of the second set of positions determined from a second image of the second plurality of images captured at the first time; and
in response to determining that at least the first position is consistent with at least the second position,
  generating, by the computer system, at least a third trajectory and a third identifier of the third trajectory, wherein the third trajectory comprises a third set of positions in three-dimensional space; and
storing, by the computer system, the third trajectory in association with the first identifier, the second identifier and the third identifier.

5. The method of claim 4, wherein receiving at least the first trajectory and the first identifier from the first camera comprises:
  receiving, by the computer system, a first set of visual descriptors associated with the first trajectory from the first camera, wherein the first set of visual descriptors relates to at least a first set of pixels of at least the first image,
  wherein receiving at least the second trajectory and the second identifier from the second camera comprises:
    receiving, by the computer system, a second set of visual descriptors associated with the second trajectory from the second camera, wherein the second set of visual descriptors relates to at least a second set of pixels of at least the second image, and
  wherein determining that at least the first position of the first set of positions is consistent with at least the second position of the second set of positions comprises:
    determining, by the computer system, that at least some of the first set of visual descriptors correspond to at least some of the second set of visual descriptors.

6. The method of claim 5, further comprising:
  detecting, by the first camera, the first set of pixels within the first image;
  determining, by the first camera, the first set of visual descriptors of the first set of pixels;
  generating, by the first camera, a first line segment having a proximal end at a first location within the first set of pixels and a distal end at a second location corresponding to the first position;
  detecting, by the second camera, the second set of pixels within the second image;
  determining, by the second camera, the second set of visual descriptors of the second set of pixels;
  generating, by the second camera, a second line segment having a proximal end at a third location within the second set of pixels and a distal end at a fourth location corresponding to the second position;
  detecting, by the first camera, a third set of pixels within a third image captured by the first camera at a second time, wherein the third image is one of the first plurality of images;
  generating, by the first camera, a third set of visual descriptors of the third set of pixels;
  determining, by the first camera, that at least some of the third set of visual descriptors of the third set of pixels are consistent with at least some of the first set of visual descriptors;
  detecting, by the second camera, a fourth set of pixels within a fourth image captured by the second camera at a second time, wherein the fourth image is one of the second plurality of images;
  generating, by the second camera, a fourth set of visual descriptors of the fourth set of pixels;
  determining, by the second camera, that at least some of the fourth set of visual descriptors of the fourth set of pixels are consistent with at least some of the second set of visual descriptors;
  generating, by the first camera, the first trajectory based at least in part on the first location within the first set of pixels, the first time, the third location within the third set of pixels and the second time; and
  generating, by the second camera, the second trajectory based at least in part on the second location within the second set of pixels, the first time, the fourth location within the fourth set of pixels and the second time.

7. The method of claim 5, wherein the first set of visual descriptors comprises at least one of:
  a first color or a first texture of at least one of the first set of pixels, and
  wherein the second set of visual descriptors comprises at least one of:
  a second color or a second texture of at least one of the second set of pixels.

8. The method of claim 7, wherein the first camera is configured to execute at least a first machine learning tool trained to detect at least a portion of an actor within an image,
  wherein the first set of pixels is identified by the first camera based at least in part on an output received from the first machine learning tool in response to the one of the first plurality of images as an input,
  wherein the second camera is configured to execute at least a second machine learning tool trained to detect at least a portion of an actor within an image, and
  wherein the second set of pixels is identified by the second camera based at least in part on an output received from the second machine learning tool in response to the one of the second plurality of images as an input.

9. The method of claim 4, further comprising:
  determining, by the computer system, a third position associated with the third trajectory at a second time;
  receiving, by the computer system, at least a fourth trajectory and the first identifier from the first camera,
    wherein the fourth trajectory comprises a fourth set of positions in three-dimensional space,
    wherein each of the fourth set of positions is determined from one of a third plurality of images captured by the first camera over a second period of time,
    wherein the second time is in the second period of time, and
    wherein the second period of time follows the first period of time;

determining, by the computer system, that the fourth trajectory is associated with the third trajectory based at least in part on the first identifier; and in response to determining that at least the fourth trajectory is associated with the third trajectory, updating, by the computer system, the third trajectory based at least in part on at least one of the fourth set of positions.

10. The method of claim 4, further comprising:

determining, by the computer system, a third position associated with the third trajectory at a second time;

receiving, by the computer system, at least a fourth trajectory and a fourth identifier of the fourth trajectory from a third camera including at least a portion of the scene within a third field of view, wherein the fourth trajectory comprises a fourth set of positions in three-dimensional space, wherein each of the fourth set of positions is determined from one of a third plurality of images captured by the third camera over a second period of time, and wherein the third field of view does not overlap the second field of view or the first field of view;

determining, by the computer system, that at least the third position is consistent with at least a fourth position of the fourth set of positions determined from a third image of the fourth plurality of images captured at the second time; and in response to determining that the third position is consistent with at least the fourth position, updating, by the computer system, the third trajectory based at least in part on at least one of the fourth set of positions.

11. The method of claim 4, further comprising:

determining, by the computer system, a third position associated with the third trajectory at a second time;

receiving, by the computer system, at least a fourth trajectory and a fourth identifier of the fourth trajectory from the first camera, wherein the fourth trajectory comprises a fourth set of positions in three-dimensional space, and wherein each of the fourth set of positions is determined from one of a third plurality of images captured by the first camera over a second period of time that includes the second time;

determining, by the computer system, that the third position is not consistent with any of the fourth set of positions; and in response to determining that the third position is not consistent with any of the fourth set of positions, generating, by the computer system, at least a fifth trajectory and a fifth identifier of the fifth trajectory based at least in part on the fourth trajectory, wherein the fifth trajectory comprises a fifth set of positions in three-dimensional space; and storing, by the computer system, the fifth trajectory in association with the fourth identifier and the fifth identifier.

12. The method of claim 11, wherein receiving at least the first trajectory and the first identifier from the first camera comprises:

receiving, by the computer system, a first set of visual descriptors associated with the first trajectory from the first camera, wherein the first set of visual descriptors relates to at least a first set of pixels of at least the first image, wherein receiving at least the second trajectory and the second identifier from the second camera comprises:

receiving, by the computer system, a second set of visual descriptors associated with the second trajectory from the second camera, wherein the second set of visual descriptors relates to at least a second set of pixels of at least the second image, wherein receiving at least the fourth trajectory and the fourth identifier from the first camera comprises:

receiving, by the computer system, a third set of visual descriptors associated with the fourth trajectory from the first camera, wherein the third set of visual descriptors relates to at least a third set of pixels of at least a third image of the third plurality of images; and receiving, by the computer system, a set of data associated with the fourth trajectory from the first camera, wherein the set of data comprises a sixth identifier of a sixth trajectory and a sixth set of visual descriptors associated with the sixth trajectory, and wherein the method further comprises:

storing, by the computer system, the sixth identifier in a set of data associated with the fifth trajectory;

determining, by the computer system, that the sixth set of visual descriptors corresponds to at least one of the first set of visual descriptors or the second set of visual descriptors; and in response to determining that the sixth set of visual descriptors corresponds to at least one of the first set of visual descriptors or the second set of visual descriptors, storing, by the computer system, the sixth identifier in association with the third trajectory; and removing, by the computer system, the sixth identifier from the set of data associated with the fifth trajectory.

13. The method of claim 11, wherein receiving at least the first trajectory and the first identifier from the first camera comprises:

receiving, by the computer system, a first set of visual descriptors associated with the first trajectory from the first camera, wherein the first set of visual descriptors relates to at least a first set of pixels of at least the first image, wherein receiving at least the second trajectory and the second identifier from the second camera comprises:

receiving, by the computer system, a second set of visual descriptors associated with the second trajectory from the second camera, wherein the second set of visual descriptors relates to at least a second set of pixels of at least the second image, wherein receiving at least the fourth trajectory and the fourth identifier from the first camera comprises:

receiving, by the computer system, a third set of visual descriptors associated with the fourth trajectory from the first camera, wherein the third set of visual descriptors relates to at least a third set of pixels of at least a third image of the third plurality of images;

receiving, by the computer system, a sixth identifier of a sixth trajectory associated with the fourth trajectory and a sixth set of visual descriptors associated with the sixth trajectory;

determining, by the computer system, that the sixth set of visual descriptors does not correspond to the first set of visual descriptors or the second set of visual descriptors; and in response to determining that the sixth set of visual descriptors does not correspond to the first set of visual descriptors or the second set of visual descriptors, storing, by the computer system, the sixth identifier in a set of data associated with the third trajectory.

14. The method of claim 11, further comprising:

determining, by the computer system, a fourth position associated with the third trajectory at a third time;

receiving, by the computer system, at least a sixth trajectory and a sixth identifier of the sixth trajectory from the second camera, wherein the sixth trajectory comprises a sixth set of positions in three-dimensional space, and wherein each of the sixth set of positions is determined from one of a fourth plurality of images captured by the second camera over a third period of time that includes the third time;

determining, by the computer system, that the fourth position is not consistent with any of the sixth set of positions; and in response to determining that the fourth position is not consistent with any of the sixth set of positions, generating, by the computer system, at least a seventh trajectory and a seventh identifier of the seventh trajectory based at least in part on the sixth trajectory, wherein the seventh trajectory comprises a seventh set of positions in three-dimensional space; and storing, by the computer system, the seventh trajectory in association with the sixth identifier and the seventh identifier.

15. The method of claim 4, wherein each of the first set of positions corresponds to a point at an intersection of a line extending between a location of a first head depicted in one of the first plurality of images and a first location corresponding to a first vanishing point associated with the first camera within the ground plane, and wherein each of the second set of positions corresponds to a point at an intersection of a line extending between a location of a second head depicted in one of the second plurality of images and a second location corresponding to a second vanishing point associated with the second camera within the ground plane.

16. The method of claim 15, wherein the first vanishing point is a point corresponding to a location vertically below a first optical sensor of the first camera on the ground plane projected into the first camera at which at least one receding vertical parallel line depicted within the one of the first plurality of images appears to converge, and wherein the second vanishing point is a point corresponding to a location vertically below a second optical sensor of the second camera on the ground plane projected into the second camera at which at least one receding vertical parallel line depicted within the one of the second plurality of images appears to converge.

17. A method comprising:

receiving, by a computer system, at least a first camera trajectory and a first identifier of the first camera trajectory from a first camera including at least a portion of a scene within a first field of view, wherein the first camera trajectory comprises a first set of positions in three-dimensional space determined by the first camera, wherein each of the first set of positions is a position on a ground plane determined from one of a first plurality of images captured by the first camera over a first period of time, wherein each of the first set of positions corresponds to a point at an intersection of a line extending between a location of a head depicted in one of the first plurality of images and a location corresponding to a first vanishing point within the ground plane, and wherein the first vanishing point is a point corresponding to a location vertically below a first optical sensor of the first camera on the ground plane projected into the first camera at which at least one receding vertical parallel line depicted within the one of the first plurality of images appears to converge;

determining, by the computer system, that the first camera trajectory correlates with a first system trajectory comprising a set of positions in three-dimensional space determined by the computer system; and in response to determining that the first camera trajectory correlates with the first system trajectory, generating, by the computer system, an updated first system trajectory based at least in part on the first camera trajectory; and storing, by the computer system, the updated first system trajectory in association with the first identifier and a first system identifier of the first system trajectory.

18. The method of claim 17, wherein receiving at least the first camera trajectory and the first identifier from the first camera comprises:

receiving, by the computer system, a first set of visual descriptors associated with the first camera trajectory from the first camera, wherein the first set of visual descriptors relates to at least a first set of pixels of one of the first plurality of images, wherein the first system trajectory is generated based at least in part on at least one of a second camera trajectory, a second identifier of the second camera trajectory or a second set of visual descriptors received from one of the first camera or a second camera, wherein the second camera trajectory comprises a second set of positions in three-dimensional space determined by the one of the first camera or the second camera, wherein each of the second set of positions is a position on the ground plane determined from one of a second plurality of images captured by the one of the first camera or the second camera over a second period of time that preceded the first period of time, wherein the second set of visual descriptors relates to at least a second set of pixels of one of the second plurality of images, wherein that the first camera trajectory correlates with the first system trajectory is determined based at least in part on at least one of:

a correlation of one of the first set of positions with one of the set of positions of the first system trajectory;

a correlation of the first identifier with one of the first system identifier or the second identifier; or a correlation of at least one of the first set of visual descriptors with at least one of the second set of visual descriptors.

19. The method of claim 18, further comprising:

receiving, by the computer system, at least a third camera trajectory, a third camera identifier of the third camera trajectory, and a third set of visual descriptors associated with the third camera trajectory from a third camera including at least a portion of the scene within a third field of view, wherein the third camera trajectory comprises a third set of positions in three-dimensional space determined by the third camera, wherein each of the third set of positions is on the ground plane determined from one of a third plurality of images captured by the third camera over the first period of time, and wherein the third set of visual descriptors relates to at least a third set of pixels of one of the third plurality of images;

determining, by the computer system, that the third camera trajectory does not correlate with the first system trajectory; and in response to determining that the third camera trajectory does not correlate with the first system trajectory at the second time, generating, by the computer system, at least a second system trajectory and a second system identifier of the second system trajectory based at least in part on the third camera trajectory, wherein the second system trajectory comprises a set of positions in three-dimensional space; and storing, by the computer system, the second system trajectory in association with the second system identifier and the third identifier.

20. The method of claim 18, wherein the first set of visual descriptors comprises at least one of:

a first color or a first texture of at least one of the first set of pixels, and wherein the second set of visual descriptors comprises at least one of:

a second color or a second texture of at least one of the second set of pixels.

* * * * *